(12) United States Patent
Dixon et al.

(10) Patent No.: US 7,822,620 B2
(45) Date of Patent: Oct. 26, 2010

(54) DETERMINING WEBSITE REPUTATIONS USING AUTOMATIC TESTING

(75) Inventors: Christopher John Dixon, New York, NY (US); Thomas Pinckney, Cambridge, MA (US)

(73) Assignee: McAfee, Inc., Santa Clara, CA (US)

( * ) Notice: Subject to any disclaimer, the term of this patent is extended or adjusted under 35 U.S.C. 154(b) by 469 days.

(21) Appl. No.: 11/342,297

(22) Filed: Jan. 26, 2006

(65) Prior Publication Data

US 2006/0253458 A1    Nov. 9, 2006

Related U.S. Application Data

(60) Provisional application No. 60/677,786, filed on May 3, 2005, provisional application No. 60/691,349, filed on Jun. 16, 2005.

(51) Int. Cl.
G06Q 99/00    (2006.01)
(52) U.S. Cl. ................................ 705/1.1; 713/166
(58) Field of Classification Search ............... 705/1, 705/1.1; 713/166
See application file for complete search history.

(56) References Cited

U.S. PATENT DOCUMENTS

| 5,274,819 A | 12/1993 | Blomfield-Brown | 395/700 |
|---|---|---|---|
| 5,742,763 A | 4/1998 | Jones | 719/317 |
| 5,870,559 A | 2/1999 | Leshem et al. | 395/200.54 |
| 5,892,904 A | 4/1999 | Atkinson et al. | |
| 6,018,724 A * | 1/2000 | Arent | 705/44 |
| 6,065,055 A * | 5/2000 | Hughes et al. | 709/229 |
| 6,219,786 B1 | 4/2001 | Cunningham et al. | |
| 6,285,999 B1 | 9/2001 | Page | 707/5 |
| 6,356,937 B1 | 3/2002 | Montville et al. | 709/206 |
| 6,366,912 B1 | 4/2002 | Wallent et al. | 707/9 |
| 6,539,430 B1 | 3/2003 | Humes | |
| 6,606,659 B1 | 8/2003 | Hegli et al. | |
| 6,647,400 B1 | 11/2003 | Moran | |
| 6,658,394 B1 | 12/2003 | Khaishgi et al. | 705/58 |
| 6,742,128 B1 | 5/2004 | Joiner | 726/25 |
| 6,785,732 B1 | 8/2004 | Bates et al. | 709/232 |
| 6,826,697 B1 | 11/2004 | Moran | |
| 6,856,963 B1 * | 2/2005 | Hurwitz | 705/10 |
| 6,886,102 B1 | 4/2005 | Lyle | |
| 6,907,533 B2 | 6/2005 | Sorkin et al. | |
| 6,938,003 B2 * | 8/2005 | Harpale | 705/26 |

(Continued)

FOREIGN PATENT DOCUMENTS

WO    WO9949380 A1    9/1999

(Continued)

OTHER PUBLICATIONS

Office Action Summary from U.S. Appl. No. 11/281,963 mailed Nov. 13, 2007.

(Continued)

*Primary Examiner*—Jonathan Ouellette
(74) *Attorney, Agent, or Firm*—Zilka-Kotab, PC

(57) ABSTRACT

An aspect of the present invention relates to methods and systems involving automatically generating a third party assessment of a website's reputation, and storing an indicia of the assessment in a format and location that may be accessible by a client computing facility attempting to interact with the website.

25 Claims, 30 Drawing Sheets

U.S. PATENT DOCUMENTS

| | | | |
|---|---|---|---|
| 7,003,734 B1 | 2/2006 | Gardner et al. | 715/808 |
| 7,024,630 B2 | 4/2006 | Himmel et al. | 715/747 |
| 7,084,760 B2 | 8/2006 | Himberger et al. | 340/540 |
| 7,096,493 B1 | 8/2006 | Liu | 726/8 |
| 7,100,122 B2 | 8/2006 | Blaschke et al. | 715/808 |
| 7,114,177 B2 * | 9/2006 | Rosenberg et al. | 726/4 |
| 7,143,139 B2 | 11/2006 | Burbeck et al. | 709/206 |
| 7,207,480 B1 | 4/2007 | Geddes | 235/380 |
| 7,231,395 B2 | 6/2007 | Fain et al. | 707/101 |
| 7,257,549 B2 | 8/2007 | Karaoguz et al. | 705/26 |
| 7,313,691 B2 * | 12/2007 | Bantz et al. | 713/155 |
| 7,370,188 B2 | 5/2008 | Rothman et al. | 713/2 |
| 7,380,267 B2 | 5/2008 | Arai et al. | 726/1 |
| 7,562,304 B2 | 7/2009 | Dixon et al. | 715/738 |
| 7,765,481 B2 | 7/2010 | Dixon et al. | |
| 2001/0007098 A1 | 7/2001 | Hinrichs et al. | 705/14 |
| 2001/0011284 A1 | 8/2001 | Humpleman et al. | 707/511 |
| 2001/0014164 A1 | 8/2001 | Daniels et al. | 382/101 |
| 2001/0027450 A1 | 10/2001 | Shinoda et al. | |
| 2001/0029532 A1 | 10/2001 | Kato et al. | 709/223 |
| 2001/0044744 A1 | 11/2001 | Rhoads | 705/14 |
| 2001/0044809 A1 | 11/2001 | Parasnis et al. | 707/513 |
| 2001/0044901 A1 | 11/2001 | Grawrock | |
| 2002/0012443 A1 | 1/2002 | Rhoads et al. | 382/100 |
| 2002/0046041 A1 | 4/2002 | Lang | |
| 2002/0059364 A1 * | 5/2002 | Coulthard et al. | 709/203 |
| 2002/0069129 A1 | 6/2002 | Akutsu et al. | 705/26 |
| 2002/0103801 A1 | 8/2002 | Lyons | |
| 2002/0138402 A1 | 9/2002 | Zacharia et al. | 705/37 |
| 2002/0143885 A1 | 10/2002 | Ross | 709/207 |
| 2002/0178381 A1 | 11/2002 | Lee et al. | |
| 2002/0180778 A1 * | 12/2002 | Proudler | 345/734 |
| 2002/0194483 A1 | 12/2002 | Wenocur et al. | 713/185 |
| 2003/0018585 A1 | 1/2003 | Butler et al. | 705/53 |
| 2003/0023878 A1 | 1/2003 | Rosenberg et al. | 713/201 |
| 2003/0055737 A1 | 3/2003 | Pope et al. | 705/26 |
| 2003/0088577 A1 | 5/2003 | Thumhofer et al. | |
| 2003/0097591 A1 | 5/2003 | Pham et al. | 713/201 |
| 2003/0182421 A1 | 9/2003 | Faybishenko et al. | 709/224 |
| 2004/0006532 A1 | 1/2004 | Lawrence et al. | |
| 2004/0088369 A1 | 5/2004 | Yeager et al. | 709/217 |
| 2004/0093506 A1 | 5/2004 | Grawrock et al. | |
| 2004/0107363 A1 * | 6/2004 | Monteverde | 713/201 |
| 2004/0122926 A1 | 6/2004 | Moore et al. | |
| 2004/0123117 A1 | 6/2004 | Berger | |
| 2004/0143753 A1 | 7/2004 | Hernacki et al. | |
| 2004/0153414 A1 | 8/2004 | Khaishgi et al. | |
| 2004/0167980 A1 | 8/2004 | Doyle et al. | 709/225 |
| 2004/0169678 A1 | 9/2004 | Oliver | 345/738 |
| 2004/0199606 A1 | 10/2004 | Brown et al. | 709/219 |
| 2004/0205354 A1 | 10/2004 | Gabriel et al. | |
| 2004/0210602 A1 | 10/2004 | Hillis et al. | 707/104.1 |
| 2004/0250115 A1 | 12/2004 | Gemmel et al. | |
| 2005/0005111 A1 | 1/2005 | Brebner et al. | |
| 2005/0015506 A1 | 1/2005 | Padborg | 709/229 |
| 2005/0022018 A1 | 1/2005 | Szor | |
| 2005/0033991 A1 | 2/2005 | Crane | 713/201 |
| 2005/0044423 A1 | 2/2005 | Mellmer et al. | 713/201 |
| 2005/0052998 A1 | 3/2005 | Oliver et al. | |
| 2005/0071684 A1 | 3/2005 | Sorkin et al. | |
| 2005/0076222 A1 | 4/2005 | Olkin et al. | 713/176 |
| 2005/0091514 A1 | 4/2005 | Fukumoto et al. | |
| 2005/0165680 A1 | 7/2005 | Keeling et al. | 705/40 |
| 2005/0216300 A1 | 9/2005 | Appelman et al. | 705/1 |
| 2006/0015722 A1 * | 1/2006 | Rowan et al. | 713/166 |
| 2006/0095404 A1 | 5/2006 | Adelman et al. | 707/3 |
| 2006/0095586 A1 | 5/2006 | Adelman et al. | 709/245 |
| 2006/0106866 A1 | 5/2006 | Green et al. | 707/104.1 |
| 2006/0117389 A1 * | 6/2006 | Pool | 726/27 |
| 2006/0174343 A1 | 8/2006 | Duthie et al. | 726/23 |
| 2006/0212925 A1 | 9/2006 | Shull et al. | 726/1 |
| 2006/0235796 A1 | 10/2006 | Johnson et al. | 705/44 |
| 2006/0239430 A1 | 10/2006 | Gue et al. | 379/201.05 |
| 2006/0242026 A1 | 10/2006 | Crespo et al. | 705/26 |
| 2006/0265417 A1 | 11/2006 | Amato et al. | 707/102 |
| 2006/0282795 A1 | 12/2006 | Clark et al. | 715/840 |
| 2007/0028291 A1 | 2/2007 | Brennan et al. | 726/1 |
| 2007/0039038 A1 | 2/2007 | Goodman et al. | 726/2 |
| 2007/0079379 A1 | 4/2007 | Sprosts et al. | 726/24 |
| 2007/0083929 A1 | 4/2007 | Sprosts et al. | 726/22 |
| 2007/0088652 A1 | 4/2007 | Firmage et al. | 705/37 |
| 2007/0130350 A1 | 6/2007 | Alperovitch et al. | 709/229 |
| 2008/0028029 A1 | 1/2008 | Hart | 709/206 |
| 2008/0134084 A1 | 6/2008 | Clark et al. | 715/808 |
| 2008/0250159 A1 | 10/2008 | Wang et al. | 709/239 |
| 2009/0281905 A1 | 11/2009 | Walton | 705/26 |

FOREIGN PATENT DOCUMENTS

| | | |
|---|---|---|
| WO | WO0155873 A1 | 8/2001 |
| WO | WO0155905 A1 | 8/2001 |
| WO | WO03049403 A2 | 6/2003 |
| WO | WO03079214 A1 | 9/2003 |
| WO | WO2004061703 A1 | 7/2004 |
| WO | WO2005010649 A2 | 2/2005 |
| WO | WO2005033978 A1 | 4/2005 |
| WO | WO2005043351 A2 | 5/2005 |
| WO | WO2005043416 A2 | 5/2005 |
| WO | WO2005043417 A2 | 5/2005 |

OTHER PUBLICATIONS

Office Action Summary from U.S. Appl. No. 11/342,320 mailed May 5, 2008.
Finjan SecureBrowsing™: Browse fearlessly Finjan, Inc. 1996-2007.
U.S. Appl. No. 11/342,250, filed Jan. 26, 2006.
U.S. Appl. No. 11/342,318, filed Jan. 26, 2006.
U.S. Appl. No. 11/342,319, filed Jan. 26, 2006.
U.S. Appl. No. 11/342,320, filed Jan. 26, 2006.
U.S. Appl. No. 11/342,322, filed Jan. 26, 2006.
U.S. Appl. No. 11/342,342, filed Jan. 26, 2006.
U.S. Appl. No. 11/342,343, filed Jan. 26, 2006.
Final Office Action Summary from U.S. Appl. No. 11/342,320 mailed on Dec. 11, 2008.
Final Office Action Summary from U.S. Appl. No. 11/342,250 mailed on Dec. 16, 2008.
Final Office Action Summary from U.S. Appl. No. 11/281,963 mailed Jun. 10, 2008.
Final Office Action Summary from U.S. Appl. No. 11/342,250 mailed Jun. 20, 2008.
International Search Report and Written Opinion from PCT Application No. PCT/US06/17333 mailed on Aug. 18, 2008.
Final Office Action Summary from U.S. Appl. No. 11/342,342 mailed on Jul. 22, 2008.
Final Office Action Summary from U.S. Appl. No. 11/342,318 mailed on Aug. 18, 2008.
Office Action Summary from U.S. Appl. No. 11/342,319 mailed on Sep. 17, 2008.
Office Action Summary from U.S. Appl. No. 11/342,322 mailed on Sep. 18, 2008.
Office Action Summary from U.S. Appl. No. 11/281,963 which was mailed on Dec. 2, 2008.
Office Action Summary from U.S. Appl. No. 11/342,318 which was mailed on Mar. 27, 2008.
Advisory Action from U.S. Appl. No. 11/342,342 which was mailed on Nov. 12, 2008.
Office Action Summary from U.S. Appl. No. 11/342,342 which was mailed on Jan. 24, 2008.
U.S. Appl. No. 11/281,963, filed Nov. 16, 2005.
"Friendster, Welcome to Friendster", copyright 2002-2005 Friendster, Inc., www.friendster.com.
"How PGP works," copyright 1990-1999 Networks Associates, Inc., http://www.pgpi.org/doc/pgpintro/.

Office Action Summary from U.S. Appl. No. 11/342,342 mailed on Jan. 23, 2009.
Notice of Allowance from U.S. Appl. No. 11/342,320 mailed on Mar. 4, 2009.
Office Action Summary from U.S. Appl. No. 11/342,318 mailed on Mar. 26, 2009.
Final Office Action Summary from U.S. Appl. No. 11/342,319 mailed on Mar. 16, 2009.
Final Office Action Summary from U.S. Appl. No. 11/342,322 mailed on May 15, 2009.
Office Action Summary from U.S. Appl. No. 11/342,250 mailed on May 28, 2009.
Office Action Summary from U.S. Appl. No. 11/281,963 mailed on Jun. 2, 2009.
International Preliminary Examination Report on Patentability and Written Opinion from PCT Application No. PCT/US2006/017333 mailed on Mar. 26, 2009.
Notice of Allowability from U.S. Appl. No. 11/342,320 mailed on Apr. 27, 2009.
Office Action Summary from U.S. Appl. No. 11/342,319 mailed on Aug. 25, 2009.
Final Office Action Summary from U.S. Appl. No. 11/342,342 mailed on Aug. 20, 2009.
Office Action Summary from U.S. Appl. No. 11/837,050 mailed on Sep. 2, 2009.
Final Office Action Summary from U.S. Appl. No. 11/342,318 mailed on Sep. 21, 2009.
Advisory Action from U.S. Appl. No. 11/342,250 mailed on Feb. 25, 2009.
Office Action Summary from U.S. Appl. No. 11/342,322 mailed on Oct. 16, 2009.
Office Action Summary from U.S. Appl. No. 11/905,330 mailed on Dec. 30, 2009.
Final Office Action Summary from U.S. Appl. No. 11/395,758 mailed on Dec. 18, 2009.
Final Office Action Summary from U.S. Appl. No. 11/342,250 mailed on Dec. 2, 2009.
Office Action Summary from U.S. Appl. No. 11/342,343 mailed on Jan. 13, 2010.
Office Action Summary from U.S. Appl. No. 11/342,342 mailed on Jan. 12, 2010.
Final Office Action Summary from U.S. Appl. No. 11/342,319 mailed on Jan. 22, 2010.
Office Action Summary from U.S. Appl. No. 11/342,250 mailed on Feb. 26, 2010.
Final Office Action Summary from U.S. Appl. No. 11/837,067 mailed on Mar. 1, 2010.
Final Office Action Summary from U.S. Appl. No. 11/342,322 mailed on Mar. 1, 2010.
U.S. Appl. No. 60/588,570, filed Jul. 16, 2004.
U.S. Appl. No. 60/633,464, filed Dec. 6, 2004.
"Advertisement," Dictionary.com, http://dictionary.reference.com/browse/advertisement, Feb. 11, 2010.
Advisory Action from U.S. Appl. No. 11/342,319 mailed on Apr. 21, 2010.
Office Action Summary from U.S. Appl. No. 11/395,758 mailed on Apr. 14, 2010.
Final Office Action Summary from U.S. Appl. No. 11/837,050 mailed on Apr. 7, 2010.
Office Action Summary from U.S. Appl. No. 11/281,963 mailed on Mar. 8, 2010.
Notice of Allowance from U.S. Appl. No. 11/342,318 mailed on Feb. 23, 2010.
Office Action Summary from U.S. Appl. No. 11/837,067 mailed on Jun. 12, 2009.
Final Office Action Summary from U.S. Appl. No. 11/837,067 mailed on Dec. 31, 2008.
Office Action Summary from U.S. Appl. No. 11/837,067 mailed on Jun. 17, 2008.
Final Office Action Summary from U.S. Appl. No. 11/342,343 mailed on Jul. 14, 2010.
Non-Final Office Action Summary from U.S. Appl. No. 11/837,067 mailed on Jul. 12, 2010.
Notice of Allowance from U.S. Appl. No. 11/905,330 mailed on Apr. 30, 2010.
Final Office Action Summary from U.S. Appl. No. 11/852,948 mailed on May 26, 2010.
Final Office Action Summary from U.S. Appl. No. 11/342,342 mailed on Jul. 26, 2010.
Non-Final Office Action from U.S. Appl. No. 11/837,050, dated Aug. 18, 2010.
Final Office Action from U.S. Appl. No. 11/395,758, dated Aug. 20, 2010.
Final Office Action Summary from U.S. Appl. No. 11/342,342 mailed on Jul. 26, 2010.

* cited by examiner

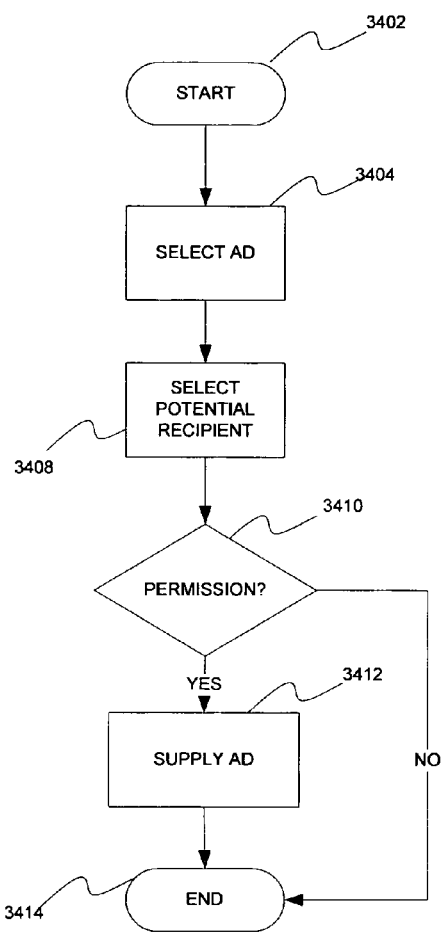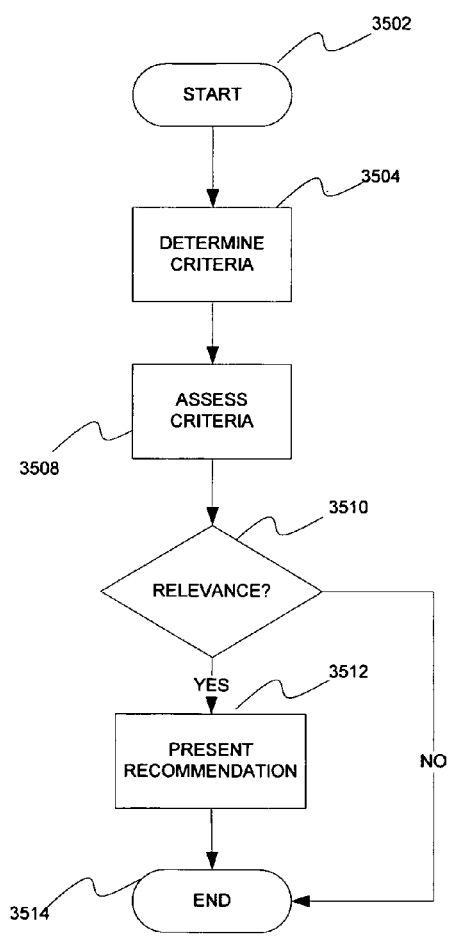
FIG. 34
FIG. 35

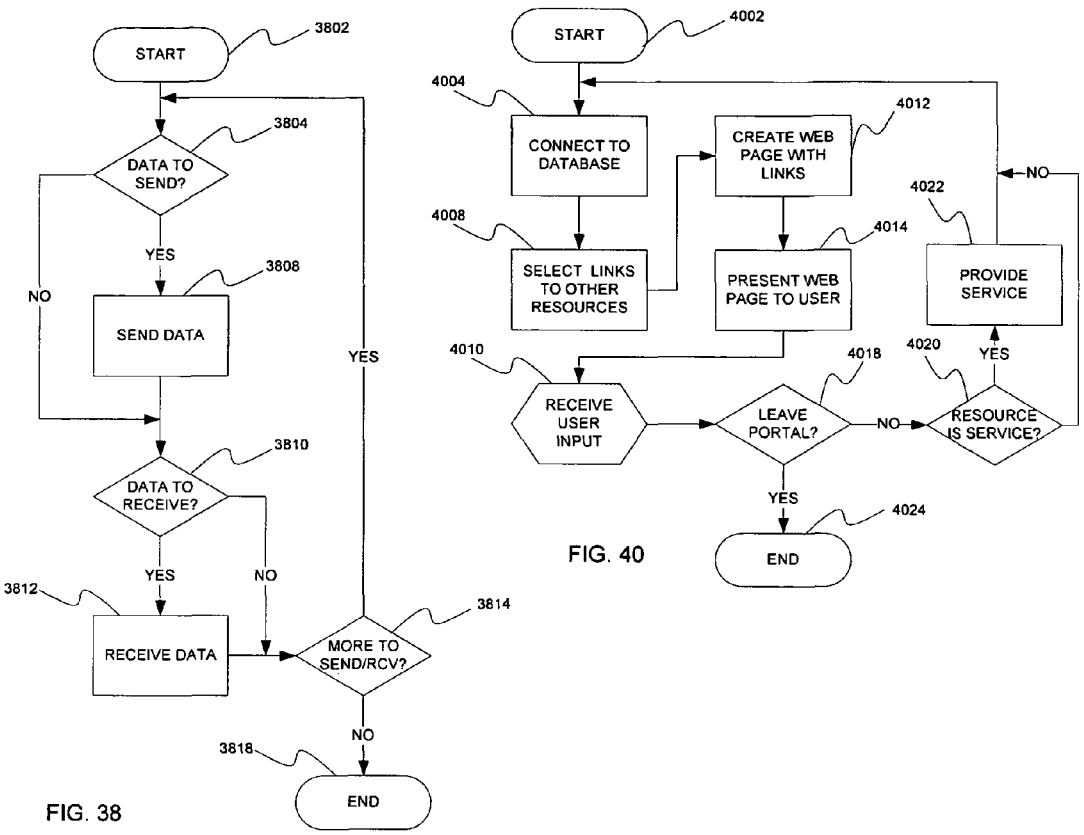
FIG. 38
FIG. 40
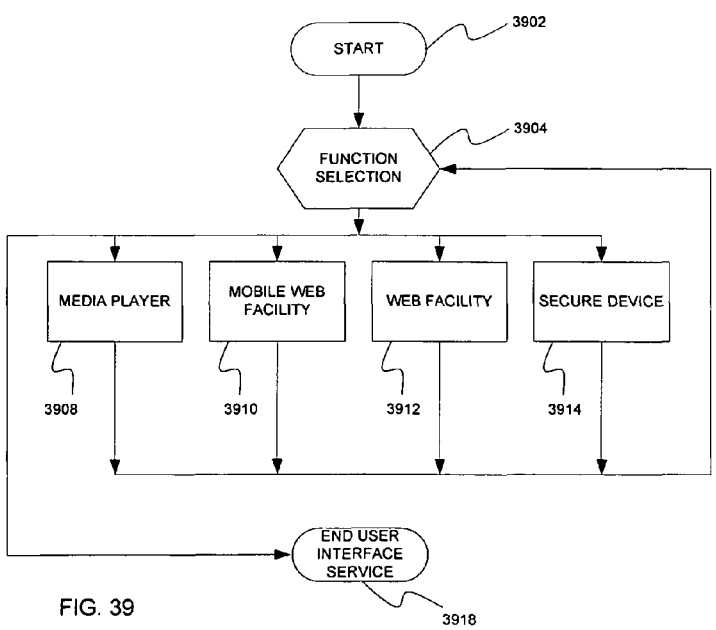
FIG. 39

DETERMINING WEBSITE REPUTATIONS USING AUTOMATIC TESTING

CROSS-REFERENCE TO RELATED APPLICATIONS

This application claims the benefit of the following commonly owned U.S. provisional patent applications, each of which is incorporated herein by reference in its entirety: U.S. Prov. App. No. 60/677,786, filed on May 3, 2005 and U.S. Prov. App. No. 60/691,349, filed on Jun. 16, 2005.

This application is also related to the following commonly owned patent applications, filed on even date herewith, each of which is incorporated herein by reference in its entirety: An application entitled "INDICATING WEBSITE REPUTATIONS DURING USER INTERACTIONS" Ser. No. 11/342,250 "INDICATING WEBSITE REPUTATIONS DURING WEBSITE MANIPULATION OF USER INFORMATION" Ser. No. 12/502,158; "INDICATING WEBSITE REPUTATIONS DURING AN ELECTRONIC COMMERCE TRANSACTION" Ser. No. 11/342,318; "INDICATING WEBSITE REPUTATIONS BASED ON WEBSITE HANDLING OF PERSONAL INFORMATION" Ser. No. 11/342,342; "INDICATING WEBSITE REPUTATIONS WITHIN SEARCH RESULTS" Ser. No. 11/342,322; "WEBSITE REPUTATION PRODUCT ARCHITECTURE" Ser. No. 11/342,319; and "REPUTATION OF AN ENTITY ASSOCIATED WITH A CONTENT ITEM" Ser. No. 11/342,343.

BACKGROUND

1. Field

This invention relates to the field of reputation services, and, more particularly to real-time, reputation-based Web services.

2. Description of the Related Art

As the World Wide Web grows, so do the dangers exposed to computer users and computing devices. These dangers come in many forms from viruses and malware adapted to disable computers; to spyware, adware, and programs adapted to track and steal personal information; to spam, junk mail, and programs designed to invade the user experience for commercial purposes. There are several solutions provided to detect and remove such software from a computer device, and there are firewalls and browser settings meant to prevent certain interactions. However, there exists a need to provide enhanced security for users of computer devices.

SUMMARY

Systems and methods for providing a Web reputation service are disclosed. The Web reputation service may comprise a real time database query interface for looking up the reputation of Web content, such as a Web site, a script, an executable application, a Web form, and so forth. A database may contain the reputation, which may be based upon a link structure analysis; a white list; a black list; a heuristic; an automatic test; a dynamic analysis of an executable application, or script; a static analysis of an executable application or script; an analysis of an end user license agreement; a determination of a distinguishing characteristic of a Web site, such as a business model or a genre; the result of a Web crawl; the output of a machine learning facility; user contributed feedback; and so forth. The systems and methods may intervene to prevent or allow certain features associated with Web content, such as adware, spyware, spam, phishing, pop ups, cookies, ActiveX components, client-side scripting, uploading files, downloading files, providing personal information, providing personal or financial information to a Website that intends to commit fraud, purchasing products from an e-commerce Website that is deemed high risk, and so forth. The Web reputation service may be embodied as a service providing information about the safety or trustworthiness of a Web site; a filter applied to Web search results; a ranking of Web search results; an advertising network that checks the reputation before placing an ad on the Web site; an advertising network that checks the reputation before accepting an ad that would direct a user to the destination Web site; a desktop proxy facility that uses the reputation to filter requests; a network proxy facility that uses the reputation to filter requests; a Web navigation guide that directs a user to "the best" Web destinations and away from "the worst" Web destinations, where what is considered "the best" and "the worst" may be determined solely by the reputation of, or by a combination of the reputation and data associated with, the user; an analysis presentment facility that shows a user how a reputation was determined; an alternate-Web-content presentment facility that provides a user with a reference to alternate Web content with a good reputation when the user requests Web content with a bad reputation; and so forth.

The several objects and features of the systems disclosed may include the provision of a Web reputation service; the provision of a real time database query interface for lookup up the reputation of Web content, such as a Web site, an executable application, a script, a Web form, and so forth; the caching of the results of this real time database locally on client computers to improve performance; the provision of a database containing the reputation; the provision of various Web content analysis facilities for determining the reputation of Web content; and the provision of applications of the Web reputation service.

Briefly stated, the reputation of Web content is determined primarily by a Web content analysis facility. This facility, in conducting Web content analysis, may inspect the Web content directly or may make deductions about the Web content, especially deductions that relate to a link structure associated with the Web content. The validity determination may, from time to time, be updated by the analysis facility. In any case, the determination is stored in a database that is accessible via a real time database query interface.

In embodiments, users may have the ability to "vote" about sites/content as well, and a reputation facility according to the principles of the present invention may use this as another source of input. In embodiments, a user may provide information relating to the performance of his or her computer or other related system following interaction with a certain site and thus provide performance information relating to the site. This performance information may then be used to generate reputation information about the site.

A Web reputation service may comprise the Web content analysis facility, the database, and the real time database query interface. In embodiments, the Web reputation service may comprise, without limitation, a service providing information about the safety or trustworthiness of a Web site; a filter applied to Web search results; a ranking of Web search results; an advertising network that checks the reputation before placing an ad on the Web site; an advertising network that checks the reputation before accepting an ad that would direct a user to the destination Web site; a desktop proxy facility that uses the reputation to filter requests; a network proxy facility that uses the reputation to filter requests; or a Web navigation guide that directs a user to "the best" Web destinations and away from "the worst" Web destinations, where what is considered "the best" and "the worst" may be determined solely by the reputation of, or by a combination of the reputation and data associated with, the user; an analysis presentment facility that shows a user how a reputation was determined; or an alternate-Web-content presentment facility that provides a user with a reference to alternate Web content with a good reputation when the user requests Web content with a bad reputation.

In embodiments, systems and methods involve a real time database query interface for looking up the reputation of Web content.

In embodiments, systems and methods involve providing a link structure analysis for the purpose of determining the reputation of Web content.

In embodiments, systems and methods involve using a white list in conjunction with the reputation of Web content.

In embodiments, systems and methods involve automatically finding and test Web content, with the result of the test being a measure of the reputation of the Web content.

In embodiments, systems and methods involve providing a reference to alternative Web content with a good reputation when requested Web content has a bad reputation.

In embodiments, systems and methods involve automatically extracting information from an end user license agreement, where the information pertains to how personal information is treated.

In embodiments, systems and methods involve utilizing Web crawling to detect a business model of a Web site.

In embodiments, systems and methods involve presenting inventions to utilize Web crawling to detect the genre of a Web site.

In embodiments, systems and methods involve utilizing Web crawling to determine the reputation of a Web advertisement network or the reputation of an individual advertisement, group of advertisements, publisher of advertisements, originator of advertisements, and the like. For example, Google may be a highly reputable advertising network, but one in a million advertisements they accept may be an advertisement that claims to be Citigroup and which directs users to a Website in China that intends to steal their bank account information. Information pertaining to this type of advertisement may be used to generate an advertisement reputation according to the principles of the present invention.

In embodiments, systems and methods involve utilizing a machine-learning algorithm in the process of determining the reputation of Web content.

In embodiments, systems and methods involve providing a Web reputation service.

In embodiments, systems and methods involve providing a Web search associated with the quality of Web content.

In embodiments, systems and methods involve providing an advertising network that declines to advertise Web content of ill repute.

In embodiments, systems and methods involve providing an advertising network that declines to associate an advertisement with Web content of ill repute.

In embodiments, systems and methods involve providing a desktop proxy facility that uses the reputation of Web content to filter requests.

In embodiments, systems and methods involve providing a network proxy facility that uses the reputation of Web content to filter requests.

In embodiments, systems and methods involve providing a Web navigation guide that directs a user to "the best" Web destinations and away from "the worst" Web destinations, where what is considered "the best" and "the worst" may be determined solely by the reputation of, or by a combination of the reputation and data associated with, the user.

In embodiments, systems and methods involve providing an analysis presentment facility that shows a user how a reputation was determined.

In embodiments, systems and methods involve providing an alternate-Web-content presentment facility that provides a user with a reference to alternate Web content with a good reputation when the user requests Web content with a bad reputation.

An embodiment of the present invention is a system and method for interacting with a network. The system and method may involve providing a Web reputation service to alert a user of a Web site reputation during the attempted interaction with the Web site, wherein the user uses a cell phone to interact with the Web site.

An embodiment of the present invention is a system and method for interacting with a network. The system and method may involve providing a Web reputation service to alert a user about a Web site reputation during the attempted interaction with the Web site, wherein the Website reputation service may be provided in conjunction with software adapted to scan the user's local hard drives for a virus.

In one aspect, a method and system disclosed herein may include automatically generating a third party assessment of a website's reputation, and storing an indicia of the assessment in a format and location accessible by a client computing facility attempting to interact with the website.

In embodiments, the format of the stored indicia of the reputation assessment may be adapted to provide the indicia at a time corresponding with an attempt to interact with a website, adapted to provide accessibility at the time the client facility may be attempting to interact with the website, and the like.

In embodiments, in methods and systems the location in which the indicia of the assessment may be stored may be associated with a server or with a client.

In embodiments, in methods and systems automatic testing may be used to measure the number of pop ups received after interacting with the website, to measure if the website may be attempting to change a web browser setting, such as a browser's home page or security setting, to assess if the website may be an End User License Agreement (EULA) and if the EULA involves the handling of personal information, to assess the website's use of spam, to assess the website's installation of software, to provide automatic website feedback.

In embodiments, in methods and systems the reputation of a website may be at least in part based on practices associated with the website, such as the treatment of personal information (current and past), the website's policy on the handling of personal information, and the like.

In embodiments, in methods and systems the practices of the website that at least in part comprise the reputation of the website may be related to unwanted content associated with the website including, but not limited to spyware, harmful software, malware, unexpected content, a downloadable file, a program, HTML, ActiveX, an executable file, and the like.

In embodiments, in methods and systems the practices of the website that at least in part comprise the reputation of the website may be related to website actions misdirecting its users, such as, where the misdirection may e at least in part based on a trade dress, trademark, service mark, a service, or a product.

In embodiments, in methods and systems the practices of the website that at least in part comprise the reputation of the website may be related to the corporate reputation of a business that is associated with a website. The corporate reputation may be based at least in part on at least one of the corporate address, how long the company has been in existence, how long the website has been in existence, if they have an IP address in a range of addresses with a poor reputation, existence of a trademark, if they are a spammer, popularity rank, better business bureau, ranking of the corporation, based on existence within Fortune 1000, Fortune 500, Fortune 100, Fortune 50, and Fortune 10.

In embodiments, the corporate reputation may be based at least in part on at least two of the corporate address, how long the company has been in existence, how long the website has been in existence, if they have an IP address in a range of addresses with a poor reputation, existence of a trademark, if they are a spammer, popularity rank, better business bureau, ranking of the corporation, based on existence within Fortune 1000, Fortune 500, Fortune 100, Fortune 50, and Fortune 10.

In embodiments, the corporate reputation may be based at least in part on a plurality of factors including at least one of the corporate address, how long the company has been in existence, how long the website has been in existence, if they have an IP address in a range of addresses with a poor reputation, existence of a trademark, if they are a spammer, popularity rank, better business bureau, ranking of the corporation, based on existence within Fortune 1000, Fortune 500, Fortune 100, Fortune 50, and Fortune 10.

In embodiments, in methods and systems the practices of the website that at least in part comprise the reputation of the website may be related to website actions providing misleading information on the website, such as, a false phone number or address, false corporate ownership, or the like.

In embodiments, in methods and systems the practices of the website that at least in part comprise the reputation of the website may be related to the corporate establishment date associated with the website.

In embodiments, in methods and systems the reputation of a website may be at least in part based on a link structure associated with the website.

These and other systems, methods, objects, features, and advantages of the present invention will be apparent to those skilled in the art from the following detailed description of the preferred embodiment and the drawings.

BRIEF DESCRIPTION OF THE FIGURES

The foregoing and other objects and advantages of the invention will be appreciated more fully from the following further description thereof, with reference to the accompanying drawings, wherein:

FIG. 34 illustrates an advertisement selection process wherein the transactions may be monitored by a reputation service.

FIG. 35 illustrates a recommendation process wherein the transactions may be monitored by a reputation service.

FIG. 38 illustrates a data transmission process wherein the transactions may be monitored by a reputation service.

FIG. 39 illustrates a function selection process wherein the transactions may be monitored by a reputation service.

FIG. 40 illustrates a Web interaction process wherein the transactions may be monitored by a reputation service.

DETAILED DESCRIPTION OF THE PREFERRED EMBODIMENTS

An aspect of the present invention relates to improving computer and user security and protection through reputation services. Information relating to Websites may be used before, during, or after certain Website interactions as a way of predicting the reliability, safety, security, nuisance value, or other parameters of the interactions. In embodiments, systems and methods disclosed herein relate to assessing the reputation of a site, page, or portion thereof, and alerting a user of the reputation prior to or simultaneously with an interaction with the site, page, or portion. For example, a particular site, or content from the site, may carry unwanted or unintended content as a general practice or in certain instances. A system according to the principles of the present invention may alert the user of such reputation prior to a user interaction with the site or content. In other situations, Websites request information from users for a purchase, to log in, to gain information, as part of a survey, or the like, and a system according to the principles of the present invention may alert the user about the site's reputation for using such information before the user provides such information through the site. There are many safety precautions, parental control features, protection systems, and the like that may be implemented through a reputation-based interactive system according to the principles of the present invention.

Figure 1:
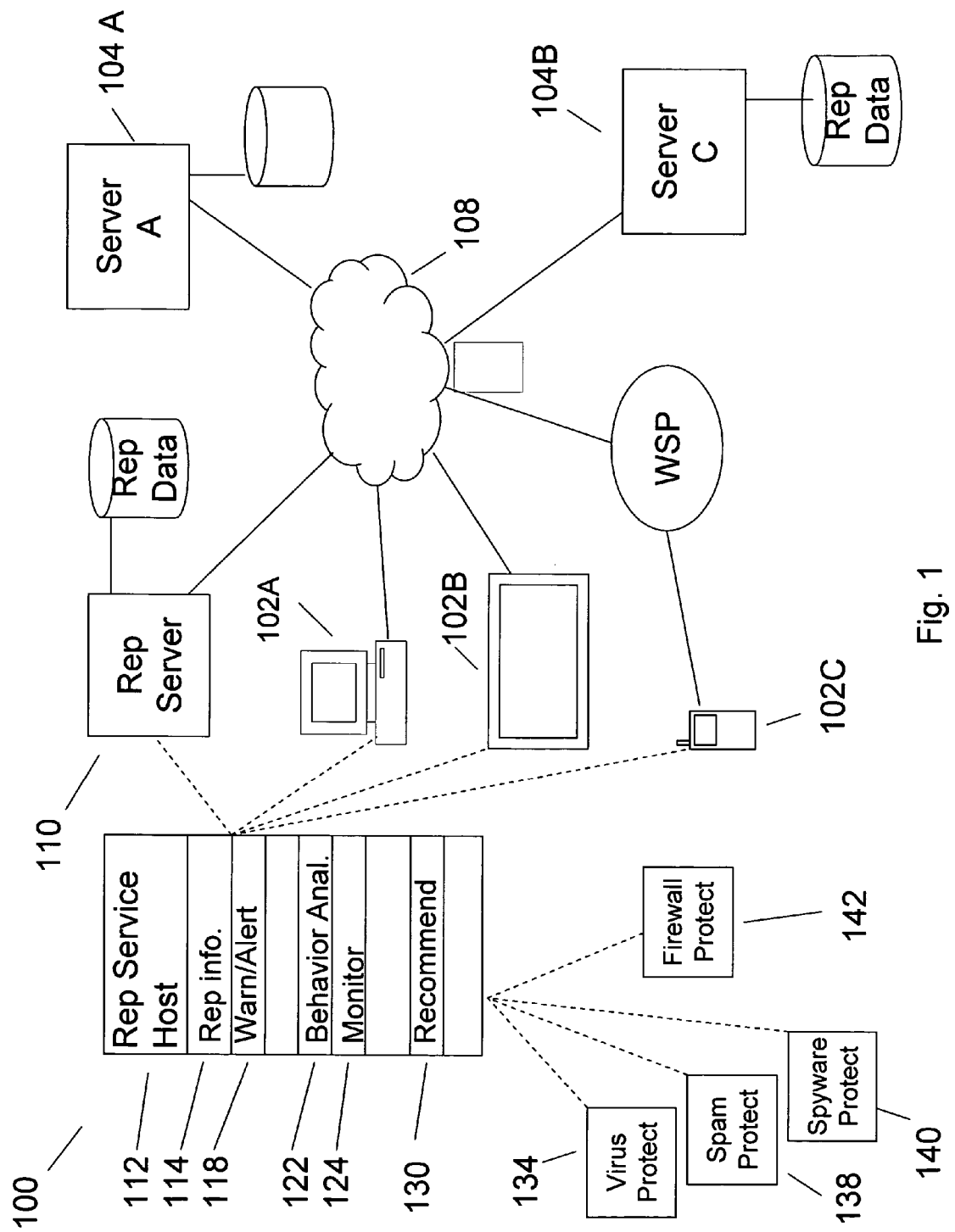
FIG. 1 illustrates a high level schematic of various components that can support an interactive reputation-based platform for providing reputation-based methods and systems.

FIG. 1 illustrates a high level schematic of an interactive reputation-based platform 100 according to the principles of the present invention. The interactive reputation platform 100 may include a number of client devices 102 that interact with server applications 104 through the Internet 108 or other internetworking facility. The clients 102 may include computers (e.g. desktops, laptops, palmtops) 102A, televisions or other audio visual equipment 102B, mobile communication facilities (e.g. cell phones, PDAs, email devices, IM devices, pagers, messaging devices) 102C, set top boxes, gaming consoles, networked consumer electronics device, or any other facility capable of interacting a site, link, or similar networked computing facility. The clients 102 may also interact with a reputation server 110 for various reasons. For example, the clients 102 may download client software, software updates, browser plug-ins, and the like from the reputation server 110. In embodiments, the clients may interact with servers 104 through or in coordination with the reputation server 110.

The interactive reputation platform 100 may also include a reputation service host 112. The reputation service host 112 may be associated with the reputation server 110 and or a client 102 and or be associated, in full or in part, with both the reputation server 110 and the client 102. In embodiments, a portion of the reputation service host 112 may reside on the client 102, and a portion may reside on the reputation server 110. In embodiments the reputation service host 112 may perform several functions related to reputation-based protection of clients 102. For example, the reputation service host may perform services associated with gathering, storing, and or providing reputation information relating to certain Websites, activities, categories, types of interactions, content types, and the like 114. The reputation service host 112 may provide warnings, cautions, alerts, indications of acceptable reputation, indications of poor reputations, indications of reputations, indications of types of expected behaviors, and the like 118. The reputation service host 112 may analyze behaviors (e.g. user behavior, site behavior, corporate behavior, page behavior, advertising behavior, communications behavior, or other behavior) 122 associated with the reputation information 114. The reputation service host 112 may monitor performance (e.g. client system performance before and or after a Web interaction) 124. In embodiments, the reputation service host 112 may include a recommendation facility (e.g. making recommendations to a user of the client based on a site reputation the user is attempting to interact with) 130.

The reputation service host 112 may be embodied in hardware, software, firmware, middleware, or a combination of any of the foregoing. In embodiments, the reputation service host 112 may comprise a server, such as an HTTP server, Web server, or the like; as well as one or more other computing facilities, such as a processor, operating system, database, or communications facility; and one or more modules, such as modules for processing or executing algorithms or services. In embodiments, the reputation service host 112 may comprise a single computer. In other embodiments, the reputation service host 112 may comprise more than one computer, such as in a distributed or parallel-processing system. In embodiments, the reputation service host 112 may comprise a cluster of services, such as those that are registered in the registry of a services oriented architecture.

In embodiments a client 102, for example, may attempt to interact with an application associated with a server 104. The reputation service host 112 may have previously collected reputation information relating to the application, and the reputation service host 112 may alert the user of the client to the reputation before connecting the client 102 to the application. The reputation service host may, for example, monitor an address or URL entered into an address bar of a browser application associated with the client 102, and, after the user has entered the address, the reputation service host 112 may provide an alert to the user that the Website that the user is about to interact with has a reputation for downloading spyware, malware, or other unwanted content. By way of another example, the client may be interacting with a site, and the site may present a page requesting information, such as a user email address, credit card information, and the like. The reputation service host 112, having previously collected information relating to how this provider treats such information, may provide the user with a warning of how the provider treats such information prior to submitting any such information. The client may be presented with a warning when presented with the opportunity to enter such information, or the user may be provided a warning after entering the information but before the information is sent to the provider, for example.

In embodiments, when indicia of a reputation are presented, they may be presented along with evidence of the reputation at the time the user is making the interaction. For example, the presentation may include information relating to the number of pop-ups, type of virus, type of malware, type of spyware, type of identity theft, frequency of identity theft, site category (e.g. adult, travel, loan, children, teen, or retirement), and the like associated with the interaction. In embodiments, the evidence may have been produced through testing or developed through secondary sources, for example. In embodiments, the reputation information may be provided through visual indications, aural indications, multi-media indications, video indications, or otherwise.

An internetwork of computing facilities 108 may involve any number of different networking systems. For example, the internetwork 108 may involve client—server topologies involving wired, wireless, optical, satellite, or other connection types. The internetwork 108 may involve P2P, mobile client-cell phone network-server, mobile client-satellite network-server, mobile client-server relationships or types of relationships. For example, a mobile communication facility 102C may connect to the Internet 108 through a wireless service provider 132 (e.g. Sprint, Verizon, AT&T, or T-Mobile).

In embodiments, a client 102 may be a desktop computer, laptop computer, palmtop computer, phone, cell phone, satellite phone, personal digital assistant (PDA), combination PDA/phone, walkie-talkie, television, video appliance, audio appliance, radio, satellite radio, picture appliance, Web appliance, home appliance (e.g. as part of home automation), information appliance, mobile communication platform, in-vehicle communication facility, location facility, GPS facility, wireless device, wired device, optical device, or other such device. In embodiments, a reputation service host 112 may recognize the type of client 102 and customize the interaction based on the type of client 102.

In embodiments, a reputation server 110 may be duplicated and distributed throughout a region to provide faster access by clients in the region. In embodiments, the reputation server 110 may provide services, content, applications, updates, and the like to clients 102. In embodiments, the reputation server 110 may be used by a client 102 in the interaction process with other servers 104.

In embodiments, a reputation service host 112 may be adapted to collect, store, organize, and/or provide reputation information 118 relating to Websites and the like. Examples of such information may include a wide range of indicia, which in turn may relate to the quality of content of a site, page, or portion thereof; to behavior or other actions engaged in by a site or the host thereof; to attributes of the site or the host; or other attributes of the site. Such information 118 may include information relating to spam, adware, spyware, cookies, viruses, phishing, spoofing, worms, illegal activities, immoral activities, illicit activities, improper business practices, age inappropriate material, gambling, location of provider, corporate information, post office box, false phone number, misleading phone number, phone number location, duration of registration, location of registration, better business bureau information, Website reference information, Website quality listing, VeriSign listing, analysis of links to the site, analysis of links from the site, treatment of information, treatment of personal information, names, addresses, phone numbers, social security numbers, portion of social security number, credit card number, bank number, pin, mother's maiden name, spouse's name, license number, immigration information, purchase information, username, password, password for the site, mortgage amount, car loan amounts, loan information, loan application information, income, downloading of content, downloading of unwanted content, downloading of spyware, downloading of malware, downloading of viruses, downloading of worms, downloading of programs, downloading of executable files, downloading of ActiveX, downloading of unexpected content, downloading of Java, downloading of JavaScript, downloading of VBscript, downloading of Flash, downloading of a media player, downloading of a player, downloading of a Webpage containing Web browser "exploits," misdirection, misleading information, trademarks, trade dress, service marks, trade names, brand name confusion, false information, metadata patterns, corporate addresses, how long the company has been in existence, how long the Website has been in existence, whether a company has an IP address in a range of addresses with a poor reputation, existence of a trademark, whether a company is a spammer, popularity ranks, ranking of the corporation (such as based on existence within Fortune 1000, Fortune 500, Fortune 100, Fortune 50, and Fortune 10), false corporate ownership information, misleading call information (e.g. whom or what a call will reach), higher ranked similar sites, famous trademarks, whether the site owns a registered trademark (e.g. federal, local, or international), whether the site has certificates, whether the site is similar to one with a famous trademark, decoy sites, valid addresses (e.g. corporate and or site reference), valid phone numbers (e.g. corporate and or site reference), valid email addresses (e.g. corporate and or site reference), valid contact information, addresses that correspond with a phone number and or the phone number presented, how long the site has existed, where the site is hosted, what IP ranges the site IP address is in, whether the site asks for personal information, whether it requests personal information, where on the site a site asks for personal information, whether the site sends email related to the content on the Website (e.g. it may be acceptable for an adult site to send adult content emails, but it may not be acceptable for a lottery Website to send adult content emails), whether the site adheres to common security practices (e.g. uses SSL, etc) or the like. Each one of these factors, or any combination of any two or more of them, may be used as a basis for assessing the reputation of a site, a page, or a portion thereof, such as in association with a user's interaction with the same. While certain preferred embodiments have been identified, the information 118 may encompass any-type of information that can be used to derive an indicator of reputation or to serve as such an indicator, including any type of information referenced herein or in the documents incorporated by reference herein.

In embodiments, one or more items or attributes of reputation information 118 may be used to judge or establish an overall reputation of a site or to judge or establish a specific reputation parameter Once a reputation parameter is established, it can be used in various ways; for example, a site that has a reputation for misusing private information may be tagged as a high risk site, and information about that risk may be presented to a user, such as at a time when a user is presented with an opportunity to enter such information. As another example, the user may be presented with an opportunity to download certain content from a Website with a poor reputation, and the reputation service host 112 may use the reputation information 118 to provide a warning to the user prior to downloading the content.

In embodiments, a reputation test may be performed or a reputation algorithm executed to assess or evaluate the reputation of a site, interactions with a site, or other such parameters. A test or algorithm may involve a collection phase 1116, in which reputation information 118 is collected by various techniques, such as testing downloads, in order to determine whether and how they modify the test computer's file system and registry, whether they display pop up ads, whether they talk to known ad-servers on a network, whether they talk to other servers on a network known to be used by known adware/spyware programs, how they relate to the contents of the EULA agreement presented in the setup program, whether the program modifies the browser settings (such as homepage, search engine, list of trusted sites, SSL certification authorities, proxies) or adds toolbars, sidebars, or buttons to the browser or to the desktop, whether the program installs known adware/spyware COM objects, ClassIDs, browser helper objects, whether the program installs cookies, or the like. The collection phase 116 may be undertaken by a variety of other techniques or facilities for collecting information 118, such as by reading or parsing information on a site, aggregating content from multiple sites, spidering a network to identify sites with particular content or information, asking users to report on the information or activities of a site, conducting research, such as using databases or research tools that have information about a site or a host (such as databases of company or entity information, databases of litigation information, databases of consumer complaints, or the like), asking users to rate interactions with a site, interacting with the site and monitoring the results, registering with a site and monitoring the results (including, for example, receiving traditional mail subsequent to interacting with a site), executing a transaction on a site and monitoring the results, or a wide range of other information collection techniques. In embodiments information that is collected in the collection phase 116 may be stored in a database, which may be optimized to store reputation information 118, such as for retrieval, analysis and use, in order to alert users at appropriate times. In embodiments, certain types of reputation information 118 may be associated with others in combinations or sub-combinations in order to allow rapid retrieval or analysis of combined categories of information. For example, indicators of spam, adware, and cookies may be associated with each other, and the presence of all three for a site may serve as secondary or "meta-indicator" of aggressive advertising behavior. In embodiments, reputation information 118 may be stored in a hierarchical fashion, such as including categories and sub-categories of information in a hierarchy or tree structure.

A reputation service host 112 may initiate a number of actions, alerts, cautions, warnings and the like during a client's 102 interaction with a server, other client 102, or other facility. For example, the reputation service host 112 may initiate warnings or alerts 114, provide reputation information 118, provide recommendations 130, and the like based on reputation information 118 accessible to the reputation service host 112. For example, actions may involve alerts, warnings, prevention of access, or the like based on reputation and or behaviors. The reputation service host 112 may indicate various levels of warnings, indications, and alerts from cautionary statements to warnings and indications of danger. In embodiments, the level of warning may increase with increased participation, as, for example, when a user interacts with a particularly non-reputable site.

The warning, alert 114, or other indication of reputation may be based on one or more parameters (e.g. one or more indicia of reputation collected and stored as reputation information 118).

In embodiments, information may be provided indicating action or interaction is acceptable. For example, when presented with an information request on a site, the reputation service host 112 may provide an indication to the user that this site has an acceptable reputation for dealing with such information.

In embodiments, warnings 114 may be provided with further information available. Warnings may be accompanied with available alternatives. A warning may relate to a prospective download. A warning may be a personal information warning, adware warning, spyware warning, malware warning, content warning, unwanted included file warning, cookie warning, data warning, unintended Website warning (e.g. misdirected through a similar mark), shopping warning, e-commerce warning, misuse of personal information warning, or the like. A warning 114 may include, for example, any type of information 118 described herein or a summary or indicator of the same.

In embodiments, the reputation service host 112 may provide a prevention service in such a way that an interaction or further interaction is not allowed or only allowed to proceed with an acknowledgement of the risk. In embodiments, such acknowledgements may be recorded for later retrieval (e.g. in a parental control setting, a parent may want to view the overrides).

A reputation service host 112 may include an analysis service 122. The analysis service 122 may be a behavior analysis service, such as, for example, a manual or automated system for assessing the reputation of a Website based on reputation information 118. In embodiments the analysis service 122 may be an automated or semi-automated system. For example, an algorithm may be adapted to measure the duration of a Website's existence and compare it against a predetermined period. If the site has been in existence for a longer period than the predetermined period, the site may be deemed to have an acceptable reputation, or a parameter associated with the duration may be given a favorable value. The analysis service 122 may also be adapted to analyze more than one parameter (e.g. indicia of reputation from the reputation information 118). In embodiments the analysis service 122 may include one or more parameterized algorithms for determining an overall reputation of a site, a page, or a portion thereof. For example, a host of a reputation service 112 may include any one or more of the items of reputation information 118 described above as parameters in an equation for determining reputation. An equation may, for example, calculate a reputation score based on values of individual elements of reputation 112. The individual information elements 118 may include discrete "on/off" values or may be determined on a continuum or scale. In embodiments, such an algorithm may be generated iteratively, such as by comparing results of actual interactions with Web sites with results that are predicted based on reputation information. Thus, embodiments include methods and systems for optimizing a reputation algorithm by comparing calculated reputation values with actual events and adjusting weights in the reputation algorithm to improve the fit between the calculated values and the actual events.

In embodiments the analysis services 122 may include one or more algorithms for determining a parameter of reputation, such as to present a multi-dimensional or multi-faceted view of a reputation. For example, an algorithm may include weighted values for various parameters that are in turn used to present different categories of reputation. For example, one dimension of reputation may relate to the inclusion of adult content, which may be distinct from another dimension related to sending unwanted email, which in turn may be distinct from a dimension related to unwanted downloads.

A reputation service host 112 may include a recommendation facility 130. The recommendation facility 130 may be adapted to provide a user with a recommendation associated with an interaction the user is having or about to have with a site, page, or portion thereof or to provide alternate recommendations when the user is attempting to interact with a site with a poor reputation. The alternate recommendations may, for example, relate to high reputation Websites that provide similar content or services to the site with which the user originally attempted to interact. For example, a user may attempt to interact with a poor-reputation Website, and the reputation service host facility 112 may provide a list of recommended Websites offering similar products or services. In embodiments, a recommendation facility may provide alternative sites, alternative brick and mortar stores, alternative phone numbers, alternative addresses, alternative email addresses, alternative purchase transaction facilities (e.g. a temporary credit card to be used during a particular transaction so as not to expose ones own credit card to the transaction), and other such alternatives.

A reputation service host 112 may also operate in coordination with another protection program, such as a virus protection program 134, a spam filter 138, a content filter, a parental control program, a spyware removal program 140, and/or a firewall 142, or any combination thereof. While the virus protection program 134, spam filter 138, spyware removal program 140, and firewall 142 are illustrated as being alternatively associated with the reputation service host 112, it should be understood that such facilities may be associated with remote devices and or servers.

A reputation service host 112 may identify an interaction between a client 102 and a site, page, program, content item, or other item, such as a Web site that is operated through a server 104. If the site, for example, has a reputation of downloading viruses or other malware, the reputation service host 112 may operate in coordination with the virus protection program 134 to target any such undesired content that may have been downloaded to the client 102. Alternatively, or in addition, the virus program 134 may be used during any such site interactions to identify and protect the client. In embodiments, the reputation service host 112 may identify the potentially harmful content and or behavior and communicate with the virus program 134. The information may relate to the content and or the behavior. Once the information has been provided to the virus program 134, the virus program may search the client's 102 drives for all viruses or other malware, or it may target specific content identified by the reputation service host 112. In embodiments, the virus program may operate in a targeted fashion during any interaction with the site.

In embodiments, the antivirus software is adapted to scan hard drives for malware and the like. In embodiments, the antivirus software may be periodically updated. In embodiments, the antivirus software may be adapted to scan email. In embodiments, the antivirus software may be adapted to check downloads before they are installed, as they are being installed, or after they are installed.

The reputation service host 112 may be associated with a spam protection facility (e.g. spam filter software residing on the client 102 or spam filter software residing on an associated server). The reputation service host 112 may detect a client 102 server 104 interaction indicative of a spam attack, so the reputation service host 112 may send an indication of such to the spam protection facility 138. The spam protection facility 138 may then target spam from the interacted source or generally increase an activity associated with spam reviews. For example, any email identified as coming from the interacted source may be loaded into a folder for review and the user may be alerted to the fact that the email has been tagged as spam.

In embodiments, the spam protection facility may filter spam, prevent address harvesting by keeping users from entering information on a Website, identify spam, report spam, provide content based filtering (e.g. looking for email that contains links to low reputation Websites as an indicator that this is unwanted email), provide statistical filtering, provide check-sum filtering, provide authentication, provide or verify keys, perform Heuristic filtering, set honey pots, or perform other such activities.

The reputation service host 112 may be associated with a spyware protection facility (e.g. spyware software resident on the client's server 102). For example, the reputation service host 112 may detect that the client has interacted with or is about to interact with a site that has a reputation for downloading spyware, and the reputation service host 112 may inform the spyware protection facility 140 of such. The spyware facility may then analyze the client (e.g. search any drives associated with the client) for spyware, and the spyware facility may target the types of spyware programs the interacted source has a reputation for downloading, or the spyware facility may search folders and the like the interacted source generally targets for storage. In embodiments, the spyware protection facility may be anti-spyware, a spyware filter, IE favorites addition notification, or spyware identification technology, and it may search hard drives, report spyware, and the like.

The reputation service host 112 may be associated with a firewall facility 142 (e.g. hardware of software firewalls). For example, the reputation service host 112 may identify high risk content, sites, and the like, and it may pass this information on to a firewall facility 142. The firewall facility 142 may then use this information to block all such suspect content and contact.

In embodiments, the firewall facility may invoke security policies, such as using a database of known acceptable programs that should be allowed to use the network and non-acceptable programs that should not be allowed to use the network. The firewall facility may further be adapted to protect personal information by keeping the user from entering certain Websites in addition to blocking personal information from being transmitted from the client by checking packets as they're sent from the client. The firewall facility may further be adapted to protect against unauthorized uses or unauthorized users.

In embodiments, the several protection facilities, the reputation service host 112, virus protection program 134, a spam filter 138, a spyware program 140, and or a firewall 142 may operate in a coordinated fashion. The coordination may involve one or more of the protection facilities, for example. For example, the reputation service host 112 may detect a client interaction with a poor reputation site, and one or more of the other protection facilities (e.g. virus protection program 134, a spam filter 138, a spyware program 140 and or a firewall 142) may be employed to provide its protection service.

In embodiments, a reputation service host 112 may be associated with a Web filtering facility adapted to identify content, prevent content, notify of content, or perform other like activities. In embodiments, a reputation service host 112 may be associated with a phishing facility adapted to filter phishing, identify phishing activities, identify legitimate sites (e.g. using a white list of known good sites), or provide other like services.

In embodiments, a reputation service host 112 may be associated with a security or controlled access facility (not shown). For example, the security or controlled access facility may be a fingerprint reader, biometric facility, retinal scanner, face recognition facility, voice print recognition facility, DNA recognition facility, blood type recognition facility, blood characteristics recognition facility, digital signature recognition facility, or other such facility.

In embodiments, a reputation service host 112 may be associated with a monitoring device (not shown), such as a camera, microphone, sensor, or the like. In embodiments, a reputation service host 112 may be associated with other software such as cryptography software. In embodiments, the reputation service host 112 may be associated with a parental controls facility. For example, the settings for allowing interactions with Web content may be adjusted in accordance with parental control settings. In embodiments, the reputation service host 112 may be associated with a supervisor or administrator controls facility. For example, the settings for allowing interactions with Web content may be adjusted in accordance with supervisor or administrator control settings. For example, publicly accessible computers, such as in a library, may be regulated in accordance with supervisor rules to prevent the contamination of the computers.

Another aspect of the present invention relates to the timing of the presentation of warnings and other such reputation-based actions. In embodiments, the warnings, recommendations, and indicia of reputation and the like are provided at the time of the attempted interaction or when the opportunity for an interaction is presented. For example, when a user enters a URL in an address bar of a browser, the user may be presented with reputation-based services even before the user's client device 102 is connected to the intended site. This may happen by a process involving various steps, including allowing the user to enter the URL, having the reputation service host 112 identify the URL, and comparing the URL to known URLs with associated reputation information, and then either providing information relating to the URL or allowing the browser to continue the action of connecting to the site.

In other embodiments, the user may be presented with a site that includes the opportunity for a user to enter information, such as queries, personal information, email address information, credit card information, passwords, or the like, and the reputation service host 112 may alert the user with indicia of the site's reputation as the site is presented. This may be done through a site comparison with reputation information 118 and/or through a review of what is being asked for on the page. When information requests are found, the page, content, site, or affiliated company may be assessed for reputation, and an indicator of the reputation may be presented to the user, or other reputation services may be provided. In embodiments, the user may enter information into entry fields on a page, and the action of entering the information may initiate a reputation review of the page, site, content, corporate affiliations, or the like.

Figure 2:
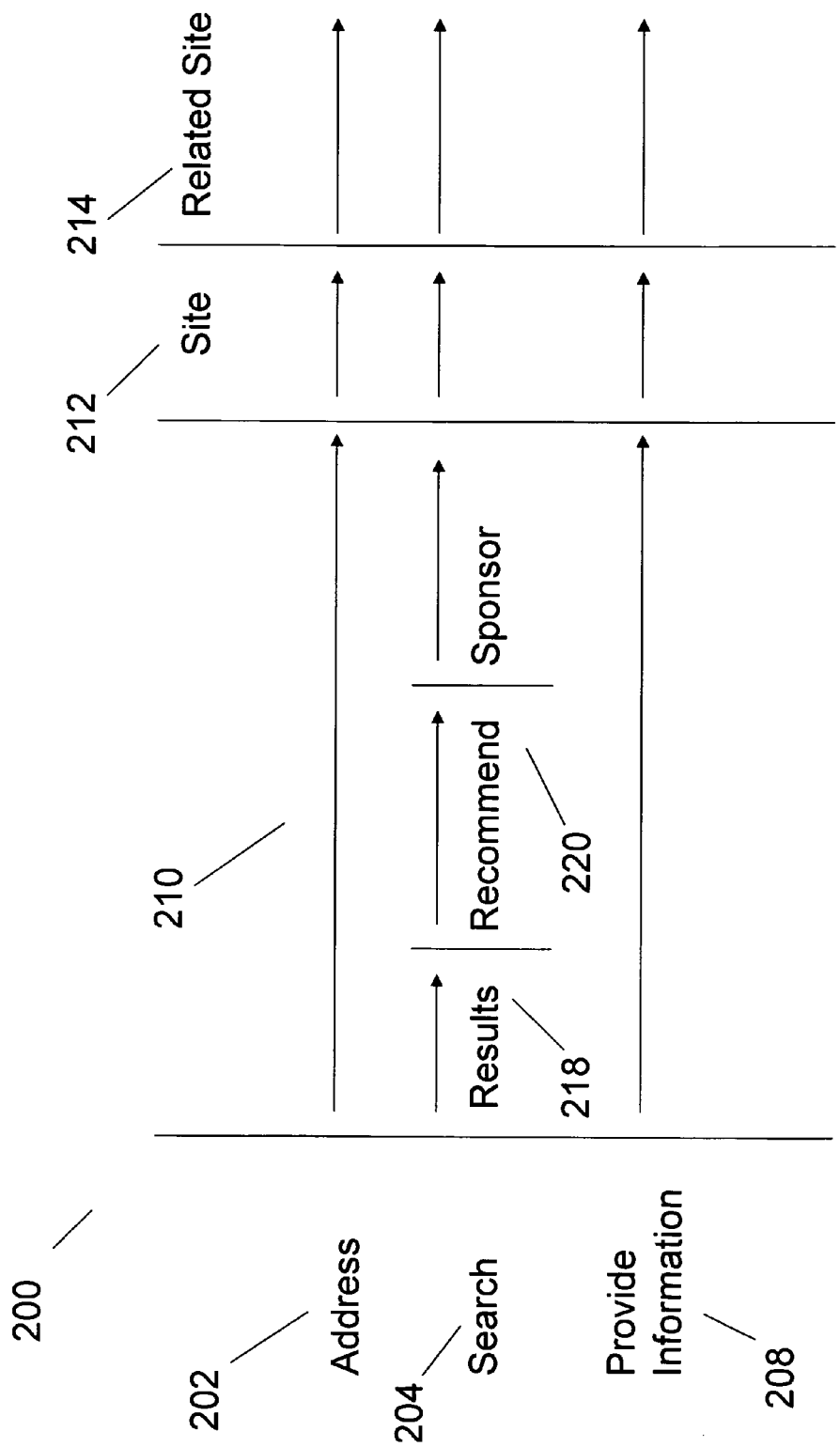
FIG. 2 illustrates certain processes with which a reputation service may be employed.

FIG. 2 illustrates processes and progressions of processes with which a reputation service may be employed 200. Three processes are illustrated in FIG. 2: entering an address in a browser facility 202; entering a search query in a search facility 204; and providing information through a Web page or the like 208.

The process of entering an address into a browser facility or the like 202 may involve steps of entering the URL, finding the site 210, entering the site 212, and then entering related sites 214 (e.g. linked sites, pages within the site). A reputation service host 112 may provide information, prevent access or otherwise interact with this process at any one of these stages. For example, after the URL is entered, the URL information may be provided to a reputation service host 112 for analysis, and the reputation service host 112 may provide interaction before the site is searched for. Likewise, the reputation service host 112 may interact with the process while the site is being located, engaged, and or entered. Even after the site has been entered, the reputation service host 112 may provide information or other reputation services. For example, the user may have entered a site that is not desirable from a reputation standpoint, and the reputation service host may indicate such to the user once he has entered the site. The user may then be presented with alternatives, including initiating a virus scan, spyware scan, or the like.

In embodiments, the timing of the warnings, prevention, and or other reputation services may be coordinated with typing in the navigation bar (including the typing of certain words or parts of words), hitting "return" in the navigation bar, or other interaction with a site, such as when certain items or objects are presented, when clicking on hyperlink, when mousing over a hyperlink or other item, when information is requested or presented, when certain dialog boxes are presented, when entering information into a Website, or the like.

The process of searching the Internet, or other internetwork of computing devices 204, may involve entering a search query into a search engine and receiving results, recommendations, sponsored links, or the like. Following the presentation of such information, the user may elect to enter a site by clicking on a link or the like. A reputation service provided through a reputation service host 112 may be provided before, during, or following each of these interactions. For example, once a user enters a search query, a reputation service may be employed to modify or enhance the search query. For example, the reputation service host 112 may augment the query with information adapted to search for sites and content with high reputation information, such as VeriSign registered sites only. Once the query is run, results 218 may be obtained. A reputation service may be provided once results 218 are obtained by marking results with warnings, high reputation marks, and the like.

During the search process 204, recommended sites and or content 220 may be provided along with search results 218. A reputation service may be employed in the process of retrieving the recommendations. For example, the recommendations may be highly rated recommendations and or the recommendations may be marked for presentation to indicate the reputation of the recommendation. Similarly, sponsored links, content, and the like may be retrieved and or marked in accordance with a reputation service host 112.

During the process of providing information 208 (e.g. providing personal information, credit card information, email address, IM name, and the like) a reputation service may be employed through a reputation service host 112. For example, when an information request entry field is presented, a reputation service host 112 may detect such and provide an analysis of the reputation of the particular entry field or affiliated site. The reputation service host 112 may then provide the user with indicia of the sites reputation. An indication of the reputation, or other reputation services, may be provided after information has been entered in the entry field. The reputation service host 112 may interact with the user after the field has been entered but before any information is transmitted, and or the host 112 may provide a service following the transmission of the information to the site.

A client may interact with a reputation service host 112 in a number of ways, and all such ways are encompassed by the present invention. In embodiments, the reputation service host 112 may be employed as a client program or a browser plug-in, for example.

While FIG. 2 shows certain embodiments of processes in which users interact with sites, it should be understood that the reputation services described herein may be associated with the steps or sub-steps of hosts of other processes in which users interact with sites, content, applications, portions of sites, pages, or other items. For example, a reputation service may be associated with one or more of the steps of an electronic commerce interaction, an electronic auction interaction, a word processing interaction, a downloading interaction, a purchase, a sale, an offer, a publishing action, a syndication action, an aggregation action, a shopping interaction, reverse auction interaction, an advertising interaction, or other interaction.

In embodiments, a reputation service host 112 may provide information, prevent access, or otherwise interact during an attempted Web interaction. For example, the reputation service host may interact with a search, search engine search results, opening of Website, use of Website, viewing banner advertisement, interacting with banner advertisement, or at another point in the process. As another example, the reputation service host may interact during a mobile communication facility (e.g. a cell phone or PDA) interaction while accessing a site, viewing a menu bar, making a phone call, or at another point in the process of interacting with the Web through a mobile communication facility. As another example, the reputation service host may interact during an email interaction such as when viewing items in the mailbox, before allowing to load, before opening, before reading, before viewing attachments, or at another point in the process of interacting with email. As another example, the reputation service host may interact during an instant message (IM) interaction such as when opening an IM program, initiating chat, receiving a message, viewing an advertisement, receiving a chat, or at another point in the process of interacting through IM. As another example, the reputation service host may interact during an interaction with the Web during activities in other software applications such as a word processor (e.g. Word, etc.), presentation software (e.g. PowerPoint, etc.), collaboration software (e.g. Lotus notes, etc.), spreadsheet software, business process management software, database software (e.g. PeopleSoft, SAP, Oracle, Sybase, IBM, open source), human resources software, supply chain/ordering/inventory software, purchasing software, or other software applications.

Figure 3:
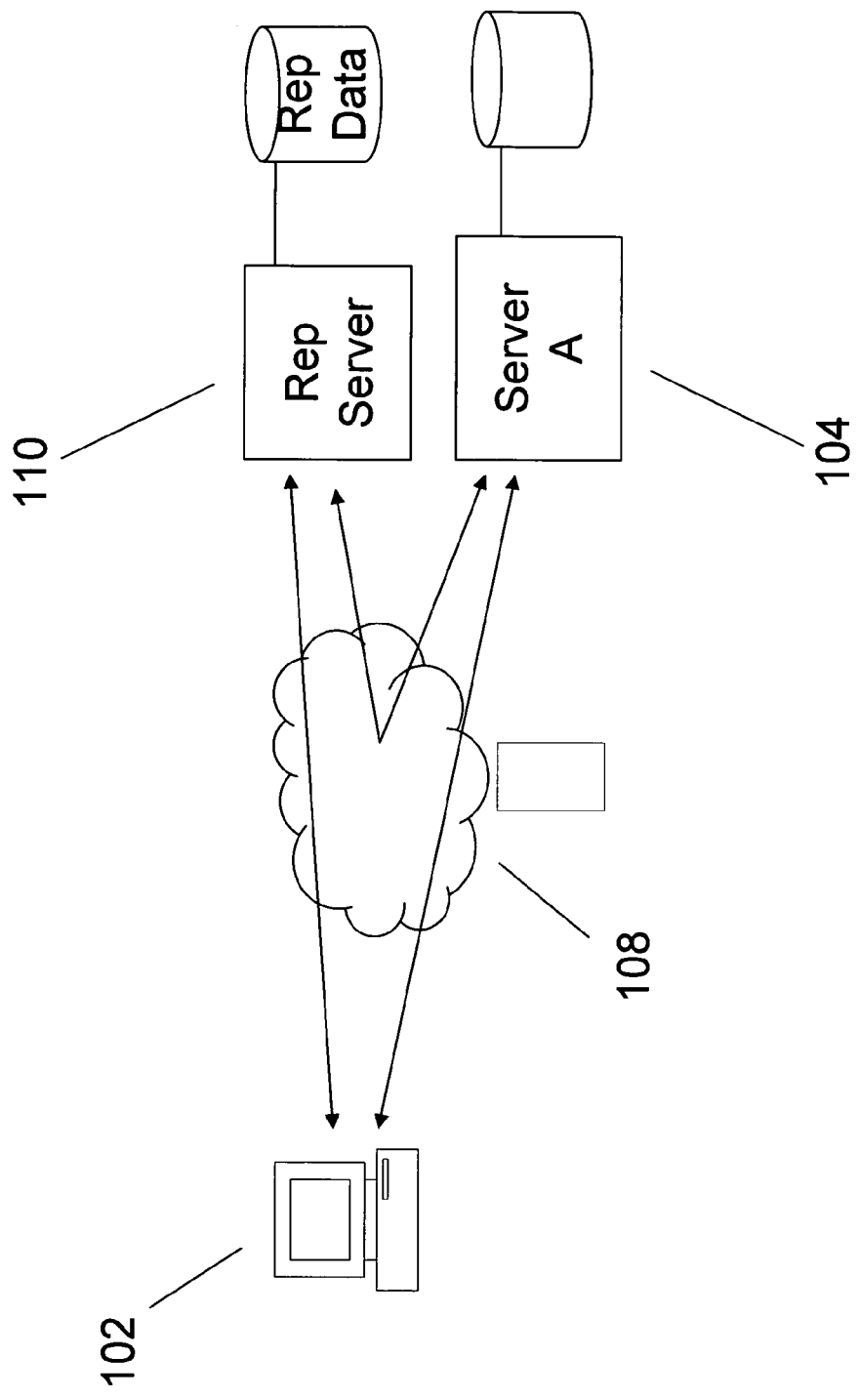
FIG. 3 illustrates a client interacting with a reputation server and another server in a variety of ways.

Referring to FIG. 3, the user may interact from a client 102 to a reputation server 110 for the initial download of the client or browser plug-in program, or the user may obtain the client program through CD, DVD, or like means. Once the client has loaded the client software host 112, the client may interact with the reputation server 110 for updates in the software or definitions used in the process of providing reputation services. The updates may be periodic, predetermined, received upon actions, on-demand, or at some other period. Once the client is operational with the reputation service host client program, the client may interact with devices and servers 104 through the Internet or other internetwork of devices. The reputation service shot program may monitor client interactions with the Internet and provide services as described herein.

Continuing to refer to FIG. 3, the client 102 may also or instead interact with servers 104 and other devices through a reputation server 110. For example, the client 102 may make a request through the Internet (e.g. a search query intended for a search portal, or a URL connection request), and the request may be made through or in coordination with the reputation server 110. The reputation server may be running the associated reputation service host 112, and the interactions with the host 112 may be enacted through the reputation server 110.

Figure 4:
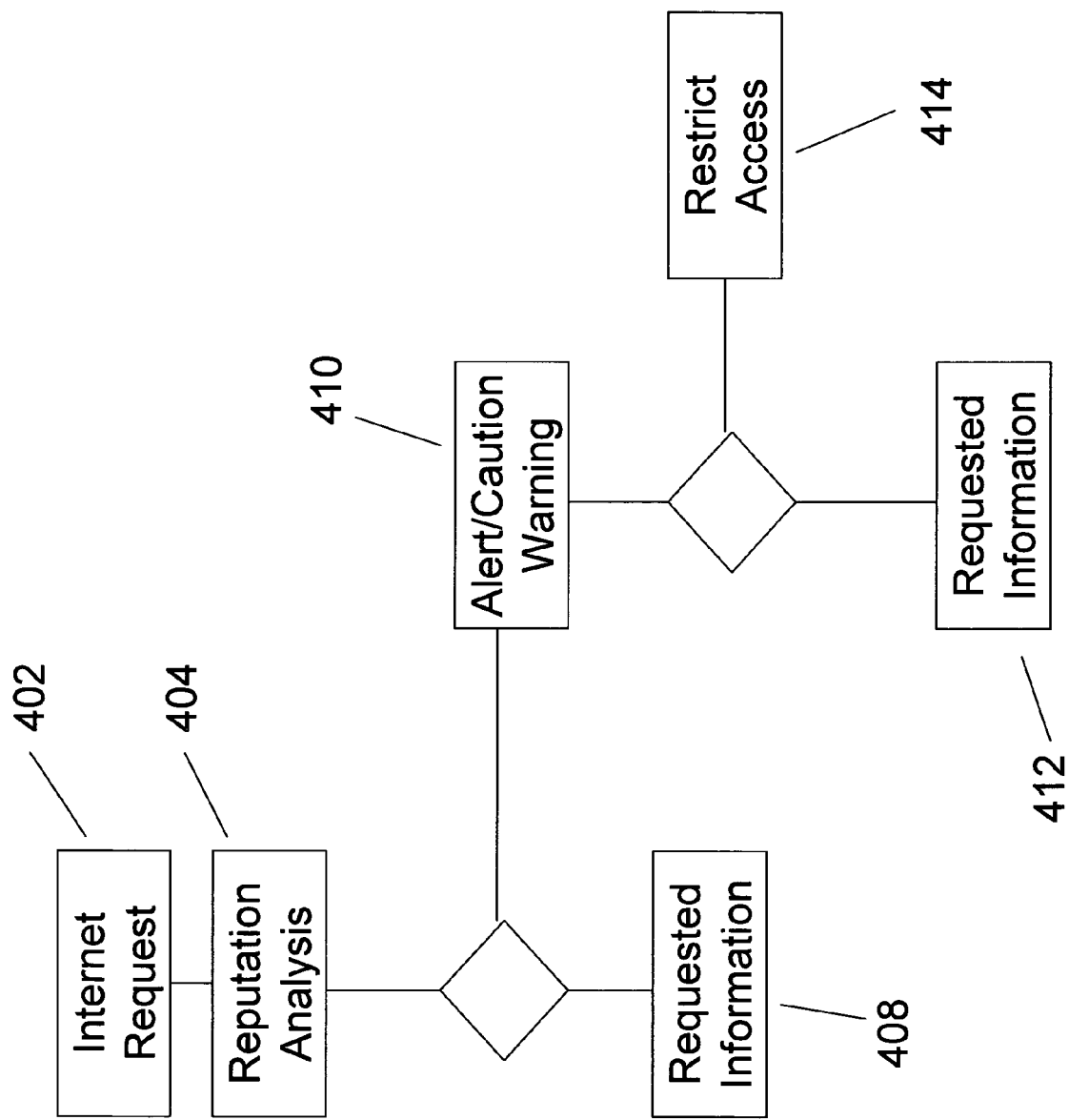
FIG. 4 illustrates a process for alerting a user to a Web reputation.

FIG. 4 illustrates a reputation information process 400 involving Internet requests. In the reputation information process 400 a user may provide an Internet request 402 (e.g. a search request or URL address request), and a reputation analysis 404 may be performed in conjunction with the request. For example, the address request may be analyzed using information relating to sites, content, and the like to identify the reputation of the site, content, and the like. The reputation may be a reputation for a specific activity or an overall reputation, for example. If a search term or phrase is provided at the internet request stage 402, a reputation analysis 404 may be performed on the results produced, for example. Following the reputation analysis 404, a decision may be made to either provide the requested information (e.g. the site or search results) 408 and or to provide an alert, caution, warning, recommendation, or other reputation service as described herein 410. For example, the reputation analysis may result in an acceptable reputation evaluation, and the user may be provided with the requested information 408. In the example relating to the requested site, this may mean the site is entered. In the example relating to the search results, this may mean the search results are presented. Instead of being presented with the requested information, the user may be presented with an alert or other reputation service 410, such as a caution pop-up. The user may be presented with the requested information 408 and be presented with an alert or other reputation service 410. For example, the search results may be presented along with an indication of the reputation of each such result. There may be a reputation indicator associated with each result, or there may be a reputation indicator presented for certain types of results (e.g. results associated with good or poor reputations). After the user has been presented with an alert or other reputation service 410, the user may be presented with an option to receive the requested information 412, or the user may be restricted from receiving the information 414. A parental control feature may be used in such a process where certain poor reputation sites are restricted from being viewed at the restrict access stage 414.

Figure 5:
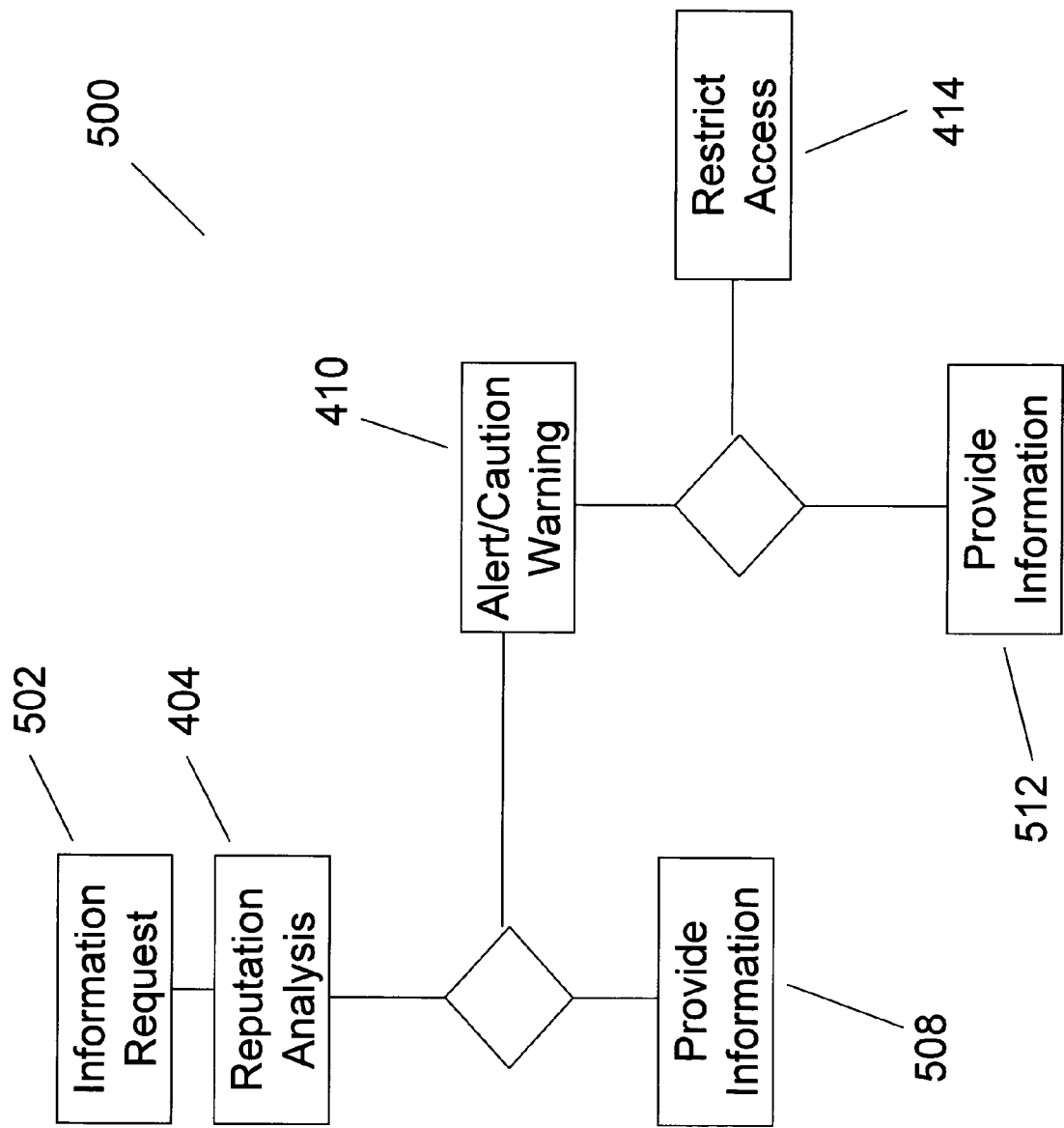
FIG. 5 illustrates a process for alerting a user that is associated with submitting information through a Website.

FIG. 5 illustrates a reputation information process 400 involving information requests. In the reputation information process 400, a user may be asked to provide information 502 (e.g. personal information, email address, credit card information), and a reputation analysis 404 may be performed in conjunction with the request. For example, the information request may be analyzed using information relating to sites, content, and the like to identify the reputation of the site requesting the information, content, and the like. The reputation may be a reputation for a specific activity or an overall reputation, for example. Following the reputation analysis 404 a decision may be made to either provide the requested information 508 and or to provide to the user an alert, caution, warning, recommendation, or other reputation service as described herein 410. For example, the reputation analysis may result in an acceptable reputation evaluation, and the user may be provided with the requested information 408 without further prompts or information. Or, the user may be presented with an alert, reputation information, or other reputation service as described herein 410. For example, a balloon style alert may appear next to the request for information. Once such an alert or other reputation service information is presented 410, the user may be restricted from supplying information 414, or the system (e.g. the reputation service host 112) may allow the information to be provided 512.

Referring back to FIG. 1, in embodiments, there may be a Web browser application and a proxy application running on the client 102 (e.g. a personal computer 102A). The architecture system may be an extension to a Web browser such as Internet Explorer, or it may be built as a proxy running on the personal computer, for example. The proxy application may be in communication with the Web reputation service server 110 via a database query interface (e.g. a real time database query interface) to accomplish the tasks of the reputation service host 112. This interface may include XML queries, RSS polls, HTML polls, SQL queries, a secure connection, an insecure connection, a publish-subscribe mechanism in which query results are pushed to the client 102, or any other practicable interface. The Web browser may be configured to utilize the proxy application such as a Web proxy. A user of the client 102 may attempt to access a URL using the Web browser. This access attempt may be passed to the proxy application. The proxy application may determine the reputation of the Web content at the URL by utilizing the real time database query interface to query the reputation of the Web content at the URL via the communication with the Web reputation service server 110. In embodiments, there may also be a local cache on the client device 102 such that the frequently/recently accessed content has its reputation, or indicia of its reputation, stored locally. This information may be cleared out of the cache, or modified, when new threat information is associated with stored information or there is a change in the reputation status of a site, or for other such reasons.

While many embodiments of the present invention refer to a URL, it should be understood that certain embodiments also involve not just the top level URL (e.g. the one seen in the browser navigation bar), but the systems may also look up URLs of content that are included in a page (e.g. such as when there are frames, when JavaScript is included by reference from a separate file on the server, etc). The systems may further be adapted to look up hash codes of some objects (e.g. programs, ActiveX controls, Flash files, etc.) since the actual content of the link may change even though the URL stays the same.

Continuing to refer to FIG. 1, the server 110 may be able to access reputation information 118 of Web content associated with a URL by querying a database containing such information. This information may have been stored previously in the database by the server 110. The information may have been created by a Web content analysis facility 122 that may be integral to the server 110, such as executable application. Optionally, the Web content analysis facility 122 may be external to the server 110, such as an executable application running on another server or on the client 102. In any case, the Web content analysis facility 122 may access Web content on the third-party Web server 104 and may comprise a computer program that may perform a Web content analysis function such as, without limitation, a link structure analysis; a white list comparison; a black list comparison; a heuristic; an automatic test; a dynamic analysis of an executable application or script; a static analysis of an executable application or script; an analysis of an end user license agreement; a business analysis resulting in a determination of a distinguishing characteristic of a Web site, such as a business model or a genre; a Web crawl; or a machine learning operation. From time to time, the information may be updated. Based upon the reputation of the Web content associated with the URL, the proxy application may, without limitation, allow; deny; allow-in-part; deny-in-part; modify; or alter the Web content. Moreover, based upon the reputation of the Web content associated with the URL, the proxy application may, without limitation, alert the user; interrogate the user; suggest alternate Web content to the user; or provide to the user a URL for the alternate Web content.

Still referring to FIG. 1, in another embodiment of the invention, there may not be a proxy application on the client 102. Instead, the Web browser may be configured to use a proxy application located at the Web reputation service server 110. The operation of this embodiment of the invention may be substantially similar to the other embodiments described above. In embodiments, the proxy could also be on the local network of the client or on the ISP's network, for example.

Still referring to FIG. 1, in yet another embodiment of the invention, there may be no proxy application at all. Instead, the Web browser may be used to access a search engine that is associated with the Web reputation service server 110. This search engine may return search results that are augmented or affected by the information associated with the reputation of the URLs appearing in the results. The search engine may utilize the real time database query interface in a substantially similar fashion to that of the proxy application in the above embodiments.

A Web reputation service may involve a real-time database query interface for looking up the reputation of Web sites, programs, Web forms, and other such content. Sites may be classified, for example as categories such as of "OK", "Adware Distributor", "Risky E-Commerce", and so forth.

In embodiments, the reputation of Web content may be determined with a link structure analysis. For example, a link structure analysis may be performed using an assumption that trustworthy Web sites tend to be affiliated with other trustworthy Web sites, and that conversely, untrustworthy Web sites tend to be affiliated with other untrustworthy Web sites. An affiliation of Web sites is often realized through hyperlinks from one Web site to another. When the hyperlinks of affiliated sites are viewed in aggregate, this may be considered a cluster. The link structure analysis may begin with a seed set of sites that have a priori reputation information. A fraction of that reputation (whether positive or negative) may be propagated to each neighboring Web site, that is each Web site that is one hyperlink away from the seed set. This may have the effect of adding the neighboring Web sites to the seed set, creating a new set. The procedure of propagating reputation and creating a new set may be repeated with each new set being used as the 'seed set'. In embodiments, this may continue a fixed number of times or until certain error thresholds are within tolerance of certain test sites.

For example, consider three sites A, B, and C. In a certain situation the reputation service host 112 may have information (e.g. reputation information 118) relating to sites A and B; however, it may not contain any information about site C. The information may have been gained, for example, through crawling and analyzing sites A and B, but for whatever reason site C did not get analyzed (e.g. site C was created after the last time sites were crawled and analyzed). Further, let's assume that sites A and B both contain content that has links to site C. In embodiments, the analysis facility 122 may infer the reputation of site C from the reputation of A and B. Sites A and B would both be 'seed' sites with known or assessed reputations. An algorithm associated with the analysis facility 122, for example, would then associate some fraction of A's and B's reputations to site C. So, if site A has 10 units of 'badness' and site B has 20 units of 'badness' the system might suggest that site C has $½*10+½*20=15$ units of badness propagated to site C.

While the above example uses a three site example, it should be understood this example is provided to illustrate the concept only and the concept may be applied to a much larger or a smaller number of sites, and that algorithms of varying complexity and/or other evaluation techniques may be used. In embodiments, the analysis is performed based on the theory that good sites tend to mostly point to other good sites while bad sites tend to point to both bad sites (e.g. frequently other sites operated by the same entity) and other good sites (e.g. to confuse people). In various embodiments, link analysis may be a forward or reverse link analysis—that is, fractional reputation scores may be propagated from an initial site to one or more sites that the initial site links to, or fractional reputation scores may be propagated from an initial site to one or more other sites that contain links to the initial site.

In embodiments, the reputation of Web content, sites, portions of sites, etc., may also be determined through the use of a white list. For example, while determining whether an item of Web content is associated with a phishing activity, the Web content may be compared to a white list of acceptable features, such as content, form, source, and so forth. The use of a white list may reduce the false positive rate of a phishing detection process. The use of a white list may allow precise tuning of a heuristic of which the phishing detection process may be comprised. For another example, a process for allowing or denying features associated with Web content (such as adware, spyware, spam, phishing, pop ups, cookies, ActiveX components, client-side scripting, uploading files, downloading files, providing personal information, and so forth) may allow a user to add Web content to a white list to indicate that features associated with the Web content should always be allowed. The use of a white list compares favorably to common practice in which a user either provides authorization input prior to the invocation of Web content or sets an "always allow" or "always deny" Web-wide preference. According to the present invention, the white list may be a real-time white list and may be updated by a facility other than the user, thus providing real-time access to the latest white list information and eliminating stale information from the white list, all via a process that requires limited or no input from the user.

In embodiments, the reputation of Web content may also be determined through automated testing. In one embodiment, this testing may comprise downloading programs to check for adware. This process may comprise crawling the Web in search of executable content; automatically installing the content on a machine by using a heuristic to answer installed wizard questions; exercising the installed executable applications and the system on which the executable applications are installed to stimulate the adware into activating; looking for suspicious network activity, changed systems files, added or modified registry entries, and other indicia of adware activity; and taking a screen shot to prove that the application was installed and to show that the application did its work. In another embodiment, this process may comprise registering at a Web site to see if the registration results in spam. This process may involve crawling the Web in search of Web forms asking for e-mail information; automatically detecting a characteristic of the Web site, such as business mode or genre, to recognize high-value sites; running span detection software on incoming e-mail to detect spam, adult content, gambling content, solicitations for fraud, or other undesirable content; and taking a screen shot to show what a user's inbox would look like if he were to provide his e-mail address to the Web site in question. In still another embodiment, the content of a Web page may be executed, interpreted, or otherwise run to test dynamic properties of the content. Certain properties of Web pages can be extracted by a static analysis of the page content, whereas other properties can be detected by simulating loading and running client-side executable/interpretable content like JavaScript in a simulated Web browser. Examples of properties that can be detected via a static analysis include 'on close' JavaScript events that, for example, may prevent a user from closing a window and cross-site scripting. In embodiments, testing may be accomplished with a false credit card, temporary credit card, false check routing number, false ATM card, false social security number (or other false personal information), test email account, test IM account, test messaging account, or the like.

In embodiments, Web content with a good reputation may be provided to a user as a safe alternative to user-selected Web content with a bad reputation. For example, a user that requests site X (assuming such a site has a poor reputation) may be provided with a recommendation to use site Y (assuming such a site has a good reputation). In an embodiment, the process of providing a safe alternative may use categorization data such as DMOZ in a process that may comprise finding a popular category of Web content, collecting a minimum number of other domains from nearby categories, and selecting alternatives based upon popularity and security.

In embodiments, the reputation service host 112 may automatically recognize and fill in virtual credit card numbers and automatically recognize and generate unique e-mail addresses. In another embodiment, the reputation service host 112 may provide for automatic end-user license agreement analysis. This embodiment may automatically extract information on how personal information is treated, for example whether using the site or software will result in advertisements or other undesirable content In embodiments, the collection facility 116 may involve Web crawling. In an embodiment, Web crawling may be used to detect the business model of a Web site. For example, a Web crawl may detect whether a Web site advertises (e.g. identifying ads based on image placement and size on pages, recognizing common ad service networks, and so forth). As another example, a Web crawl may detect if a Web site makes money through trustworthy means such as providing ad-supported content (e.g. such as the NY Times or other well known news sites) or pay-for-service (e.g. such as Amazon or other e-commerce providers). If a Web crawl detects that there are no payment systems associated with a Web site and that Web site advertises, then the Web site may have covert means of making money from user traffic and as a result negative reputation may be inferred. In another embodiment, Web crawling may be used to detect the genre of a Web site. For example, a Web crawl may identify Web content, Web content associated with finances, Web content associated with personal information, and so forth. The Web crawl may identify 'check out', 'shopping cart,' and other such links to determine if a Web site is an e-commerce site. The Web crawl may look for distinct pages linked from a top page or advertisements to see if the Web site is a content site. In still another embodiment, Web crawling may proceed through an ad network. For example, a Web crawl may repeatedly crawl a site to receive different ads; may run a Web page to crawl JavaScript ads; and may detect ads based on size and placement of images, ad servers, and so forth.

In embodiments, the collection facility 116 may involve Web crawling for automated detection of computer exploits. A computer exploit may occur when software or data takes advantages of a vulnerability in an operating system or a controlling application in order to execute unauthorized commands. The method for detection may involve trapping the effects of the exploit, not specific to the code itself nor any particular vulnerability of which it takes advantage (e.g. buffer overflows, cross-site scripting, or format string attacks). For an exploit to perform any permanent alteration of behavior, or ongoing theft or damage of data, to a system, it may persist itself on the target computer.

The detection method may be comprised of a technology built for operating systems that may monitor access to persistent storage and execution of code. The monitoring may occur at a level that cannot be bypassed by user level applications of the system. The method may then employ a unique system of rules and heuristics to filter expected traffic and identify unexpected behavior. Upon detection of any unexpected behavior, the system may analyze the results to identify the malicious process, and describe in laymen terms the exact consequence of the exploit.

The method of exploit discovery may involve the collection facility 116 automatically opening Internet browsers to navigate the World Wide Web. The collection facility 1116 may browse the World Wide Web using a web crawler to open websites starting from an original website and progressing through links and associations, the original website listing may be from a database in the reputation server 110. In an embodiment, the web crawler may also search websites based on the website advertisements. In an embodiment, a plurality of web browsers may be instantiated, each may be running it's own web crawler. The websites may be opened with no attempt to install or download software from the website. After a website is opened in a web browser, the operating system may be analyzed to determine if any system changes, browser changes, code installs, or the like have occurred by opening the web page. The collection facility 116 may further analyze the offending internet locations in an insulated environment to fully audit what effects the exploit has upon the system, included but not limited to, what unauthorized software may be installed and what default behaviors of the system are altered. Using a system of rules unique to the behavior of the browsers, this method may be able to identify which domains and specific URLs are utilizing computer exploits.

In embodiments, the analysis facility 122 may include a clone website detection facility. Clone websites, such as Internet scams and decoys of legitimate websites, may not exist in isolation; the cloned websites may exist as groups of cloned websites, each with a slightly customized look. The cloned websites may vary the HTML layout and text literature by a small amount from an original legitimate website. When a website with a bad reputation is discovered by the analysis facility 122, it may be advantageous to also discover if other cloned websites may exist and to mark those websites as illegitimate cloned websites. The analysis facility 122 clone detection mechanism may enable detection of exact and approximate website clones through a automatic mechanism. The mechanism may also be semi-automatic by requiring verification.

In detecting clone websites, the URLs of websites identified as clones may be fed into an automated detection system. The automated system for detecting additional clone websites may include extracting a list of prospect phrases from the original cloned website that may be highly unique, use the prospect phrases in a search engine (e.g. Google or Yahoo) to obtain a list of possible clone URLs, perform structural and semantic analyses of each candidate clone URL to create a "fingerprint" of the candidate clone website, return a rank-ordered list of scored candidate clone URLs, and the like. If the score of the candidate clone URL is above a certain score threshold, the candidate clone URL may be automatically marked by the analysis facility 122 as a clone website. In an embodiment, if the candidate clone website is below the score threshold, the candidate clone website may still be an approximate clone; the approximate clone websites may be manually verified by a technician.

In prospect phrase extraction, the HTML of the main homepage of a URL may be extracted from the clone website. In some cases, meta webpage refreshes, webpage rewrites of the URL in javascript, and the following of frame src and iframe src links may be analyzed in order to discover how the main homepage may be seen by a user of a web browser. The HTML and javascript may be stripped from the original clone website, and HTML entities may be resolved to obtain a plaintext listing of the original clone website. The plaintext may be tokenized and windows that may contain consecutive words/tokens may be enumerated; tokens may be product names or website names. The consecutive words/tokens may be of a predefined length, 9-10 words/tokens in length for example. The predefined length of the consecutive words/tokens may be varied for different types of clone websites. For use in later search strings the tokens may be replaced with the semantic wildcard "*", this may increase the possibility of finding additional clone websites with a web search. Each candidate prospect phrase may be scored heuristically. In an embodiment, for each word that may appear in the 50 most common English Web words the phrase may earn −1 points; the Web words may be pre-generated from other web texts. In an embodiment, for each word that may appear in the 50-500 most common English Web words, the phrase earns +2 points, this may prevent prospecting using technical words used in websites. In an embodiment, for each word that is the wildcard "*", the phrase may earn +3 points. After prospect phrases are rank-ordered, the top phrases may be fed into a search engine and the URLs from the first pages of results may be recorded as possible clone website candidates.

In the clone fingerprinting, the HTML of the main user-viewable homepage of each candidate clone URL may be extracted. If the main HTML is constituted by two frames, the frame src HTMLs may be joined into a single HTML file. To generate the fingerprint representing a structural and semantic profile of the site, a methodology of lightweight plagiarism detection as known in linguistic forensics literature may be used. The fingerprint may consist of at least one semantic measure and at least one structural measure such as letter bigrams, top HTML tags, top HTML attributes, top images, and the like. The letter bigrams may be pairs of consecutive character sequences in a document. The top ten letter bigrams of the original clone website may be compared to the letter bigrams of the candidate clone website. The candidate clone website may be assigned a level of plagiarism by the number of matching bigrams from the original clone website. The level of plagiarism may be determined to be exact, approximate, nuanceful, genre-similar, or the like depending on the number of bigrams matches. The top five HTML tags (case sensitive) that may appear in the original clone website homepage may indicate its layout and may be used to compare to the top five HTML tags of the candidate clone websites. Idiosyncratic HTML tags may be caught, as some sites use all capital letters, while others use lowercase letters. The top HTML attributes that may appear on the original clone website homepage may be compared to the top HTML attributes on the candidate clone website, attributes may be "x=y" strings which may lie inside an HTML definition. The use of HTML tags and HTML attributes may measure idiosyncrasy and may capture layout aspects like width/height, colors, and CSS styles between the original clone website and the candidate clone website. Images in HTML may be profiled as imagename.jpg, width, and height. The top twenty image definitions may detect clones because it may be common for images to be shared within clone websites. To score candidate clones, the fingerprint of each candidate clone may be scored against the fingerprint of the original clone site. The final score may be calculated as the arithmetic mean of scores produced by each of the four semantic and structural measures. If the fingerprint of the candidate clone website meets a threshold compared to the original clone website, the candidate clone website may be another clone website and therefore may be marked as a clone website.

In embodiments, the analysis facility 122 may include a machine learning facility. Many pieces of information, or features of sites, content, etc., may be gathered about a Web site. The presence of some features may directly lead to a site's classification of reputation. For example, if a Web site harbors spyware, then the site may be classified as a spyware distribution Web site. However, other features do not so directly predict a Web site's classification. The machine learning of the present invention provides the ability to generate weightings of which features have greatest predictive ability as to whether a Web site is of good or ill repute.

In embodiments, a number of applications providing functions associated with the reputation of Web content are provided. The functions may, for example, involve Web reputation services such as a service to consumer or businesses providing information about the safety and trustworthiness of Web sites while they surf; controlling which programs are allowed to be downloaded or installed; controlling which Web sites are allowed to accept a user's credit card numbers or bank information; controlling which Web sites are allowed to accept a user's e-mail address or personal information; safe Web searches; filtering or ranking Web search results or directories in part by the safest of the matching sites; providing metadata about stores on commerce search sites and directories; or providing metadata about downloads on software distribution sites. The functions may, for example, further involve providing advertising services such as advertising network checking sites that wish to advertise so as not to advertise unsafe sites. The functions may, for example, further comprise Web filtering services such as using a proxy cache that uses reputation data to filter Web requests without any software on the desktop; parental control software to prevent children from visiting unsafe sites; and Zagat on the Web that guides a user to the best places and away from the worst. In some embodiments, the analysis facility 122 may also, or instead, reside on a client device and analyze and annotate sites or content within Web search results from the client side.

In embodiments, a number of reputation based products may be provided through the reputation service host 112. For example, the product may be a protection based program, which may be a software application that communicates with a reputation service and that protects a user from adware, risky e-commerce, fraud, and giving personal information to aggressive marketers (spammers and so forth). The service may warn a user before he does a dangerous thing. The protection service may automatically adjust browser security settings based upon the reputation of a destination Web site. This may disallow client scripting and other dangerous behaviors on sites with poor or unknown reputations without degrading trusted sites. The service may offer safe alternatives, such as providing a one-time e-mail address, using a virtual credit card number, and providing a safe alternative to a dangerous program. The service may collect user feedback to correct internal data, discover new sites/programs/Web forms, and collect data that cannot be automatically tested, such as the quality of customer service provided by a Web site. The service may provide parental control to allow a parent to restrict a child from visiting unsafe sites or installing unsafe software or giving out personal information to a site with a poor or unknown reputation.

In embodiments, the product offered through the reputation service host 112 may be a site investigator, which may be part of the reputation Web site service. This product may be an authoritative source of trust and reputation data associated with Web sites. The product may be embodied as a Web site that may allow a user to query the reputation of a Web site by name and receive, in return, a reputation report.

In embodiments, the product offered through the reputation service host 112 may be a fraud eliminator service, which may provide an anti-phishing toolbar that may utilize a heuristic, a black list, a white list, and/or user feedback to warn a user when he is on a fraudulent Web site offering. In another embodiment, the product offered through the reputation service host 112 may be safe search, which may be part of the Web site offering. The safe search service may involve a Web search that filter's search results (e.g. such as those obtained through Google or other search facilities) according to the reputation of the content returned in the search, thus providing a user with search results that contain only the results with known, good reputations. The safe search service may involve a Web search that identifies the reputation of sites, content, and the like received as the result of a search (e.g. through Google or other search facility).

The following examples are provided to illustrate certain user interactions along with associated reputation service examples. Presently, when a user browses to a photo upload site with a good reputation to upload his or her latest digital photos, a series of ActiveX controls may be presented for an optimal experience. However, by default on many versions of Windows, the user will be blocked from downloading these controls, or the user may be presented with an obtuse technical dialog box by Internet Explorer asking whether the control should be downloaded or not. Chances are the user may either not realize the controls were blocked or answer incorrectly or in a uniformed fashion when prompted to download them, resulting in a poor or sub-optimal experience. Later, the same user may notice a banner ad associated with another site offering information on where to find free music. The user clicks on the ads, only to suddenly be prompted with more questions about ActiveX controls. Again, the user needs technical knowledge in order to decide that these controls should probably not be downloaded since they are unknown controls from an unknown site. However, from the user's point of view, the last time the user was prompted about ActiveX controls at the photo site, things didn't work right if the controls weren't downloaded, so the user downloads the controls from the new site. In embodiments of the present invention, the user may be prompted with reputation information relating to the site to assist the user in making a more informed decision. Similar choices face a user who must understand the nuances of client-side scripting. When the user visits an e-commerce site and fills out an order form, JavaScript or other client-side technology is likely running the site's menus, checking the form contents for errors etc. In the systems described herein, a user may be prompted with reputation information during such interactions.

Websites may be classified by the system into one or more categories, such as adware distributor; aggressive marketer; risky e-Commerce site; fraudulent site; or the like. For example, a site may be certified in a category 'A' if its safety is validated based on various characteristics such as not being in one of the above-referenced categories; having been investigated through Dun & Bradstreet or Hoovers; having been checked against Better Business Bureau or BBBonline lists; having been manually validated by a person using appropriate criteria; or belonging to a publicly traded company. A site might be certified as safe to use based on the site having various other characteristics such as the site's popularity according to available reputation services, the site having been used and vouched for by a host of a reputation service (either through subjective or objective validation), a site having been around for at least a year, or a site having been tested using automated systems that did not trigger any warnings.

In embodiments, additional information may be provided to the user when visiting rated Web sites or interacting with content. The information may be a customer service phone number, information as to whether sales tax is charged in the user's state, the popularity of the site in its category, a summary of Google "chatter" about the site, or other information.

In embodiments, a site, a portion of a site, or content within a site may be deemed OK, signifying that the site that is not a bad site, with reference to, for example, a certification or automated analysis of content. In embodiments, a site, a portion of a site, or content within a site may be labeled "Unknown," signifying that the site that has not been analyzed.

In embodiments, a user may install a reputation service host 112 on a client 102, and, following the installation process, the user may be asked if he or she wishes to participate in an anonymous reporting program. The program may provide information to a reputation server 110 every time the client checks the reputation of a site or the user overrides a client warning. The information may be collected within the collection process facility 116, for example.

In embodiments, each piece of user submitted feedback (e.g. to the collection facility 116) may be tagged with some unique identification so that all of a user's feedback can be correlated and tracked. At the same time, each user may be assigned a score reflecting the accuracy of feedback from the user relative to other feedback, or relative to known reputation evaluations. In this manner, the system may track and appropriately weight user feedback that appears intended to alter reputation assessments for, e.g., promotional purposes.

Numerous types of user feedback may be collected. For example implicit or explicit feedback may be collected about new sites and programs that are discovered during browsing that are not already in a reputation database. As another example, implicit or explicit feedback may be collected when a user overrides a system-generated warning message and visits a site or downloads a program that is not recommended.

In embodiments, the reputation service host 112 UI may provide an interface element such as a drop down list which is always visible. When a user wishes to leave explicit feedback on a page, he or she may activate this interface element and select a rating. Each selection may represent a (non-exclusive) category for a current Web site, page, or content. Categories may include safe site, distributes adware, sends spam, risky e-commerce, fraudulent, or any other suitable categorization. The selection may take the form of a vote by the user that the site belongs in that category, which vote may be received and counted by a reputation service as described herein.

In one embodiment, users may be permitted to provide feedback through the collection facility 116 as many times as they like, however only one vote per category per user will be counted. A user may vote for multiple categories by selecting one first and then returning to select others. For example, the user may click on the Leave Feedback interface element and select Adware Distributor and then click again on the Leave Feedback interface element and select Email Spammer.

After one of the above categories has been selected, a window or message may be displayed thanking the user for the feedback. If the user indicated that the site was a risky e-commerce site, then the user is also given the opportunity to provide additional information about why the site is a risky e-commerce site. For example, the user may be provided with a choice among the following categories: customer service, return policy, shipping time, poor product quality, didn't receive product as advertised, or will shop again.

In embodiments, each user's vote may be weighted differently according to a user reputation system. The user reputation system may assign a weight to each user according to how trustworthy his or her votes are deemed to be.

In embodiments, users may have the ability to provide feedback, such as using the votes described above, about sites and content as well, and a reputation service host facility 112 may use this as a source of input for evaluating a reputation of the corresponding site. For example, users may vote about sites and programs as well as vote about very low level things like registry changes, additions/changes/deletions of files from system directories, attempts to open/communicate through particular network ports, etc. For example, the question may relate to whether an e-commerce site provided good customer service and delivered the product as advertised or whether the user received lots of pop up ads after a program was downloaded and installed. This information can be used to generate reputation information relating to the site as indicated herein.

Figure 6:
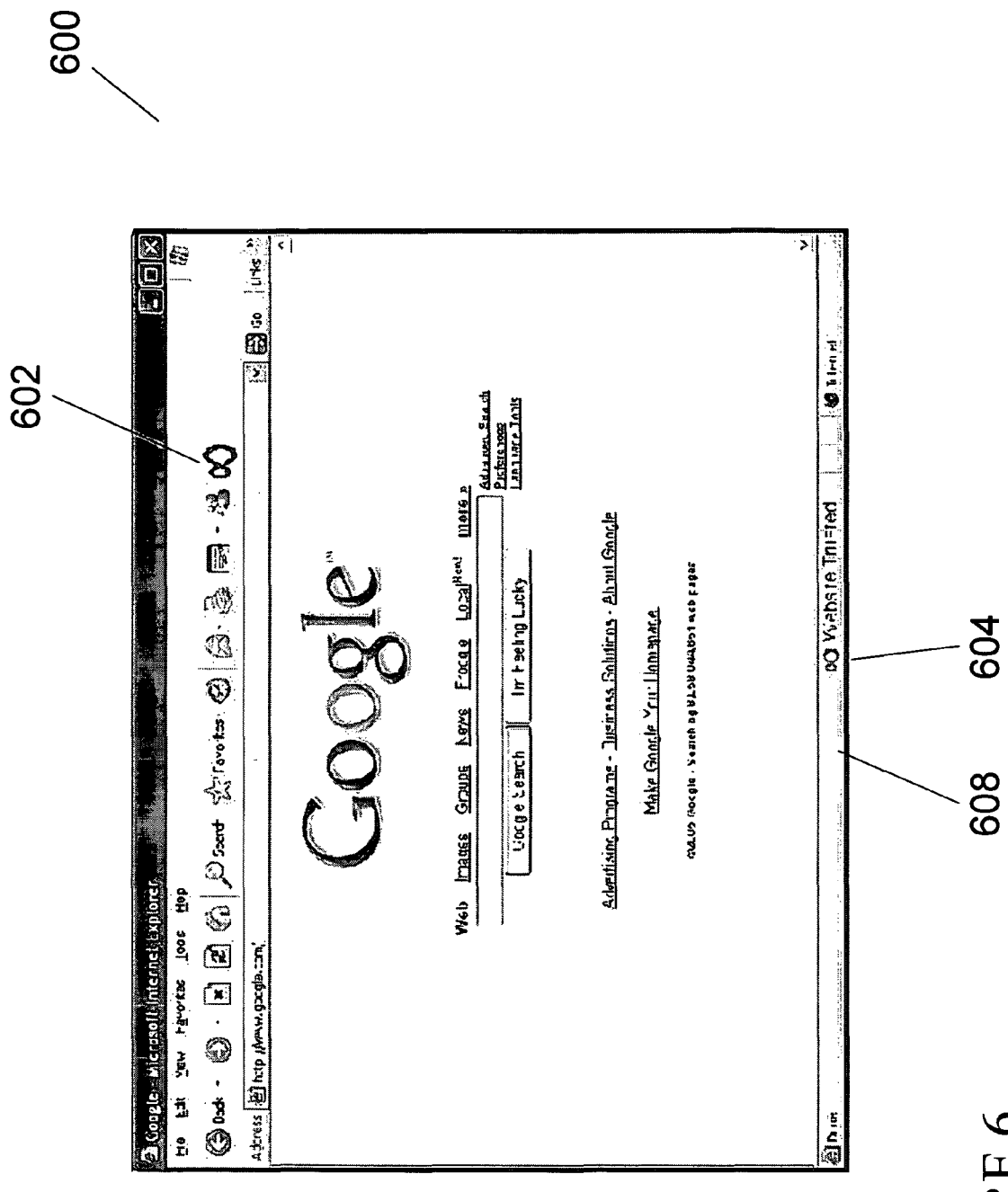
FIG. 6 illustrates a Web browser with a reputation toolbar button and status indicator.

FIG. 6 depicts Internet Explorer running in association with a reputation service host 112. In the embodiment of FIG. 6, the host 112 has added a new button 602 to the toolbar and uses the status bar 608 to tell the user the classification 604 of a current site.

In embodiments, pressing the toolbar reputation button 602 while on a page may bring up a menu offering including several options. Such page information may include an informational dialog window with a high level summary of the page and site trustworthiness. On the page will be a link to the reputation server 110 Website to get more detailed information about the page. Such information may be about title, version, date last updated and copyright; about links to help information on the reputation service Website; about feedback provided on the current site; about purchase options (e.g. if using the free version) the user may have regarding the reputation based Website associated with reputation server 110; or about options to configure preferences, such as (a) whether to provide feedback to a reputation service while using the product or (b) whether to view/edit warnings on sites while using a trial version.

Figure 7:
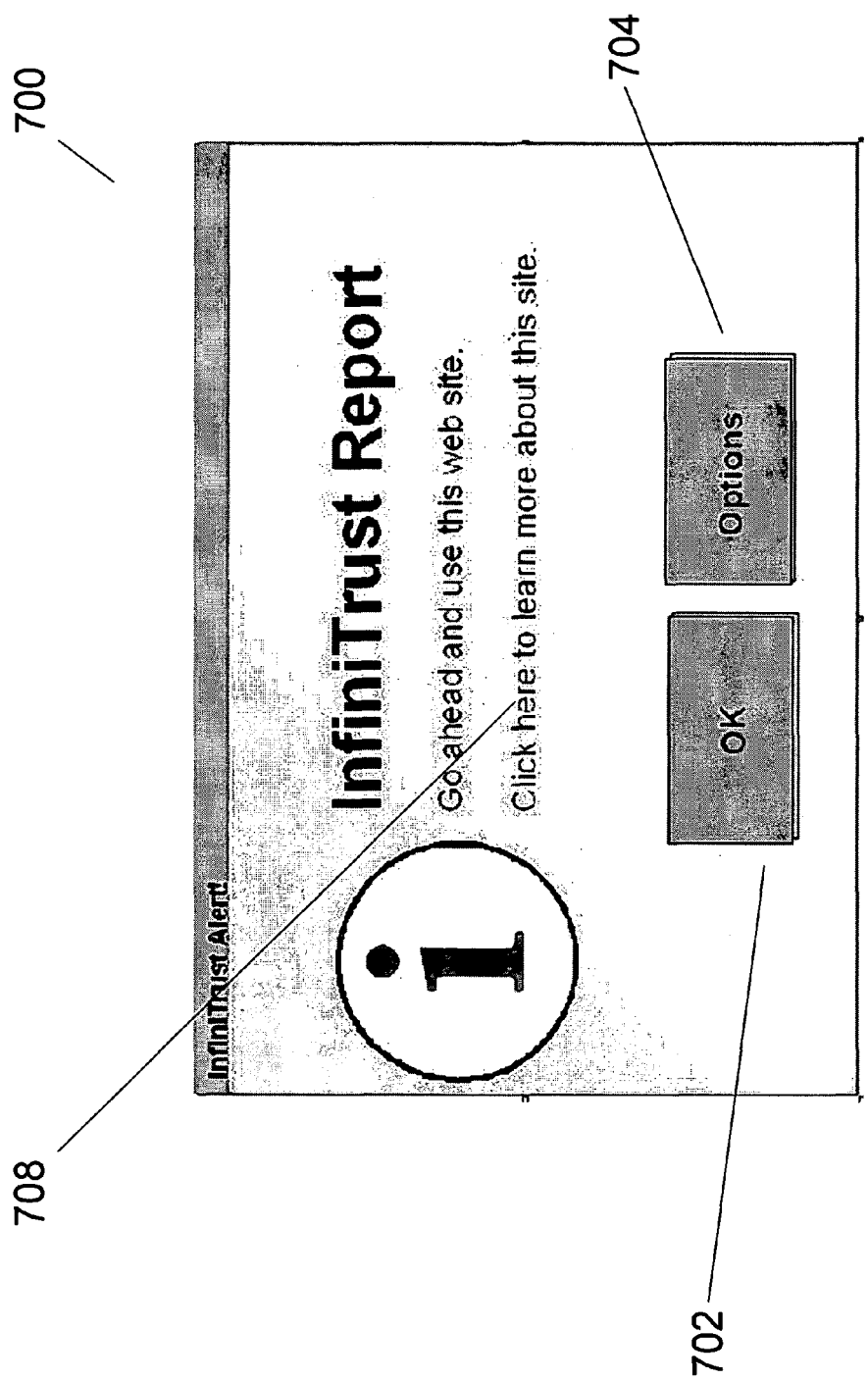
FIG. 7 illustrates an informational transaction message.

FIG. 7 depicts an informational window 700 that may appear as a result of pressing the reputation toolbar button 602. Users may click "OK" 702 to return to their Web page, "Options" 704 to configure the reputation service host 112, or "here" 708 to learn more about the site, which may take the user to a reputation Website on the reputation server 110.

In embodiments, the reputation service host 112 may bring up a warning dialog window, as opposed to the informational dialog described above, when it detects one of the following threats: a form on the page asks for the user's email address, and the host believes there is a high likelihood that the user's email address will be given to spammers; a form on the page requests a credit card number, bank account information, or social security number, and the host believes there is reason to be unsure about the reliability of the merchant; the user tries to download a program that the host believes contains spyware, adware, or other malware; the user attempts to visit a page that is believed to be a phishing site or have other reasons for poor reputation.

In embodiments, users may have the option of overriding a warning and proceeding with what they were trying to do. If users have opted into providing feedback, this override information is sent back to the reputation server as part of the collection facility process 116. Users may have the option of having the host 112 store the override decision, so that the same warning is not provided repetitively for an action the user has decided to take.

In embodiments, dialog boxes and pop ups may include links to help and/or additional information. Help may be in the form of links to the reputation Web site where up-to-date information may be provided. This may additionally encourage users to rely upon the Website as a resource for finding out about Web security threats.

Figure 8:
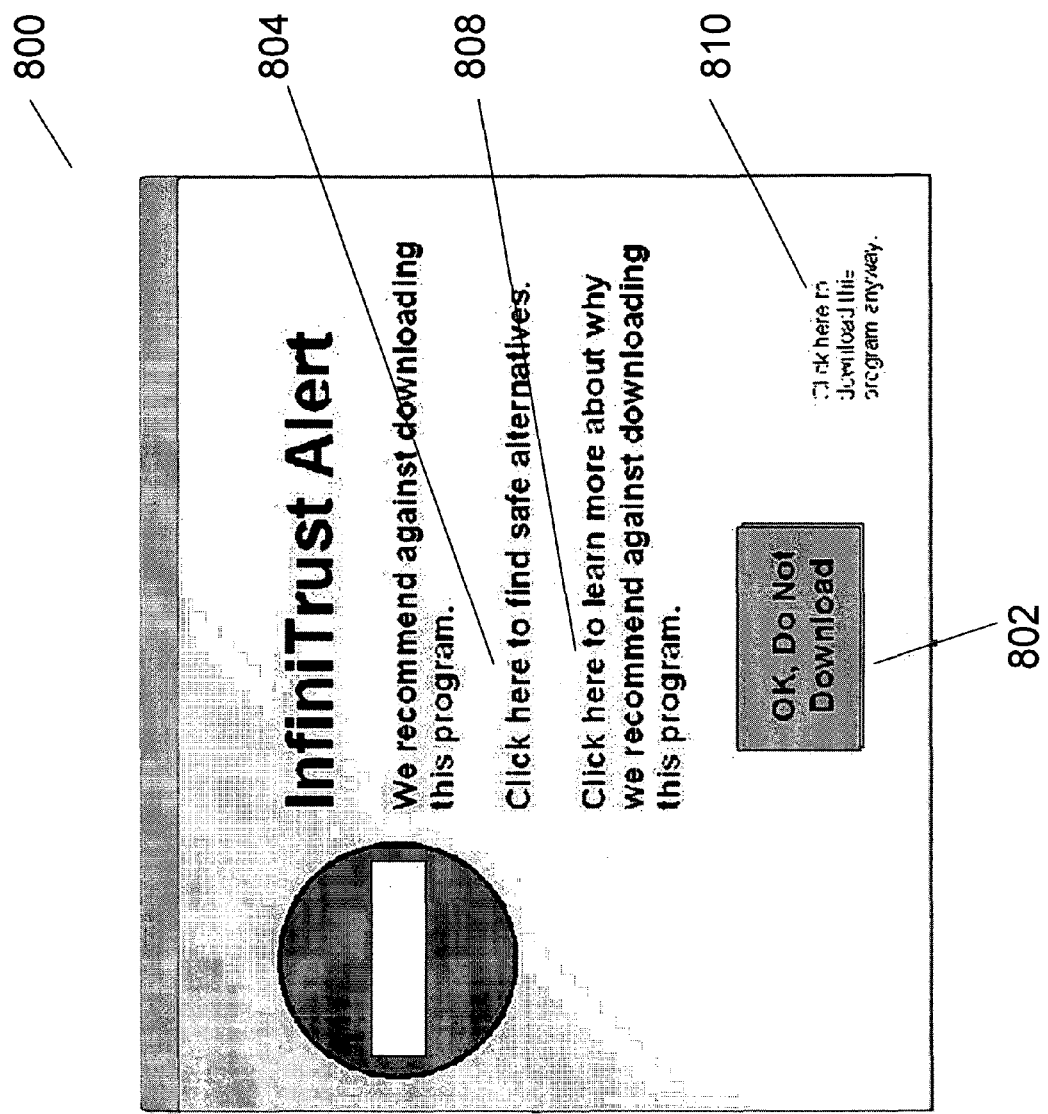
FIG. 8 illustrates a download transaction message.

FIG. 8 depicts a warning window 800 displayed by the reputation service host 112 in response to detecting a threat on the current Website. The user may be encouraged to not download the program by making the "Ok, do not download" button large, more specifically, larger than a corresponding "download" button. The user may click on links to learn more about alternatives, to learn more about the program, or to bypass the warning and download the program anyway 810.

In embodiments, the reputation service host 112 may place constantly varying levels of restriction on the different pages being loaded. In embodiments, when the host restricts access to a site, site portion, content, or the like, it will place a short notice to this effect somewhere in the browser window. This may serve as an unobtrusive visual reminder that the host is working in the background and provide a way for a user to override default reputation service choices by clicking on the notice or taking other action within the interface.

Figure 9:
FIG. 9 depicts a Web with a reputation information bar.

FIG. 9 depicts an automatic adjustment to permitted source operations in a browser of a client 102. A small notice 902 may be provided at the top of the page. Clicking on the notice 902 may allow the user to override the settings.

The reputation service host 112 may place an icon in a tool tray accessible through the user interface providing the browser. This icon may serve as a visual reminder to the user that the reputation service client is functioning. Clicking on the reputation icon may bring up a menu, such as the menu accessed through the toolbar button 602.

If the user is not able to access the reputation data service, then the client may still use any relevant cached reputation data. The client device may display a warning about unavailability of the reputation service before the user enters his or her email address or credit card number or downloads a program.

As discussed in connection with the override examples above, in embodiments a user may be able to override warnings from the reputation service host 112. In embodiments, they may override the following warnings: program downloads from adware sites; submitting email addresses to aggressive email marketers; submitting information to suspected phishing sites; or classification of the Website as Fraudulent/Phishing, Adware Distributor, Aggressive Email Marketer, or Risky E-Commerce. In embodiments, when users override one of these warnings, they may not be warned again in the future when they attempt the same action. The list of sites that have these warnings disabled may be deployed as a personal white-list for the user. It may consist for example of the top-level URL for the page and the type of warning that was purposely disabled for the site.

The reputation service host 112 may be deployed as a browser-independent software component. The software may periodically check the reputation server 110 for the presence of updates and by default transparently download and install them. This download and update process may be managed to avoid excessive use of CPU and/or network resources that might otherwise impact other client device activity. In embodiments, updates take effect immediately without having to restart programs or the computer. In other embodiments, the updates take effect on all subsequent instances of a browser load. In other embodiments, the updates may take effect following a reboot.

In embodiments, a database associated with the reputation server 110 will be consulted by the reputation service host 112 when Web pages are visited. The database may respond to a query with reputation information. For example, the database may respond to a query with the following three types of information: a severity code, domain metadata, and a display message. The severity code may specify whether the client should restrict browser settings or warn the user. If the client does warn the user, the display message may be shown. The display message may also be a message shown to a user when the user presses the toolbar button 602 during a visit to an OK or certified site. The domain metadata may be information about the domain, such as where the domain is located in the world, how long the domain has been registered, an owner of the domain, etc.

In addition to, or instead of, checking URLs against the database, the reputation service host may check Web pages with locally run heuristics. When a heuristic identifies a potential reputation issue, it may produce a Severity Code and Display Message as well. Heuristics may be changed from time to time, and client updates may be provided on an automated, manual, or scheduled basis.

A single Web page may consist of numerous objects named by URLs. Each of these URLs may be looked up in a reputation database through the reputation service host 112. The behavior of the client, or interactions with the site or content, may be based on the least-trusted security code of any of the objects on the page or heuristics which matched on the page, for example.

Some sites issue HTTP redirections to other sites. If this is the case, the client may ignore the URL of the site issuing the redirect (unless the site to which the user is being redirected is classified as Unknown, in which case the classification of the site issuing the redirect should be used). If multiple levels of redirects are used, the client may use the classification of the most recent non-unknown site in the redirection chain. In this manner the reputation service may avoid false positives for sites like tinyURL or advertisement click through sites that use redirects without controlling the content of the sites to which they are redirecting.

In embodiments, severity codes may be presented in categories. For example, they may be categorized as (a) informational: the site is either classified as Unknown, OK, or Certified, in which case no warning action is to be taken by the reputation service host 112; (b) warning: the site is classified as Adware, Aggressive Marketing, or Risky E-Commerce, and the reputation service host 112 should show a warning bar on the browser to alert the user; or (c) critical: the site is classified as Fraudulent, and the browser should not load any more of the current page, and a clear dialog should present a corresponding display message and attempt to keep users from continuing doing what they were doing.

In embodiments, systems and methods are provided for warning users against shopping on risky e-commerce sites. In embodiments, risky e-commerce may be assessed by looking at many factors about the e-commerce Website (e.g. where it is located, how long in business, whether it is endorsed by third parties like the BBB, etc.).

In embodiments, user feedback (e.g. provided through the collection facility 116) may be used to correct, update, or otherwise modify system data. User feedback may also or instead by used to collect data that cannot be collected automatically, such as whether a business sent a product as advertised on or ordered from the site. In embodiments, the system also provides users with an override of the system classifications (e.g. effectively say "no, this is not an adware distribution site") and the ability to comment on e-commerce sites. There may be a user reputation system that allows the assignment of a reputation to each user to gain an understanding or prediction on how much to trust the user. The user reputation system may build a reputation based on how many things users comment on, how frequently a user tries to override things that are known to be true (versus things that are only believed to be true and therefore may be wrong), etc.

An aspect of the present invention relates to systems and methods for presenting information relating to the reputation of a Website based at least in part on the practices of the Website, Website owner, Website affiliates, or a party related to the Website. In embodiments, systems and methods involve presenting indicia of a Website's reputation to a user attempting to interact with the Website, wherein the reputation is at least in part based on practices associated with the Website. The practices may relate to the treatment of personal information. The treatment may be based, at least in part, on a historical treatment of personal information, reputation of personal information treatment, and a policy related to the treatment of personal information. In embodiments, the presentation of the indicia may be made at a time when the user is attempting to load personal information, when there is a place on the site to load personal information, or following the loading of personal information into the site or Web form.

In embodiments, systems and methods involve presenting indicia of a Website's reputation (e.g. through a reputation service host 112 as described in connection with FIG. 1) to a user attempting to interact with the Website, wherein the reputation is at least in part based on practices associated with the Website. The practices may relate to the Website's reputation, actual performance, perceived performance, or other indicia related to the site's downloading of undesirable, unintended, or otherwise unwanted content. The unwanted content may include, for example, spyware, information not indicated or identified by the Website, information not overtly indicated or identified by the Website, information hidden on the Website, harmful software, malware, inappropriate content, downloadable file(s), a program, HTLM, ActiveX, an executable file, JavaScript, VBScript, Flash, Java, or other such content.

In embodiments, systems and methods involve presenting indicia of a Website's reputation (e.g. through a reputation service host 112 as described in connection with FIG. 1) to a user attempting to interact with the Website, wherein the reputation is at least in part based on practices associated with the Website. The practices may relate to misdirecting users. The misdirection may be based, at least in part, on a trade address, trademark, service mark, service, product, graphics, text, video, a similar URL, or other such information used to misdirect users. For example, a Website with a poor reputation may steal text or graphics from a legitimate site and pass them off to be their own, or such a site may choose a URL that is similar to another's URL to misdirect the Web traffic to their site.

In embodiments, systems and methods involve presenting indicia of a Website's reputation (e.g. through a reputation service host 112 as described in connection with FIG. 1) to a user attempting to interact with the Website, wherein the reputation is at least in part based on practices associated with the Website. The practices may relate to a corporate reputation of a business associated with the Website. For example, the corporate reputation may be based, at least in part, on the corporate address, how long the company has been in existence, how long the Website has been in existence, whether they have an IP address in a range of addresses with a poor reputation, existence of a trademark, whether they are a spammer, popularity rank, better business bureau rating, ranking of the corporation (based on existence within Fortune 1000, Fortune 500, Fortune 100, Fortune 50, Fortune 10), or other corporate information. The corporate reputation may be based, at least in part, on two or more of the following pieces of corporate information: corporate address, how long the company has been in existence, how long the Website has been in existence, whether they have an IP address in a range of addresses with a poor reputation, existence of a trademark, whether they are a spammer, popularity rank, better business bureau rating, and ranking of the corporation (based on existence within Fortune 1000, Fortune 500, Fortune 100, Fortune 50, and Fortune 10). The corporate reputation may be based, at least in part, on a plurality factors including one or more of the following or any combination of the following: corporate address, how long the company has been in existence, how long the Website has been in existence, whether they have an IP address in a range of addresses with a poor reputation, existence of a trademark, whether they are a spammer, popularity rank, better business bureau rating, and ranking of the corporation (based on existence within Fortune 1000, Fortune 500, Fortune 100, Fortune 50, and Fortune 10).

In embodiments, systems and methods involve presenting indicia of a Website's reputation (e.g. through a reputation service host 112 as described in connection with FIG. 1) to a user attempting to interact with the Website, wherein the reputation is at least in part based on practices associated with the Website. In embodiments, the practices relate to providing misleading information on the Website. The misleading information may involve providing a false phone number, false address, false corporate ownership information, or other false, misleading, or temporary information. In embodiments, the practices relate to a date of establishing the Website, a date of establishing a corporation associated with the Website, the location of the corporation, location of the server servicing the Website, or other such information.

In embodiments, a Website's reputation may be assessed based on how a phone number is presented on the Website. For example, a phone number may be listed on a Website, and the phone number may misrepresent what, where, or who will be contacted if the number is called.

An aspect of the present invention relates to systems and methods of assessing the reputation of a Website (e.g. through an analysis facility 122 as described in connection with FIG. 1) based on unwanted practices associated with the Website. In embodiments, the systems and methods involve assessing a Website's reputation, wherein the reputation is at least in part based on practices associated with the Website. The practices may relate to the treatment of personal information by the Website, Website affiliates, owners of the Website, or other parties or entities associated with the Website. The treatment may be associated with a historical treatment of personal information. The collection of the treatment information may be done empirically or otherwise evaluated, estimated, or projected. The assessment may be based, at least in part, on a policy related to the treatment of personal information. The presentation of the reputation and or indicia of the reputation may be made at a time when the user is attempting to load personal information, when the Website is presented, following the loading of the personal information, or at another point in the process.

In embodiments, the practices relate to the downloading of unwanted content through or from the Website and or protecting a client 102 from accepting such download. The unwanted content may include spyware, information not indicated by the Website, harmful software, malware, unexpected content, a downloadable file, a program, HTLM, ActiveX, an executable file, JavaScript, VBScript, Flash, Java, or other such content.

In embodiments, systems and methods involve presenting indicia of a Website's reputation (e.g. through a reputation service host 112 as described in connection with FIG. 1) to a user attempting to interact with the Website, wherein the reputation is at least in part based on practices associated with the Website. The practices may relate to misdirecting users. The misdirection may be based, at least in part, on a trade address, a trademark, a service mark, a service, a product, graphics, text, video, a similar URL, or other such information used to misdirect users. For example, a Website with a poor reputation may steal text or graphics from a legitimate site and pass them off to be their own, or such a site may choose a URL that is similar to another's URL to misdirect the Web traffic to their site.

In embodiments, systems and methods involve presenting indicia of a Website's reputation (e.g. through a reputation service host 112 as described in connection with FIG. 1) to a user attempting to interact with the Website, wherein the reputation is at least in part based on practices associated with the Website. The practices may relate to a corporate reputation of a business associated with the Website. For example, the corporate reputation may be based, at least in part, on the corporate address, how long the company has been in existence, how long the Website has been in existence, whether they have an IP address in a range of addresses with a poor reputation, existence of a trademark, whether they are a spammer, popularity rank, better business bureau rating, ranking of the corporation (based on existence within Fortune 1000, Fortune 500, Fortune 100, Fortune 50, Fortune 10), or other corporate information. The corporate reputation may be based, at least in part, on two or more of the following pieces of corporate information: corporate address, how long the company has been in existence, how long the Website has been in existence, whether they have an IP address in a range of addresses with a poor reputation, existence of a trademark, whether they are a spammer, popularity rank, better business bureau rating, and ranking of the corporation (based on existence within Fortune 1000, Fortune 500, Fortune 100, Fortune 50, and Fortune 10). The corporate reputation may be based, at least in part, on a plurality factors including one or more of the following or any combination of the following: corporate address, how long the company has been in existence, how long the Website has been in existence, whether they have an IP address in a range of addresses with a poor reputation, existence of a trademark, whether they are a spammer, popularity rank, better business bureau rating, and ranking of the corporation (based on existence within Fortune 1000, Fortune 500, Fortune 100, Fortune 50, and Fortune 10).

In embodiments, systems and methods involve presenting indicia of a Website's reputation (e.g. through a reputation service host 112 as described in connection with FIG. 1) to a user attempting to interact with the Website, wherein the reputation is at least in part based on practices associated with the Website. In embodiments, the practices relate to providing misleading information on the Website. The misleading information may involve providing a false phone number, false address, false corporate ownership information or other false, misleading, or temporary information. In embodiments, the practices relate to a date of establishing the Website, a date of establishing a corporation associated with the Website, the location of the corporation, location of the server servicing the Website, or other such information.

In embodiments, a Website's reputation may be assessed based on how a phone number is presented on the Website. For example, a phone number may be listed on a Website, and the phone number may misrepresent what, where, or who will be contacted if the number is called.

An aspect of the present invention relates to the presentation and or assessment of a Website's reputation (e.g. through a reputation service host 112 as described in connection with FIG. 1) based on the Website's treatment of personal information. Systems and methods may involve presenting indicia of a Website's reputation to a user attempting to interact with the Website, wherein the reputation is at least in part based on treatment of personal information by the Website. The systems and methods may also involve assessing the reputation of the Website. In embodiments, the interaction may involve accessing the Website, loading personal information into the Website, following the loading of personal information, or otherwise interacting with the Website.

In embodiments the personal information may involve one or more or a combination of the following: name, address, phone number, social security number, portion of social security number, credit card number, bank number, pin, mother's maiden name, spouse's name, license number, immigration information, purchase information, username, site user name, mortgage amount, car loan amount, loan amount, income, or other personal information.

In embodiments, and as indicated in connection with FIG. 2, the step of presenting indicia of the reputation occurs when a user attempts to engage in an interaction, after an interaction with a Website, when a Website is accessed, or when a user attempts to access a Website. In embodiments, the interaction involves entering personal information. The interaction may be a false interaction, or the interaction may be a preliminary interaction. The preliminary interaction may involve a perceived interaction wherein the user perceives there was an interaction with the Website, and the interaction was with a reputation service. The reputation service may present an indication of reputation to the user prior to allowing the interaction with the Website to proceed.

An aspect of the present invention relates to presenting Website reputation information, or indicia of such reputation, at the time of an interaction or attempted interaction. In embodiments, the systems and methods may involve presenting indicia of a Website's reputation to a user attempting to interact with the Website, where the act of presenting the indicia follows the user's attempted interaction. The method may further involve assessing the reputation. The user may be prevented from interacting with the Website. In embodiments, the user may be permitted to interact with the Website following an interaction with a reputation acknowledgement. The presentation may involve presenting an indication within the GUI associated with the Webpage. The user may be permitted to continue to interact with the Webpage.

In embodiments, the presentation of the indicia follows the interaction. The interaction may be a preliminary interaction or a false interaction. The user may proceed with a real interaction following interaction with a reputation indication window.

In embodiments, the step of presenting reputation information may involve presenting audio information and or visual information. The presentation may involve presenting a warning of a poor reputation, a warning of an unknown reputation, an indication of a good reputation, or other presentation of information.

In embodiments, the presentation of reputation information may be provided to a user through a mobile communication facility, mobile Web facility, desktop facility, laptop facility, PDA, cell phone, or other computing facility or client device.

In embodiments, the presentation of reputation information involves presenting varying degrees of warnings depending on the step of interaction. For example, the information may be presented in an increasingly vocal manner as the user gets closer and closer to committing the dangerous act (ranging from a mild warning when the user first accesses the site to a scream if the user hits the "submit" button to send info to a bad site).

In embodiments, alternatives may be presented at the time of the interaction (e.g. through a recommendation facility 130 as described in connection with FIG. 1) where alternatives may be other programs, other Websites, alternative personal information (e.g. a unique email address or credit card number just for this site), or the like.

An aspect of the present invention relates to the warning about unwanted content during, prior to, or following a Website interaction. Systems and methods may involve presenting indicia of a Website's reputation to a user attempting to interact with the Website, wherein the Website includes unwanted content. In embodiments, the systems and methods further involve assessing the reputation.

In embodiments, the unwanted content may include spyware, information not indicated or identified by the Website, information not overtly indicated or identified by the Website, information hidden on the Website, harmful software, malware, inappropriate content, downloadable file(s), a program, HTLM, ActiveX, an executable file, JavaScript, VBScript, Flash, Java, or other such content.

An aspect of the present invention relates to the warning about unwanted content during, prior to, or following a Website interaction. Systems and methods may involve presenting indicia of a Website's reputation to a user attempting to interact with the Website, wherein the Website includes unwanted content. In embodiments, the systems and methods may involve presenting alternatives.

An aspect of the present invention involves warning of a decoy site (e.g. through a reputation service host 112 as described in connection with FIG. 1) and or presenting alternatives to a site (e.g. through a recommendation facility 130 as described in connection with FIG. 1). Systems and methods may involve presenting indicia of a decoy Website's reputation to a user attempting to interact with the decoy Website following the attempted interaction. The method may further involve assessing the reputation. The decoy Website may include services similar to those of a target Website the user intended to visit. The decoy Website may include trademarks similar to those of a target Website the user intended to visit. The systems and methods may further involve presenting the user with an alternative Website recommendation. The alternative Website may have an acceptable reputation. The alternative Website may include a plurality of Websites. The alternative Website may involve a trademark owner's Website, an official corporate Website, has been validated.

An aspect of the present invention relates to presenting alternative Websites (e.g. through a recommendation facility 130 as described in connection with FIG. 1). Systems and methods may involve presenting indicia of a Website's reputation to a user attempting to interact with the Website, wherein the user is further presented with at least one alternative Website or program as a result of the attempted interaction. The systems and methods may further involve assessing the reputation. In embodiments, the presentation of alternatives may involve presenting a unique email address, message identifier, screen name, user identification, credit card number for a single use, credit card number for use on the site, or other alternatives designed to protect the user.

An aspect of the present invention relates to assessing and or presenting Website reputation information (e.g. through a reputation service host 112 as described in connection with FIG. 1) based on domain metadata. In embodiments, the systems and methods may involve presenting indicia of a Website's reputation to a user attempting to interact with the Website, wherein the reputation is based at least in part on the corporate reputation of a business associated with the Website. The corporate reputation may be based at least in part on one or more of the following: the corporate address, how long the company has been in existence, how long the Website has been in existence, whether they have an IP address in a range of addresses with a poor reputation, existence of a trademark, whether they are a spammer, popularity rank, better business bureau rating, and ranking of the corporation (based on existence within Fortune 1000, Fortune 500, Fortune 100, Fortune 50, and Fortune 10). The corporate reputation may be based at least in part on two or more of the following: the corporate address, how long the company has been in existence, how long the Website has been in existence, whether they have an IP address in a range of addresses with a poor reputation, existence of a trademark, whether they are a spammer, popularity rank, better business bureau rating, and ranking of the corporation (based on existence within Fortune 1000, Fortune 500, Fortune 100, Fortune 50, and Fortune 10). The corporate reputation may be based at least in part on a plurality of factors including the corporate address, how long the company has been in existence, how long the Website has been in existence, whether they have an IP address in a range of addresses with a poor reputation, existence of a trademark, whether they are a spammer, popularity rank, better business bureau rating, and ranking of the corporation (based on existence within Fortune 1000, Fortune 500, Fortune 100, Fortune 50, and Fortune 10).

An aspect of the present invention relates to presenting and or assessing reputation information (e.g. through a reputation service host 112 as described in connection with FIG. 1) based on a Website's content. In embodiments, the systems and methods may involve presenting indicia of a Website's reputation to a user attempting to interact with the Website, wherein the reputation is based at least in part on content in the Website. The method may further involve assessing the reputation. The content may include an address, an email address, a physical address, a corporate address, a personal address, a phone number, contact information, an indication as to how long the site has existed, where the Website is hosted, a corporate location, an IP address, a range of IP addresses, where the IP address fits within a range of IP addresses, whether the site requests personal information, and the location on the site where the personal information is requested.

An aspect of the present invention relates to assessing and or presenting reputation information (e.g. through a reputation service host 112 as described in connection with FIG. 1) based on a link structure associated with the site. In embodiments, the systems and methods may involve presenting indicia of a source Website's reputation to a user attempting to interact with the source Website, wherein the reputation is at least in part based on reputation of at least one linked Website linked to the source Website. The systems and methods may further involve assessing the reputation. The reputation may be considered acceptable when a substantial portion of the linked Websites have acceptable reputations. The reputation may be considered poor when the sites to which it links or which link to it have poor reputations. For example, the Website may link to other sites, or the Website of concern may link to other sites, and the reputation may be based on these links. By way of another example, if Website A points to Website B and Website B points to Website C, the systems and methods may still consider A linked to C for purposes of analysis. The link structure analysis may iterate over several levels of linking. Also, the assessment may involve assessing where within the content the links occurs. For example, if the link occurs within a user comment section of a site (e.g. Amazon.com user book reviews), the assessment may be different from that of a link that resides within the content of other areas of the site (e.g. corporate generated sections).

Aspects of the present invention relate to Web reputation services. A Web reputation service may calculate and make available a reputation of Websites, programs, Web forms, and other entities found on the Internet so that users can make informed decisions about whether to use those Websites, programs, Web forms, etc.

In embodiments, the systems and methods are employed in a software application that runs on a user's computer (e.g. a portion of a reputation service host 112 as described in connection with FIG. 1) and retrieves reputation data from reputation information servers 110 for each Website the user visits. The software application may provide warnings before a user uses a low reputation Website, program, or Web form. The software may also offer alternatives such as safer Websites and programs, unique email addresses to enter sites that request email addresses, and virtual credit card numbers to use when shopping online. A Web reputation system may warn users as soon as they arrive at a site that only exists to engage in dangerous behavior. For Web sites that offer legitimate as well as non-legitimate uses, a reputation system may warn users before they download a low reputation program, fill in or submit a low reputation Web form, etc.

Increasingly low reputation Web sites are discovered by users through search engines. Embodiments of the present invention involve safe search software that may provide the capabilities of traditional Web search, including the normal ranking algorithms used, but with sites with low reputation filtered out or ranked lower than sites with higher reputations. Alternatively, low reputation sites may be left in the listings but colored differently so as to alert the user that they are low reputation sites. In embodiments, the reputation functions may be adapted to augment a search facility (e.g. Google.com).

In embodiments, network proxies can also incorporate reputation data to either completely filter out requests to low reputation sites, to strip low reputation sites of their dangerous content automatically, or to modify the appearance of low reputation Websites to mark them for the user as low reputation. These network proxies could run as a software application on the user's computer, on the user's home network, in the user's service provider network, or in an enterprise network.

An aspect of the present invention relates to automatically testing downloads and tests programs from the Internet (e.g. through an analysis facility 122 as described in connection with FIG. 1). Programs may be discovered through a variety of mechanisms including Web crawls. Each program may first be installed, which frequently means that installation wizards must be automated and then the system checked to see if the installation succeeded. If the installation did succeed, then the system should be tested to determine the safety of the software just installed.

Programs may be tested in virtual machines that run just like they were a real physical computer, but instead are programs. Each physical machine can thus run several virtual machines each time, starting them from known starting points. This allows multiple programs to each be installed and tested from a clean slate very quickly.

Programs may be identified by the URLs they are found under on the Internet and also through checksums or hash codes of their contents. Additionally, in embodiments, checksums or hash codes of prefixes of the programs may also be used to identify a program as a likely bad program even before the entire program has been downloaded.

Embodiments of the present invention involve interaction with automatically downloaded installations and the like. Automating installation "wizards" may require detecting which buttons to press in dialog boxes that may cause the installation to succeed. In embodiments, this may use heuristics such as looking for certain buttons and pressing the buttons (e.g. "Next" or "Yes"), looking for buttons in a preferred order, or detecting if the installation program is busy.

In embodiments, different buttons in a preferred order may have different probabilities for causing the installation to succeed. For example, hitting a "Next" button in a program may cause the installation to proceed; but in rare programs, a button named "Next" may cause the installation to not proceed. In embodiments, a button labeled "Yes" may frequently cause the installation to proceed; occasionally a button labeled "Yes" may cause a setup program to terminate without installing the software.

In embodiments, detecting if the installation program is busy doing work may require the installation to not press any buttons and wait for the work to be complete In embodiments, pressing a button when the installation program is busy may frequently be used to cancel the operations.

In embodiments, not all programs can be automatically installed. Programs that fail to automatically install and be restarted may be manually installed by a person.

In embodiments, it may be difficult to determine if an installation succeeded. For example, there may often be several phases of installation involved; the final buttons of an installation may not be recognizable as a finish installation button (e.g. "Finish" or "End").

In embodiments, a system or method may involve using the heuristics to determine if the installation succeeded; for example, new executable files or libraries may be installed onto the system in places other than system temporary directories, new links may be put on the desktop or start menu, new registry entries may be created with newly registered libraries or with entries to start programs at run time, new processes may be running that were not running when the installation started, or the like.

An aspect of the present invention may relate to checking for problems following a download. For example, after a program has successfully been installed, the system may be checked to see if anything malicious or dangerous has been installed on the system. In embodiments, the reputation service host 112 may detect the reputation of the source of the download and may initiate investigations relating to the download. In embodiments, a system or method may involve checking, using heuristics such as check for network connections on a test system, and in particular check for connections to remote systems that are known advertising servers. It may check for installation of Internet Explorer browser helper objects/toolbars/extensions, check for processes that may be started automatically on system boot, check for software that may change settings to lower system security levels so that further software can later be installed without the user's knowledge, check for on-disk and in-memory signatures of known malware software, check the End User License Agreement that the software displays for evidence that the software displays advertisements, monitor the user's Web surfing or similar behaviors, check how many pop up windows are opened when simulated users use the computer, check whether attempts to use popular search engines such as Google or Yahoo are intercepted and alternative search results presented, check whether the programs installed are on lists of known adware, check whether clicking on pop up window's content leads to known ad serving networks, or the like.

In embodiments, the simulated user may open Web browsers and do things known to trigger adware, such as using finance sites, gambling sites, travel sites, search engines, or the like.

In embodiments, when a user attempts to access a program that is deemed unsafe, a set of alternatives may be presented that perform a function similar to that of the unsafe program but without the safety issues. In embodiments, this may be accomplished by using category information from sources such as the DMOZ/Open Directory Project, Yahoo, categorization data from software download aggregators (e.g. download.com or twocows.com), or the like.

In embodiments, when a dangerous program is detected, the category of that program may be searched to find other similar programs (e.g. similar programs within the program category). Those other programs may be ranked by popularity and safety to find popular safe alternatives to recommend to the user.

ActiveX is a Microsoft technology for enabling Websites to execute client side code in the context of Internet Explorer. In embodiments, ActiveX code may perform arbitrary system operations and therefore may be dangerous technology if it allows arbitrary Web sites to operate. In embodiments, ActiveX may frequently be used to install adware software on to unsuspecting Web site visitor's computers. Many legitimate Web sites may also use ActiveX to overcome the limitations of HTML. For example, photo Web sites may frequently use ActiveX to provide a photo upload capability for their users.

In embodiments, the author of the ActiveX control may frequently be different from the operator of the Website containing the ActiveX code. For example, many legitimate Websites may use Macromedia's Flash ActiveX control to render video-like advertisements; malicious Websites may find bugs in ActiveX controls written by trusted companies, such as Microsoft, that may allow the otherwise trusted ActiveX control to be tricked into doing malicious processes.

Embodiments of the present invention may involve requiring the reputation of the Website using the ActiveX control and the reputation of the author of the ActiveX control both to be good in order for the ActiveX control to run or a reputation service host 112 may warn the user about such. This may be different from existing technology that may allow the user to either always run the ActiveX, never run the ActiveX, or query the user on a case-by-case basis as to whether the ActiveX control should run (the user may not know the answer to this question). Active scripting, and other technologies involving delivery of executable content to a client device may be similarly conditionally authorized by a reputation service as described herein.

Many Websites request personal information about users such as their name, email address, social security number, or the like. In embodiments, systems and methods may involve detecting Websites that request personal information by registering on them and detecting how they use the personal information provided. A reputation service host 112 may also look for characteristics of the Website to determine if it is probable that the site's only reason for existence may be to collect personal information. Such heuristics may include looking for sites with very few pages, which may indicate there may be very little content on the site; looking for sites that may request personal information on their first page instead of having these requests deeper within the site; and looking for sites that request significant amounts of personal information (e.g. social security numbers, address, and phone number). There may be standards in the direct marketing industry about which pieces of information need to be collected, and detecting sites that collect these pieces of information may be useful.

In embodiments, sites that request personal information, and in particular sites that request email addresses, may be detected (e.g. by a reputation service host 112), and this information may be filled in either through a manual work flow or an automated process. In embodiments, the email address used may be a unique address that may only be given to a single site and which may be sufficiently long and random as to be un-guessable by spammers that try to guess email addresses. Therefore, any email received by this address may be very highly likely to have been sent by the site that this address was registered on.

In embodiments, mail received at each address so registered may be assigned a score as to how likely that email may be unwanted spam. For example, each site's score may be computed based on the number of emails received to the unique address and the spam score of each message. In embodiments, sites that receive a high score may be aggressively using the personal information entered.

Sometimes it may be difficult to detect that a Website has a form on it that collects email or other personal information or to detect where that information may be sent because the Webpage uses JavaScript or other client side scripting. In embodiments, the page may actually load and execute in an environment that emulates a Web browser. The OnSubmit and other related events may need to be fired to cause the code in the Webpage to actually run. The page may be monitored while the code is running to see what forms are generated and where the information is sent.

In embodiments, when a user encounters a form on a site that may aggressively use email addresses entered on it, the reputation service host 112 (e.g. through a recommendation facility 130) may offer to create another unique email address just for that user to use on the Website. Email sent to this unique email address may be forwarded on to the user's actual email account. Then, if the site aggressively emails the user or sells the user's email address, the user may easily disable just that one unique address and stop receiving the email.

In embodiments, the provider of the reputation information may benefit by being able to scan each email message that passes through for spam as described above and thus may be able to analyze sites that collect email addresses that were not known about or with which the provider was not able to register.

It may be relatively difficult to determine solely on the basis of end-user experience whether shopping on a Website is safe. It may be easy to create professional looking sites, and there may be few other cues to guide users as to whether they should feel safe on the site or not. The potential threats from dangerous sites may range from outright fraud and theft of personal and financial information to more mundane problems such as poor customer service and onerous return policies.

In embodiments, systems and methods may involve providing a warning on sites that may be deemed high risk for e-commerce. This may not be based on actual direct testing of the Website, which may entail making purchases from each Website. Instead, in embodiments, the system may analyze indirect information to come to conclusions about the likelihood that an e-commerce site should be used or avoided.

Embodiments of the present invention may involve machine learning. Machine learning may provide a means to take a large collection of input information called features— such as the words on a Web page, where the site is hosted in the world—about Websites and collections of known good and bad sites and then determine the relevancy of the features in predicting whether a site is good or bad. Specifically, in certain embodiments, weights assigned to each feature may determine whether a site is a good site or a bad site as computed based on the training data of known sites. Then, as new sites may be found, the features for that site may be computed and then weighted to decide if the new site may likely be good or bad, based on the machine learning algorithm's experiences with the training data.

In embodiments, features collected from Websites (e.g. through a collection facility 116) that may provide an indication of reputation may include the set of words on the site; the set of images on the site; geographic location of the site; length of time the domain for the site has been registered; age of the site; what ISP is hosting the site; whether the site is hosted as part of the ISP reserved for consumer PCs or business PCs; whether the site uses SSL to protect transactions; the numbers of pages on the site, of links off the site, of links on the site, and of scripts present on the site; the set of all ActiveX controls' used by the site; whether the site loads client side JavaScript or other scripting code from other domains; whether the site automatically redirects visitors to other sites; whether the site requests personal information such as email address, name, address, phone number, etc., on the first page users visit on the site; whether the site advertises on other Websites; whether the site advertises through spain messages; whether the site advertises through adware programs; which SSL certificate vendor is used; whether the site has a domain name and, if so, how long it is registered for and whether it was registered using a third party registration service that obscures the identity of the actual owner; or the like.

Embodiments of the present invention may use and/or interact with information that may be collected and/or made available through other reputation sites and facilities. For example, a reputation facility, according to the principles of the present invention, may receive information from Better Business Bureau online (or book form of such information), TrustE, P3P, Hackersafe certification, Fortune 1000, Hoovers, D&B, Yellow Pages, DMOZ/The Open Directory Project, Yahoo, credit card certified online merchants, or the like.

Embodiments of the present invention may involve receiving user feedback through a collection facility 116. Users may have chosen to do business with an establishment that may possess good data on the reputation of the business. User feedback may allow individual end users to vote as to whether an e-commerce site is good or, if not, why it's not. Individual users may have a reputation themselves that determines how heavily their vote counts. The longer a user has been around, the more sites voted on, and the greater the breadth of categories of sites that a user votes on, the higher that user's vote may be weighted.

Embodiments of the present invention may involve virtual credit card numbers. When a user is requested to enter a credit card by a suspect e-commerce site, a recommendation facility 130 may provide a virtual credit card number to use. A virtual credit card number may be a valid credit card number linked to the user's actual credit card number, but with restrictions placed on it such as the length of time it is valid or the maximum charge that can be made on it. In this manner, when a user is not sure about the reputation of a site, the user may use a credit card that may only allow a small amount to be charged to it and which may expire in twenty-four hours. Embodiments may involve gaining insight into any disputes filed against the merchant and on which sites users may choose to use virtual credit card numbers.

Embodiments may relate to protecting users against phishing and/or deceptive sites. Many Websites may attempt to trick the user into thinking the user is on a different Website from that the user really may be on or to take advantage of users who inadvertently go to the wrong Website. For example, users may be tricked into providing their bank account numbers if they go to a Website that looks like their actual bank but which may be a fraudulent site. Users may also be confused by sites that attempt to look like other popular branded sites and trick the user into using the wrong site.

Phishing may involve the practice of tricking the user into entering their bank or other financial information into a Website they think may be their actual bank or other financial institution but which may be a fraudulent site attempting to steal financial information. Frequently, this may be done by sending spam emails to users in which the email may pretend to be from the users' bank and may ask the users to click on a link in the email to log into their bank. The link in the email may not link to the user's bank but instead may be a link to a fraudulent site that may look exactly like the actual bank's Website.

Existing technology may defend against phishing sites by using black lists of known phishing sites and by using heuristics/rules that run on the user's computer to detect when a likely phishing site may be visited. However, both of these approaches may have significant weaknesses. Black lists may be very slow to create and distribute, so by the time the user has an updated black list the phishing attack may have done most of its damage. Heuristics may check for characteristics of phishing sites such as the site not being registered in DNS. However, there may be a significant false positive rate with heuristics as many legitimate sites may have characteristics of phishing sites.

Certain embodiments may combine black lists and heuristics with a white list of all the sites that have a good reputation and thus may reduce the level of false positives. Heuristics may remain very good at detecting true positive cases while the white lists may remove the false positives.

In embodiments, heuristics used may include the country in which the IP address for the site is located, presence or lack of a registered domain name for the site, age of the domain name if there is one, whether the page contains forms, whether the site may be hosted on a site known to allow third parties to create their own Web pages (e.g. Geocities or Tripod), whether the site's IP address may be in an ISP's DHCP assigned address range, whether SSL is used to protect the site, whether JavaScript or other client side scripting may be used to open windows that are always kept in front of the rest of the browser to overlay information onto the Webpage, the number and type of grammar errors on the page, whether content on the page uses images or other content from banks or other financial organizations (either directly linked off the financial institutions Website or copied from the institution's Website), or the like.

In embodiments, the page may contain forms that may ask for credit card numbers, expiration dates, social security numbers, passwords, usernames, or login information. Forms may also have their content checked before submission to see if the actual data in them look like a credit card number, social security number, password, email address, or the like.

Pharming is the name sometimes given to the practice of attackers modifying pieces of the DNS system so that users may think they are visiting a particular Web site but are in reality visiting a fraudulent site run by the attackers. For example, a user may think he or she is visiting fidelity.com, but an attacker may have modified aspects of the name resolution system so that fidelity.com resolves to the attacker's Website instead, where the attacker may steal the user's Fidelity username and password.

In embodiments, the systems may guard against pharming by recording traits of the IP address of good Websites and comparing those traits at the time the user may try to visit the site. It may be unlikely that an attacker is able to compromise any significant fraction of the DNS system, so a reputation service may be able to resolve the correct IP address for a domain name. Then the service may compute certain unlikely-to-change information about the address such as the country in which the IP address resides, whether the site uses SSL, what the authoritative name servers for the domain are, whether the IP address is a DHCP assigned address in an ISPs address range, or the like.

When a user visits the same site, the same traits may be computed and compared. If they differ, then there may be a high chance that the user is no longer visiting the same site visited previously. The site may be different from the site tested and therefore may likely be a fraudulent site. This may be especially useful when applied to financial sites since they may be very unlikely to change the above traits for their Websites.

Some Websites may try to either confuse users into visiting them by naming themselves after other well known brands or by making their site appear similar to well known branded sites. In embodiments, a system may compare the sites content to frequently impersonated sites to look for sites trying to use content that may be similar or using domain names that are similar. The system may also look for sites that make heavy use of trademarked terms from another company.

In embodiments, if a site is a link farm site then it may be more likely to be a decoy and riot the actual site the user intended to visit. The link farm site may be a site that may have many pages of content of its own and may contain numerous links to other Websites and/or advertisements.

Web crawling may involve the process of automatically visiting Websites and fetching the Web pages on those sites. In embodiments, Web crawling may be used in order to analyze the content on the Web sites.

In embodiments, a system may target parts of the Web that may be likely to be used heavily or may be likely to contain low reputation content. Data sources used to guide this process may be lists of the most popular Web sites visited, lists of sites advertised in spam messages, sites advertised on other sites, sites advertised in pop up windows from adware, sites advertised on search engines based on querying the search engines for permutations of popular search terms, sites advertised on search engines based on querying the search engines for permutations of high bid price keyword search advertising terms (certain words cost more to bid for than other words when placing ads on search engine listings; high price words indicate there may be a strong business model behind the sites that may advertise using those words), sites that attempt to do e-commerce, sites that register programs for downloads on popular download Websites such as download.com and twcows.com, or the like.

Websites may use client side scripting technology such as JavaScript or VBScript to alter the content of a page when the page is loaded into a Web browser. These alterations may include adding elements to the page that offer programs for download, solicit personal information, accept payment for commerce, cause the browser to load an entirely different Web page, or the like. In embodiments, these behaviors may be used to assess a reputation.

Static analysis of a Web page and its associated client side scripting may not easily tell how a page may alter itself if the page were to be loaded and executed in a Web browser. In embodiments, certain traits may be used to indicate that the page can be analyzed statically, such as there is no JavaScript, VBScript, or other client side scripting on the page; the page and the scripting on the page do not execute any dynamically generated code or page contents; the page and the scripting on the page do not execute any code contained on other pages; or the like.

In embodiments, if any of the above traits is found on the page, then the page may be loaded into an environment that simulates the environment a browser may provide, and then the content in the page may be executed. Once the page has executed, the potentially newly altered Web page may be analyzed.

Low reputation Websites may frequently link to other low reputation Websites, but good reputation Websites may not frequently link to low reputation Web sites. In embodiments, systems may analyze the link structure among sites to infer the reputation of sites based on the reputation of other sites.

For example, if site A links to site B, then site A may inherit some fraction of the reputation of site B. Site A may link to a set of sites C, in which case A's reputation may be a function of the reputation of the sites contained in C. In embodiments, the function used to calculate how A's reputation is affected by the sites in C may be a uniform average reputation of all sites in C, a weighted average reputation of all sites in C (in which the weight of each site in C may be based on the popularity of the site), a fixed amount if any of the sites in C have reputations below a threshold, and a fixed amount if any of the sites in C are fraudulent, distribute adware or other malware software, collect personal information to sell, are spammers, or the like.

In embodiments, each site is represented as a node in a graph and the links between sites as edges in the graph. In such embodiments existing graph theory algorithms may provide a way to approximate the adjustment to each site/node's reputation based on the starting reputations that may be known for some sub-set of the sites/nodes in the graph. That is, initially, there may be many sites of which only some may have reputations known when the algorithm starts. Standard algorithms may provide a way to iteratively update the reputation of each node based on neighboring nodes' reputations; thus reputations may be computed for nodes that did not otherwise have a known reputation.

In embodiments, it may be useful to determine the business model of Websites. For example, if a Website is spending money to advertise itself but does not provide a way to accept payment and does not advertise on its own site, then there may be a non-obvious revenue source for the site such as selling personal information or distributing adware laden software.

The business model of a site may be calculated by crawling the Web looking for sites that advertise (call this site A) or crawling site A looking for revenue generators; these may include e-commerce indicators such as shopping carts, credit card fields, or ad supported content indicators (for example lots of pages of which many contain advertisements from known advertising networks). If crawling site A looking for revenue generators did not provide an apparent revenue source, and if site A collects personal information or distributes downloadable software, then site A may have a higher probability of engaging in selling personal information or distributing adware.

Websites and programs may frequently have End User License Agreements (EULAs) which may constitute legal agreements that users may have to agree to in order to use the Website or program. These agreements may be obtuse, long and sometimes hard to find on the Website or in the program. In practice, users may rarely read these agreements and so may not understand what they are agreeing to when they use a Website or program.

In embodiments, systems (e.g. collection facility 116) may automatically extract information from EULAs and summarize it for the user. Information about whether personal information is collected, whether that personal information is shared or sold to other parties, whether extensions are installed into the user's Web browser, whether advertisements are displayed, or the like may be extracted from the EULAs In embodiments, there may be several mechanisms for extracting information, such as using machine learning models of EULAs that do the above mentioned things or people who read the EULAs and report back.

In embodiments, the machine learning models of EULAs that do the above mentioned things may be built. Training sets of EULAs that do not share information, advertise, or the like and sets of EULAs that do share information, advertise, or the like may be collected and used to train the parameters of the model to correctly predict whether EULAs not in the training sets contain language about advertising, sharing personal information, etc.

In embodiments, people may read the EULAs and report back; these people may either be paid employees of a reputation assessment business or volunteers contributing information back.

In embodiments, a Web protection product may consist of a piece of client software running on the end user's desktop in the form of a browser plug-in for Internet Explorer and Firefox. The desktop software may communicate back with a reputation based server 110 to look up the reputation of every site that users may be visiting. The database of sites may be relatively large, so it may not be downloaded to the client computer.

The client may cache information locally as it is looked up so that repeated visits to the same site may not require time consuming look ups. In embodiments, this cache may be stored in encrypted form to protect the reputation server host site data it contains from being stolen, reverse engineered, or the like. This cache may also be pre-loaded with reputation data of the most popular Websites when the client is first installed.

In embodiments, each entry in the cache may be stored as a Windows structured storage IStream and/or IStorage. Windows restricts the length of names that can be stored in these containers, so the client may hash the name of each site into a number with few enough digits to serve as the Windows IStream and/or IStorage name. Multiple sites may have the same hash, so collisions may be handled by storing the actual URL name inside each IStream/IStorage as well.

In embodiments, the client may be downloaded as a single .exe file that contains within itself a compressed copy of browser plug-in dynamic link libraries (DLLs) for each supported browser. The .exe, when run, may serve as an installer program that may uncompress and install these DLLs. The .exe may then serve as a browser independent server that may run on the user's system to handle requests from the browser plug-in DLLs.

This may allow a single executable file to be downloaded that may serve as the installer for the reputation product, the uninstaller, and the actual software itself. Combining this functionality into a single file may reduce the total amount of data that may be downloaded by the user to install the product and may reduce the dependencies on the user's computer among multiple files and thereby may increase the reliability of the product.

In embodiments, a Website reputation related graphical user interface (GUI) may be provided. For example, there may be two general types of information displayed through a GUI such as non-modal (ambient) info (e.g. information to which the user can choose to respond or just ignore) or modal info (e.g. information that requires a response from the user).

Figure 10:
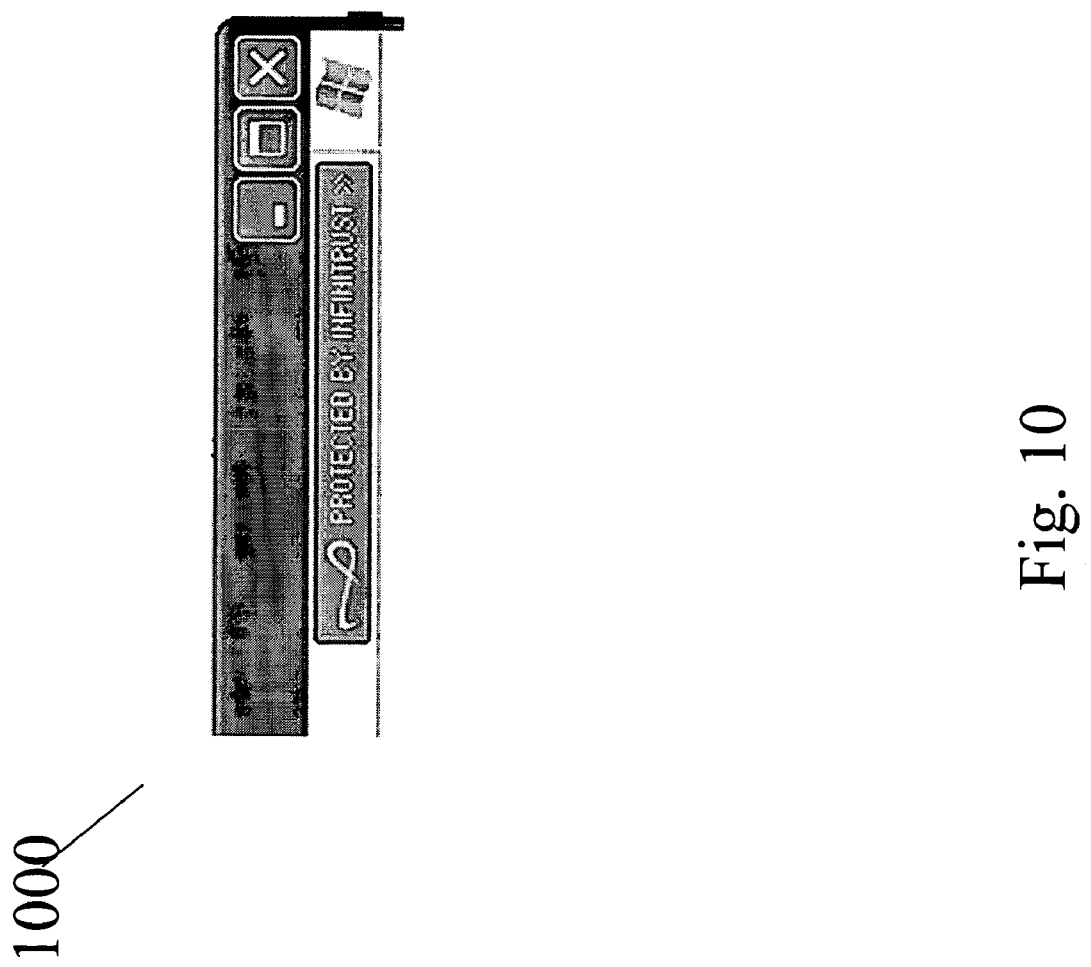
FIG. 10 illustrates a reputation menu button.
Figure 11:
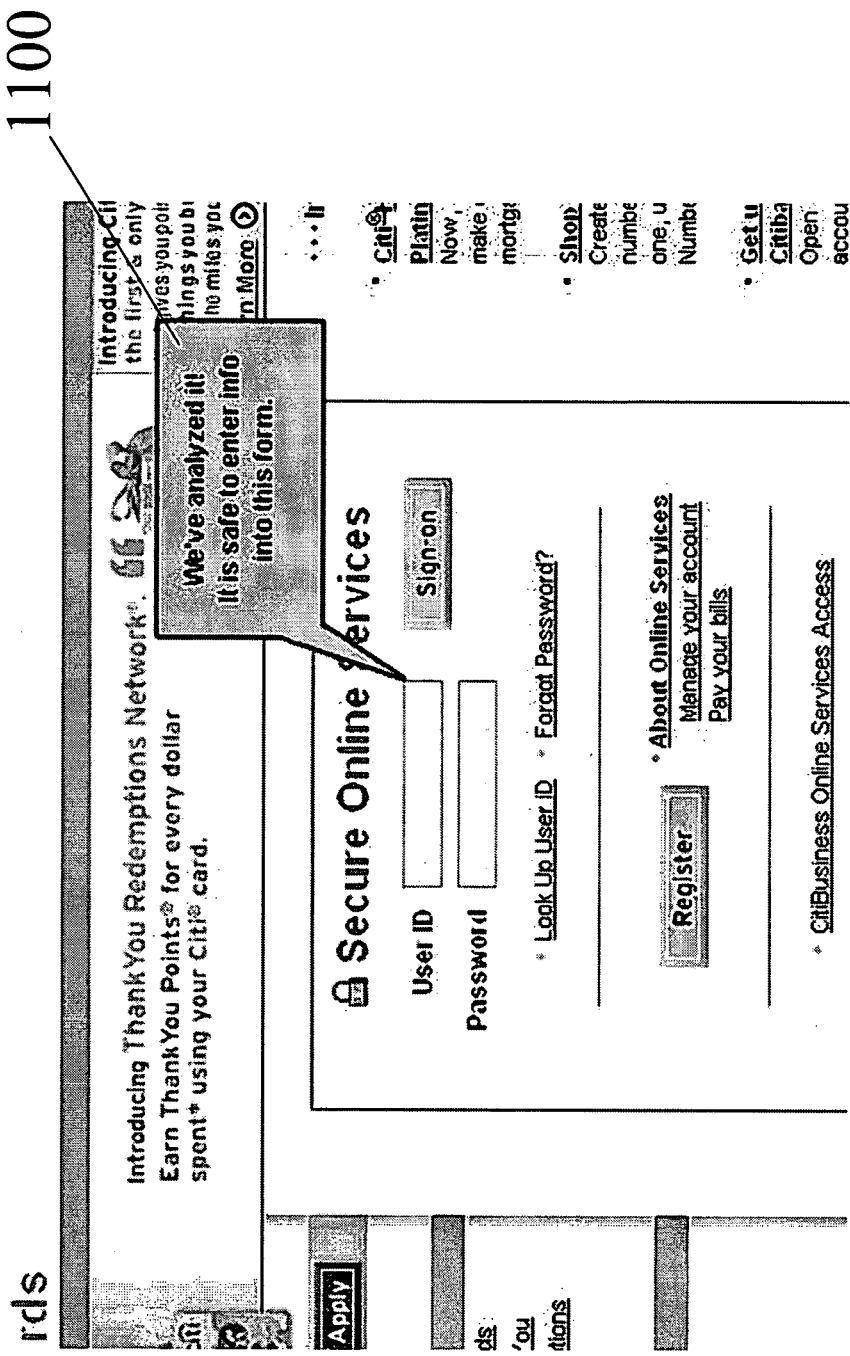
FIG. 11 illustrates an in-page message.

In embodiments, the non-modal information may come in two forms. A tool bar button may appear on the menu bar of the browser and may always be present. FIG. 10 illustrates such a button 1000. Also, in certain cases the system may show information as an in-page message in the actual HTML page. This information may appear only when the current page contains a form consisting of at least two fields. On such pages, light translucent highlights on form fields may be indicated as Green (good), Red (bad), or Yellow (unknown). FIG. 11 illustrates an in-page message 1100 according to the principles of the present invention. In this embodiment, the in-page message 1100 is indicating that the reputation service host 112 has information assessing that the reputation of the site relative to using personal information is acceptable; the in-page message 1100 may be generated by the warning/alert facility 114.

In embodiments, a system may also have tool-tips when the user rolls or highlights certain fields in the forms (e.g. they may be represented in the graphic as a box or as the built in windows tool-tip graphics). The tool-tips may read email fields or credit card/login/pass/account fields, etc.

In embodiments, the email fields may state "You'll receive N emails/week". In embodiments, there may also be a small button next to email form fields that when pushed may insert a disposable email address into the form field.

In embodiments, the credit card, login, pass, account # fields may tell the user "We've tested it! It is safe to enter info into this form," "We've tested it! It is NOT safe to enter info into this form," "Sorry, we've tested over 100,000 forms but haven't discovered this form yet. We recommend care," or similar messages.

In embodiments, modal messages may be dialog boxes that may call "Alert boxes" or "Alerts.". These boxes may be literally modal in the sense that the user must push a button on the dialog box before continuing to click on the browser window that triggered the dialog box.

In embodiments, a system may display an alert when the user is about to perform a bad "transaction," such as submission of a form or downloading of a program.

In embodiments, a system may also display a pre-transaction alert in order to save the user the hassle of discovering the site's potential harm after the user has already entered info. In embodiments, the system may be adapted to only display pre-transaction alerts when it may be very high likelihood that the user would encounter a transaction alert in the very near future.

In embodiments, the system may only show the spammer pre-transaction alert when the user may be on a known spammer site and/or the user may be clearly on a page with form fields and/or email/credit card or similar fields. A system may display an adware pre-transaction warning when users are on a publisher's site but not when they may be on an aggregator.

In embodiments, for unsafe commerce, phishing, and decoy sites the reputation service host 112 may show the pre-transaction alerts when the user first comes to the site. In embodiments, the alert may be presented unless the unsafe e-commerce site may be a well known high reputation site such as Amazon or Yahoo!

Figure 12:
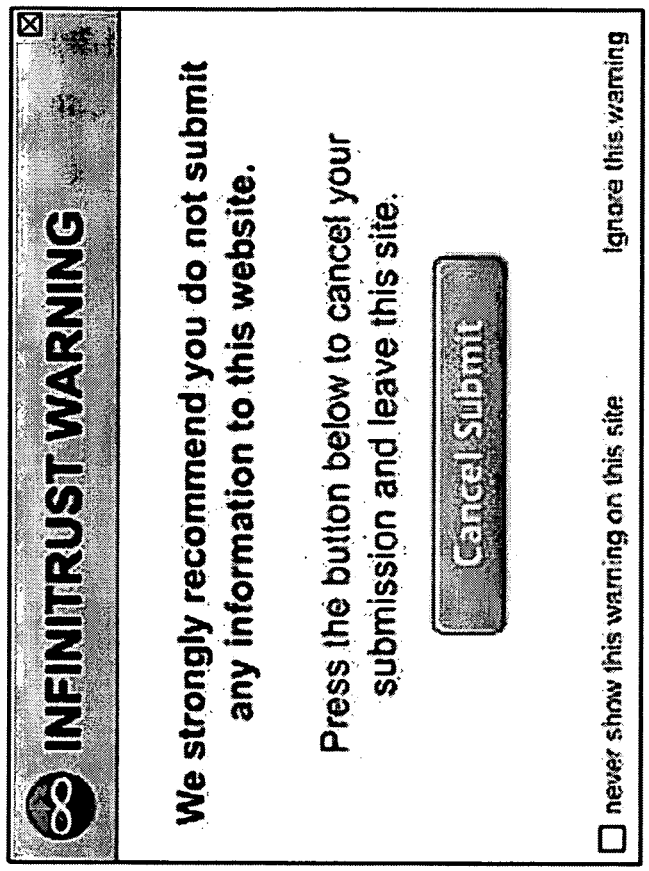
FIG. 12 illustrates a transaction alert for unsafe e-commerce, spammer, decoy, and phishing.

FIG. 12 illustrates a transaction alert 1200 produced by a warning/alert facility 114 for unsafe e-commerce, spammer, decoy, and phishing. This alert may appear for example after a user presses "Submit" on a form on any sites labeled as any of these four bad categories. The submission action may not be executed by the computer system prior to presenting the alert 1200.

Figure 13:
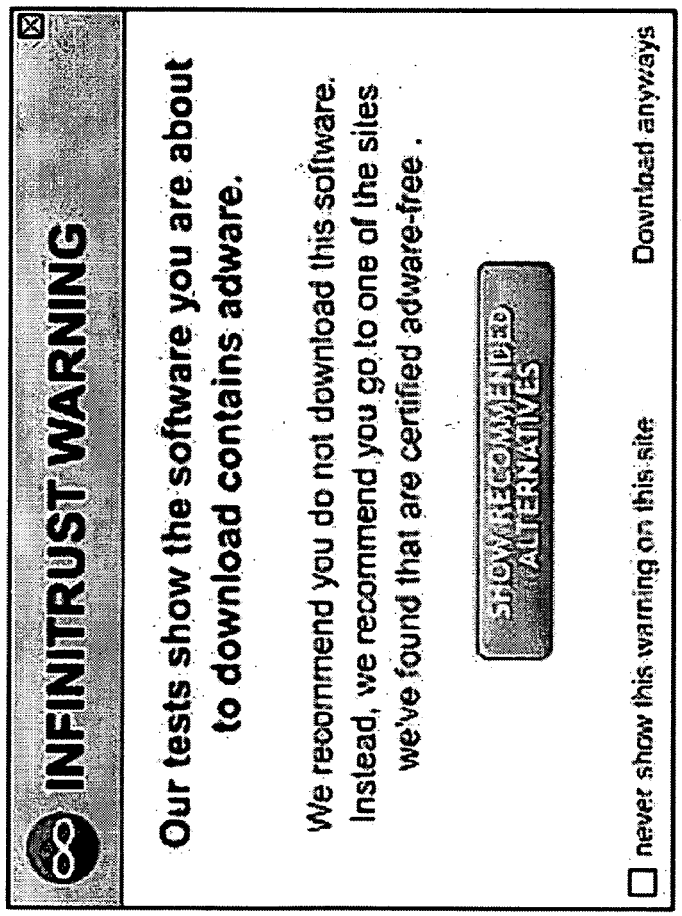
FIG. 13 illustrates a transaction alert for downloads.

FIG. 13 illustrates a transaction alert 1300 produced by a warning/alert facility 114 for downloads. The transaction alert 1300 may be produced, for example, in connection with a download that carries a poor reputation or from a source that contains a poor reputation.

Figure 14:
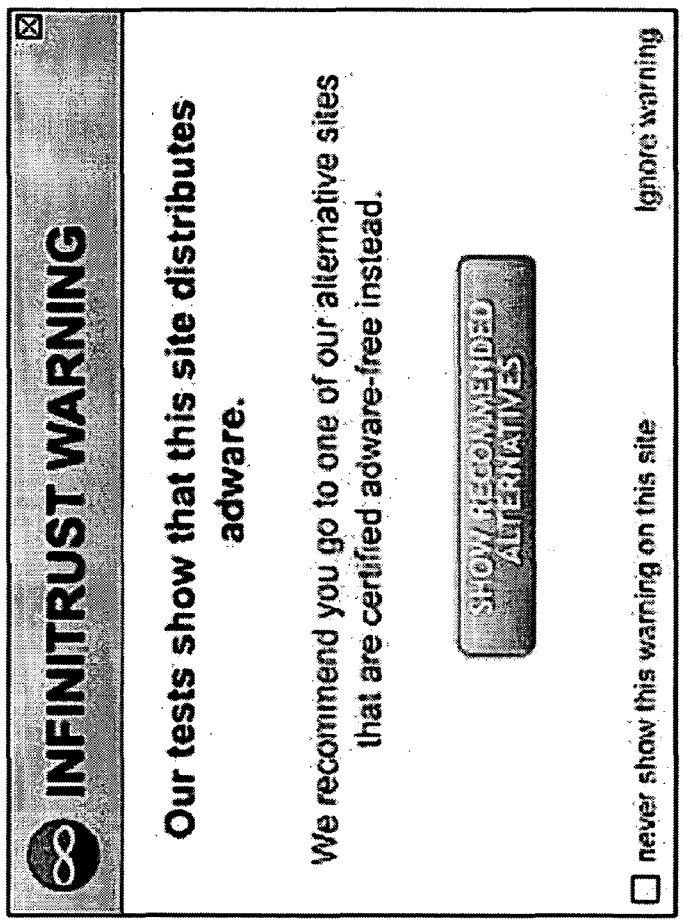
FIG. 14 illustrates a transaction alert for adware sites.

FIG. 14 illustrates a transaction alert 1400 produced by a warning/alert facility 114 for adware sites. The transaction alert may be produced, for example, in connection with an interaction that carries a poor reputation or in connection with a source that contains a poor reputation.

Figure 15:
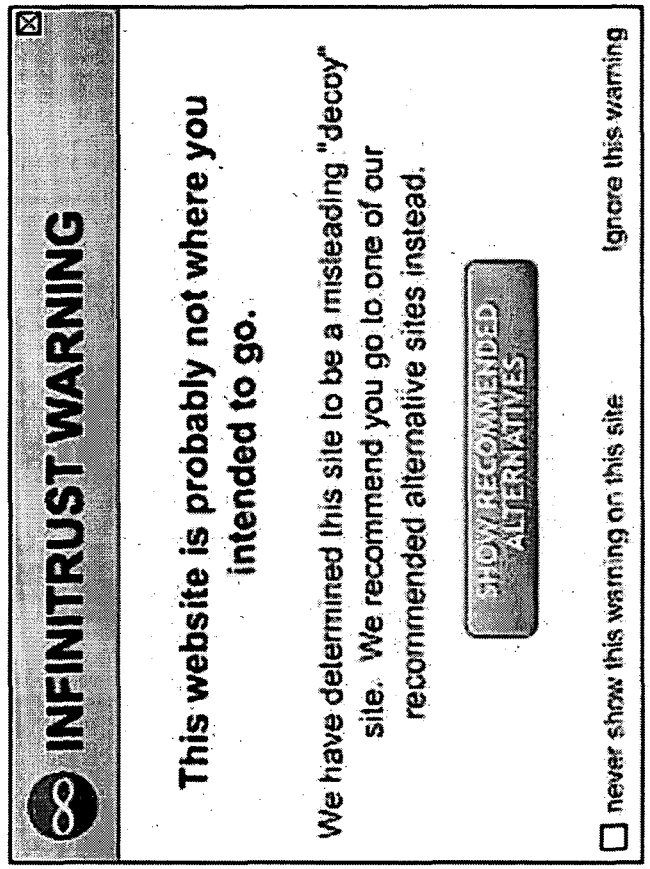
FIG. 15 illustrates a transaction alert for decoy sites.

FIG. 15 illustrates a transaction alert 1500 produced by a warning/alert facility 114 for decoy sites. The transaction alert may be produced, for example, in connection with an interaction that carries a poor reputation or in connection with a source that contains a poor reputation.

Figure 16:
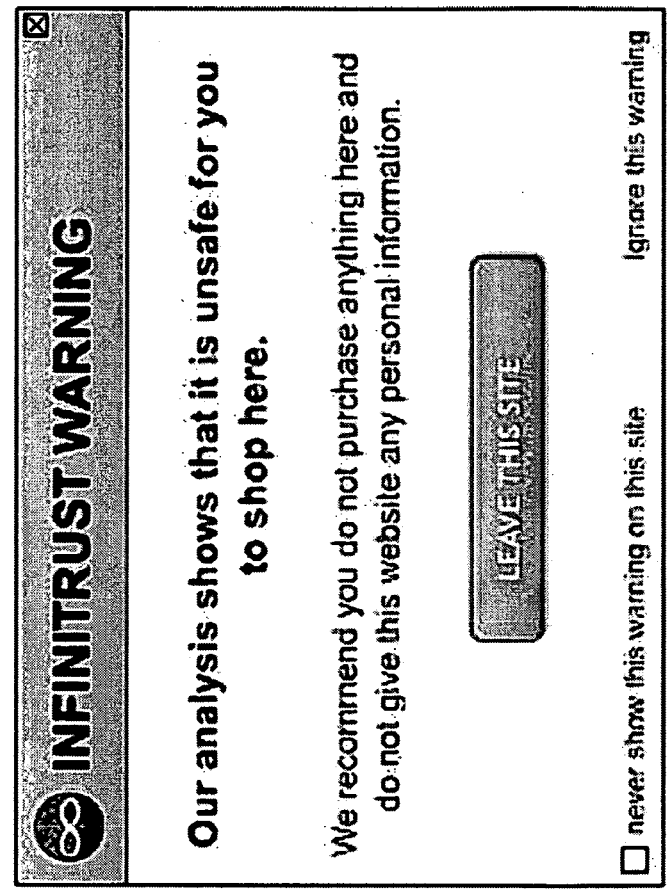
FIG. 16 illustrates a transaction alert for unsafe shopping.

FIG. 16 illustrates a transaction alert 1600 produced by a warning/alert facility 114 for unsafe shopping. The transaction alert may be produced, for example, in connection with an interaction that carries a poor reputation or in connection with a source that contains a poor reputation.

Figure 17:
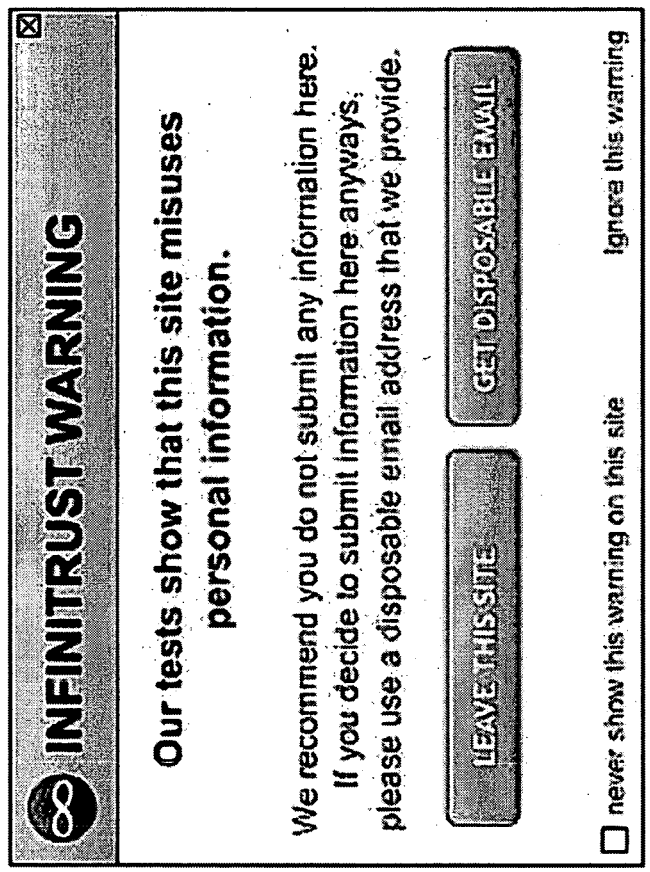
FIG. 17 illustrates a transaction alert indicating a source of possible personal information misuse.

FIG. 17 illustrates a pre-transaction alert 1700 produced by a warning/alert facility 114 for spammers. The transaction alert may be produced, for example, in connection with an interaction that carries a poor reputation or in connection with a source that contains a poor reputation.

Figure 18:
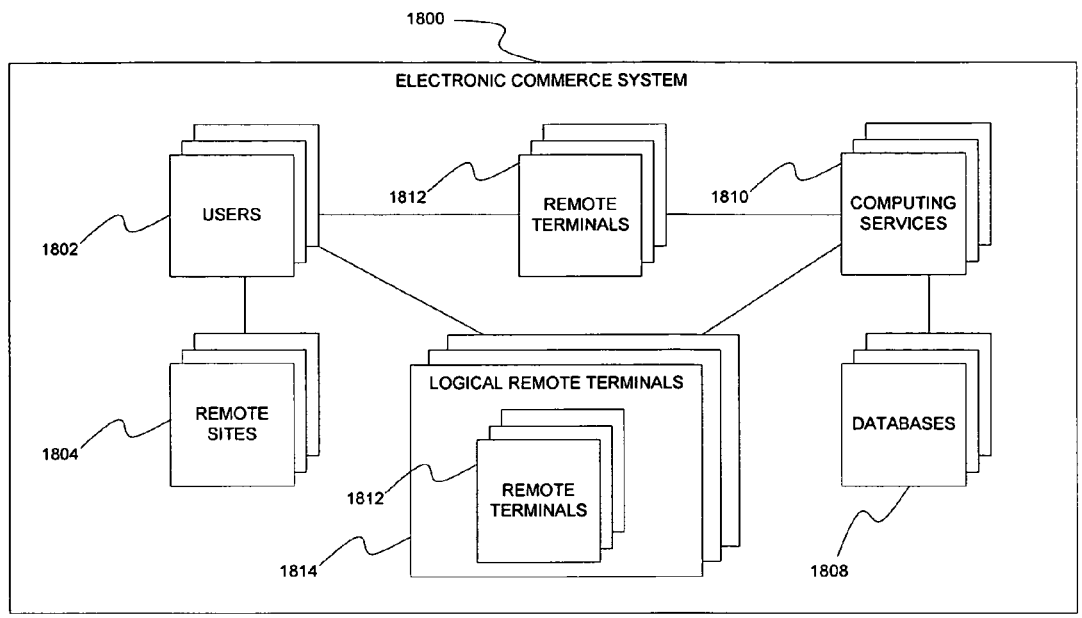
FIG. 18 illustrates an e-commerce system with interactions that may be monitored by a reputation service.

Referring to FIG. 18, aspects of the present invention involve an electronic commerce system 1800 which may provide interactive communications and processing of business transactions between users 1802. The system 1800 may permit users 1802 such as buyers, sellers, etc., at remote sites 1804 to conduct business transactions and communicate with databases 1808 associated with other computing services 1810 from a variety of remote terminals 1812. The communication with the databases 1808 may without limitation involve an SQL query, an XQuery query, a tier in an n-tier architecture, and/or a Web service. Generally, the remote terminals 1812 may include a processor; a memory (such as RAM, Flash, EEPROM, or any other suitable computer memory); a bus that couples the processor and the memory; an optional mass storage device (such as and without limitation a fixed magnetic disc, a removable magnetic disk, a flash memory device, a EEPROM, a ROM, a RAM, a fixed optical device or disc, a removable optical device or disc, a holographic device or disc, removable quantum memory device, a fixed quantum memory device, a tape, a punch card, or any other suitable memory device or disc) coupled to the processor and the memory through an I/O controller; and a communications interface (as described below) coupled to the processor and the memory.

In some embodiments, the users 1802 may comprise and employ humans to interact with the electronic commerce system 1800. The humans may manually conduct the business transactions and communicate with the databases 1808 via the remote terminals 1812.

In other embodiments, the users 1802 may comprise and employ automatic computers to interact with the electronic commerce system 1800. In this case, the users 1802 may constitute the remote terminals 1812. The automatic computers may, as the remote terminals 1812, programmatically or automatically conduct the business transactions and communicate with the databases 1808.

In any case, the remote terminals 1812 may without limitation comprise a personal computer, a workstation, a server, a blade server, a mobile computer (such as and without limitation a laptop, a personal digital assistant, a portable media player, and so forth), a cellular phone, a television set-top box, a videogame console, an interactive kiosk, a thin client, a dumb terminal or ASCII terminal, a display device (such as an LED display, a plasma display, an LCD display, a digital projector, a CRT display, a holographic display, and so forth), a digital advertising display (which may comprise a display device or any other suitable electronic display employed to deliver an advertising message in a public or private space), and so forth.

In some embodiments, it may be advantageous to combine one or more of the aforementioned remote terminals 1812 into logical remote terminals 1814, which may perform as remote terminals 1812 in the system. This may be particularly true in the case where the users 1802 are humans. For example and without limitation, a digital advertising display, which may provide output to a user, may be used in conjunction with a cellular phone, which may capture input from the user. Together, the digital advertising display and the cellular phone may behave as one of the logical remote terminals 1814, which may perform as one of the remote terminals 1812.

Since the logical remote terminals 1814 may function as remote terminals 1812, it should be appreciated that any reference to the remote terminals 1812 may be read as a reference to both the remote terminals 1812 and the logical remote terminals 1814, and vice versa.

In embodiments, some of the remote sites 1804 may comprise remote computer systems through which operators, who may be the users 1802 or may be associated with the users 1802, may communicate with the remote terminals 1812. Alternatively or additionally, some of the remote sites 1804 may comprise automatic computer systems, which may communicate with the remote terminals 1812. These automatic computer systems may include mass storage devices for storage of remote databases. Alternatively or additionally, some of the remote sites 1804 may simply comprise the remote terminals 1812 and the users 1802.

The users 1802 may comprise market participants in an interactive market that may be facilitated by the electronic commerce system 1800. Generally, the users 1802 may include a wide variety of market participants in an industry market as well as other service providers and interested parties. The users 1802 who gain full access to the services 1810 of the electronic commerce system 1800 may have all of the services 1810 of the electronic commerce system 1800 available to them. The users 1802 who gain full access to the services 1810 of the electronic commerce system 1800 may without limitation include market participants such as and without limitation sellers (such as distributors and suppliers), buyers, freight service providers, financial service providers, commercial service providers, information service providers, and proprietary service providers.

The users 1802 who have only gained partial access to the services 1810 of the electronic commerce system 1800 may only gain access to the services 1810 to which they are authorized to have access. The users 1802 who gain partial access to the services 1810 of the electronic commerce system 1800 may without limitation include affiliates, market analysts, shopping comparison services, consumer reporting agencies, governmental regulators, and so forth.

Some or all of the users 1802 may provide some or all of the computing services 1810 and/or some or all of the databases 1808. To these computing services 1810 and/or databases 1808, these users 1802 may authorize some or all of the users 1802 to have access.

In embodiments, an interactive reputation platform 100 may be deployed and used in connection with any of the interactions described in connection with FIG. 18. For example, an interactive reputation platform 100 may be used to provide reputation services through a reputation service host 112 as described in connection with FIGS. 1-17. The reputation service host 112 may provide its services during an interaction between users 1802, between the users 1802 and the remote sites, between the users 1802 and the remote terminals 1812, between the users 1802 and the logical remote terminals, and in connection with computing services 1810 and/or database 1808 interactions. In embodiments, the reputation service host 112 may provide services related to collection of reputation information 116; providing warnings, alerts, and the like 114; providing analysis of reputation information 122; monitor changes 124; and/or make alternative recommendations 130.

Figure 19:
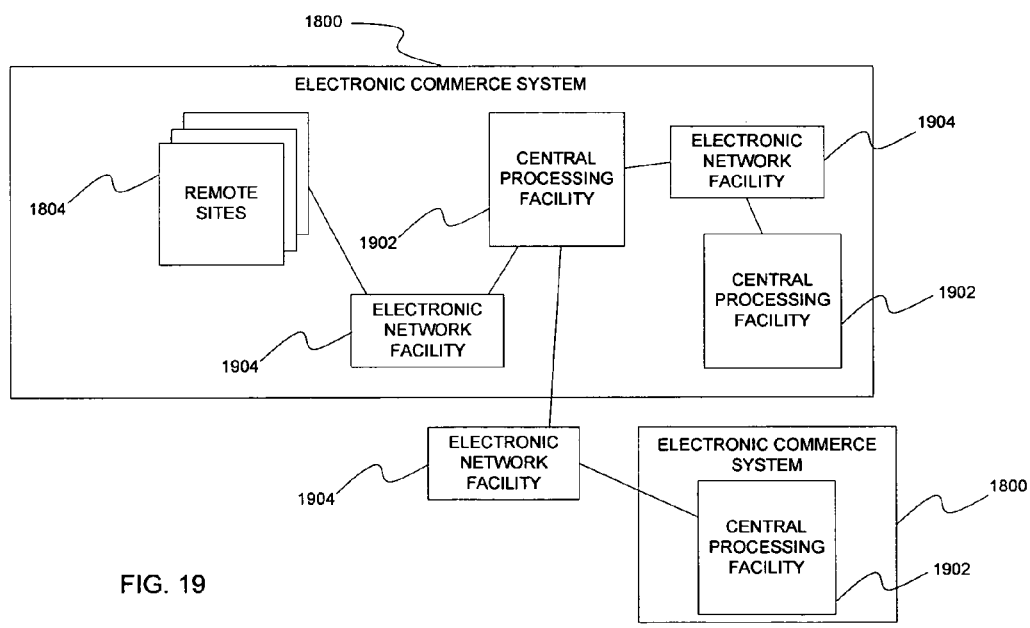
FIG. 19 illustrates an e-commerce system with interactions that may be monitored by a reputation service.

Referring to FIG. 19, the remote sites 1804 may communicate with a central processing facility 1902, which may provide the computing services 1810 and/or the databases 1808, both of which are described hereinbefore with reference to FIG. 18.

The central processing facility 1902 may comprise a central processing unit coupled to a communications interface and a mass storage system. The central processing unit may provide a local processing capability. The mass storage system may comprise a local mass storage device and or a remote mass storage device. In any case, the mass storage system may store a central database, which may include at least one of the databases 1808. The central database may comprise a relational database management system, a stream database management system, a row-optimized database management system, a column-optimized database management system, a distributed database management system, a remote database management system, an XML database management system, a flat file system, an object relational database management system, or any other suitable database management system.

Communications interfaces may, without limitation, comprise network interfaces and may provide operative coupling to an electronic network facility 1904 through which the remote terminals 1812, perhaps on behalf of the users 1802, may access the central processing facility 1902 and/or its mass storage system. This access may avail the user 1802 of the computing services 1810 and/or the databases 1808. Likewise, through an electronic network facility 1904, the central processing facility 1902 may be operatively coupled to another central processing facility 1902, which may be included in the electronic commerce system 1800 or may be included in another electronic commerce system 1800, as shown. This operative coupling may allow the user 1802 of one central processing facility 1902 in one electronic commerce system 1800 to access another central processing facility 1902 and/or another electronic commerce system 1800. In other words, the electronic commerce system 1800 may be linked to other electronic commerce systems 1800.

The operative coupling provided by the communications interfaces may without limitation comprise a wired physical network connection, a wireless physical network connection, a network socket, a logical network port, a dial-up modem, or any other suitable physical or logical network or communications connection. The operative coupling between the electronic network facility 1904 and the other facilities may facilitate a communication of information as described here and in the documents incorporated herein by reference.

The electronic network facility 1904, without limitation, include the Internet, an intranet, an extranet, a local area network, a virtual local area network, a metropolitan area network, a wide area network, a public network, a private network, a virtual network, a virtual private network, a secure network, an open network, a packet network, an asynchronous packet network, a synchronous packet network, a circuit switched network, an analog network, an electronic network, a wired electronic network, a wireless network, a wireless radiofrequency network, a wireless microwave network, a wireless or free space optic network, an optical network, a fiber optic network, an encrypted network, a quantum encrypted network, a point-to-point network, a peer-to-peer network, an ad-hoc network, an infrastructure network, or any other network or combination of networks suitable for e-commerce-related communications, functions, and transactions as described herein.

In embodiments, an interactive reputation platform 100 may be deployed in association with any of the communications identified in connection with FIG. 19. For example, while many of the embodiments herein disclose the use of interactive reputation services from a client, a remote site 1804 may employ such techniques to identify potentially low reputation e-commerce systems. In such an event, the site 1804 may terminate its connection with the e-commerce system or take other actions to warn or protect the site and/or a user of the site. In other embodiments, an interactive reputation platform 100 may be deployed in connection with the communications between a user 1802 and the remote site, and the platform 100 may monitor potential or actual interactions between the site 1804 and the other facilities identified in connection with FIG. 19, such as the central processing facilities 1902 or e-commerce system 1800.

Figure 20:
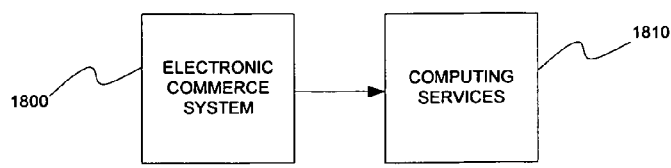
FIG. 20 illustrates an e-commerce transaction with a computing service wherein the transaction may be monitored by a reputation service.

Referring to FIG. 20, the electronic commerce system 1800 may be characterized in part as one or more computing services 1810 that provide electronic commerce functionality either to e-commerce sites or directly to consumers. This may include, for example, electronic commerce procedures pertaining to one or more of the following: a sale of a good or service, an advertisement, a recommendation, an instance of metadata, a price, an affiliate, a transaction, a schema, a privacy policy, a portal, a user interface, and/or a communication of information. E-commerce-related services may be deployed as integrated services such as a shopping website, or the services may be deployed atomically in any number of configurations. For example, individual services may include a shopping cart, a credit card transaction engine, a product search engine, and a price or feature comparison engine, and so on, all of which may be combined in a deployment of an e-commerce Web site. It should be appreciated that a plurality of computing services 1810 may be provided concurrently or sequentially to support a particular transaction or user experience. It should also be appreciated that computing services 1810 may be delivered to multiple users and/or multiple instances of a single user with techniques such as multiprocessing, multithreading, and/or distributed computing.

Reputation services, as described generally above, may be combined with e-commerce-related computing services 1810 in a variety of ways to achieve reputation-based electronic commerce systems. A number of such combinations are discussed in more detail below.

The computing services 1810 may relate to sale of goods or services. This may include, without limitation, the following generally recognized categories of goods and services: adult, apparel, audio and video, automotive, baby, baby registry, wedding registry, beauty, bed and bath, books, camera and photo, cell phones and service, computer and video games, computers, digital books, DVDs educational electronics, financial services, friends and favorites, furniture and décor, food, gourmet food, health and personal care, home and garden images, information, jewelry and watches, magazine subscriptions, maps, movie show times, music, musical instruments, office products, outdoor living, pet supplies, pharmaceuticals, real estate, shoes, software, sports and outdoors, tools and hardware, toys and games, travel, video, weather, wish list, and/or yellow pages.

Reputation services may be employed to evaluate a Web site or domain that offers goods and/or services for sale. By way of a non-limiting example, a reputation service may intervene before user navigation to a Web site that is known to generate large numbers of pop-ups. Reputation services may also, or instead, be employed to evaluate sources of content within a reseller Web site. Thus, for example, a travel Web site may provide links to various travel agents and/or providers such as car rental companies, airlines, and hotels. As described above, a reputation service may evaluate the Web site based upon an aggregated evaluation of providers listed on the site, or the reputation service may operate to provide reputation information for specific providers when hyperlinks are selected. In one embodiment, a browser plug-in may operate to evaluate hyperlinks, and to embed reputation-based icons within a page during rendering so that a user receives immediate, visual feedback concerning reputation for a number of providers that have links in a page such as a directory.

The computing services 1810 may relate to advertising. Advertising may include, without limitation, one or more of the following: aggregating advertisements; providing a Web site containing only advertisements; attention brokering; bidding to advertise; communicating with at least one of the users 1802; accepting, rejecting, issuing, processing, modifying, aggregating, redeeming, revoking, validating, distributing, or otherwise affecting or handling a coupon; accepting, rejecting, printing, processing, modifying, aggregating, canceling, validating, distributing, or otherwise affecting or handling a classified advertisement; dynamically inserting an advertisement, such as and without limitation into an item of electronic content; an association between an editor and an advertisement; permission-based advertising; a promotion; and/or commercial e-mail.

A reputation service may be employed to provide reputation information about an advertiser, including any of the reputation data described above. The reputation service may, for example, supply user feedback on order fulfillment or billing practices of an advertiser. The reputation service may also, or instead, provide reputation data relating to the manner in which the advertiser uses personal information, including conformance to national or international privacy regulations, as well as reselling names or addresses to bulk mailers. The reputation service may provide other objective reputation data, such as whether the advertiser accepts orders using a secure Web site or other technology. Other data, such as the advertiser's number of years in business, or other proxies for reliability, may also be provided in quantitative or qualitative form. In other aspects, the reputation service may provide reputation data for an agent or intermediary that places an advertisement for an advertiser. This may include, for example, data on the agent's use of cookies or other technologies that may compromise privacy or security of client devices, or the agent's history of placing undesirable or unwanted advertisements such as advertisements containing adult content.

The computing services 1810 may relate to recommendations. The computing services 1810 may, without limitation, generate and/or deliver a recommendation based on one or more of the following: a buying-based behavior, a click-based behavior, collaborative filtering, customer reviews, editorial reviews, machine learning, and/or reputation measures.

In one aspect, third-party recommendation resources may themselves be analyzed for reputation. In another aspect, individual recommendations may be evaluated using one or more of the reputation criteria discussed above. This may include an evaluation of a recommended good or service, an evaluation of a recommended site or e-commerce resource, or an evaluation of an individual or entity that provides a particular recommendation. Each of these dimensions of reputation may also be combined into an aggregated score or for a particular recommendation that collectively evaluates reputation for the source of the recommendation and the good or service that is recommended.

The computing services 1810 may relate to metadata such as: dynamic modification of user state, navigation, and/or navigation based upon user history behavior. In an embodiment, reputation services may be invoked whenever an e-commerce site seeks to modify a user state, such as by sending or modifying a cookie, adding a site to a user's list of favorites, or initiating other changes to client-side data. In addition, reputation data may be acquired from metadata for Web sites including information about sources, authors, dates, technology platforms, presence of components such as client-side scripts, and any other information with the metadata for Web pages that might serve as a useful proxy for reputation.

The computing services 1810 may relate to price including without limitation generating, retrieving, storing, deducing, guessing, anticipating, and/or modifying a price in association with one or more of the following: an agent or bot, an auction, a catalog aggregator, a pricing comparison engine, a rating, and/or a reverse auction. As an example, reputation services may be employed throughout an auction process, such as by providing reputation-based services or intervention based upon reputation data for an auction site, a seller, a bidder, or an item being auctioned, or some combination of these. Reputation services may be employed to evaluate a catalog aggregator using, for example, the link structure analysis and/or weighting systems described above. Reputation services may be employed within a price comparison Web site to provide suitable warnings and other information about online vendors listed in a price comparison page. In other embodiments, price information may itself be the subject of reputation-based services. For example, a vendor with a known history of selling products at different prices than advertised, or being routinely slow in updating advertised prices may be associated with corresponding reputation data. In other embodiments, a vendor's prices may be compared for all products to establish a reputation for selling goods above, below, or at market prices. In other embodiments, a reverse auction site may be evaluated with respect to its tendency to deliver satisfactory goods or services for a buyer-established price. In general, reputation services may be invoked for a variety of price criteria with reference to products, vendors, catalogs, and the like.

The computing services 1810 may manage affiliations in a variety of ways, such as establishing e-commerce affiliations, managing affiliate networks, and/or managing relationships or payments within an affiliate program. Affiliations may imply a high degree of relationship among reputation data for affiliated entities. In one aspect, analyses of reputation data across multiple parties, such as the link structure analysis described above, may be supplemented with affiliation data, such as by providing heavier weighting for links to known affiliates. Affiliation relationships may be derived from a number of automated and/or manual sources, or may be inferred from known affiliation business models.

The computing services 1810 may support transactions including, without limitation, one or more of the following: one-click shopping, an auction, an authentication, a "buy now" operation, a shopping cart operation, a currency transaction or exchange, a digital rights management operation, a payment, a permission, a micropayment, a cryptographic key generation or distribution, an encryption, and/or an identity or authority verification. Reputation services may be invoked in a transaction context in a number of ways. Reputation services may be used as described generally above with reference to a Web site. An additional set of reputation analyses, such as a more stringent evaluation or an evaluation of reputation data specific to the transaction type, may be conducted when a transaction is initiated. In addition, where the transaction is supported by a third party, such as for payment or delivery, reputation data may be provided for the third party.

The computing services 1810 may implement a privacy policy. The privacy policy may provide for actions such as blocking an advertisement, providing permanent anonymity, providing temporary anonymity, and/or preventing or blocking spam. The privacy policy may be adjusted with reference to reputation data for a site. Thus, a Web site or company having a favorable reputation for privacy and security may be accessed without anonymity features that might otherwise be provided pursuant to the privacy policy. In another aspect, the reputation for a site may include the site's privacy policy, such that the reputation service may provide notices to a user concerning same. It will be appreciated from the foregoing that, as used herein, the term "privacy policy" may refer to a written privacy policy maintained by an entity, or a computer-implemented privacy policy that controls operation of a computer such as a client device. In other embodiments, the privacy policy may be a computer-implemented, server-side policy.

The computing services 1810 may provide a Web portal, such as an e-commerce portal. The portal may also, or instead, be associated with any one or more of the services available from Yahoo!, MSN, or other well-known Web portals. Reputation services may be employed to provide reputation data, along with messages and warnings as described generally above, for various third party offerings accessible through the portal. In addition, each service within the portal may have associated reputation data. Some or all of this reputation data may be employed to provide reputation data for the portal as a whole.

The computing services 1810 may interact with a user interface for one or more of a media player, a Web facility, a mobile Web facility, a secure device, a skin or any other kind of user interface for a computing device, including those described herein and in the documents incorporated by reference herein. In certain embodiments where the interface provides rendering of content, the reputation system may be employed to provide guidelines for content including age-appropriateness, source, and so on. Reputation data for content may be employed to restrict access to certain content, or simply to provide explicit warnings as to the nature of the content. In another aspect, reputation data may reflect digital rights management, such as by confirming that non-public domain music is provided from a legitimate commercial source. In another aspect, reputation services may evaluate user interface components such as audio/video codecs or skins to ensure that they come from a trustworthy source, and/or that they are free of malicious code.

More generally, an interactive reputation platform 100 may be deployed in connection with an e-commerce system 1800 and any of its related computing services 1810 as described in connection with FIG. 20. For example, an interactive reputation platform 100 may be used to provide reputation services through a reputation service host 112 as described in connection with FIGS. 1-17. In embodiments, the reputation service host 112 may provide services such as collection of reputation information 116, creation of warnings, alerts, and the like 114; analysis of reputation information 122; monitoring changes 124; and/or making alternative recommendations 130.

In the following descriptions of figures that show generalized flow diagrams, the direction of normal processing flow may be shown with arrows, with the flow proceeding from a logical block at an arrow tail to a logical block at the arrow's head. In the special cases where a logical block labeled END: RETURN appears, however, the direction of normal processing flow may be momentarily reversed; this logical block may indicate the return of processing flow to a preceding logical block. The textual description of each END: RETURN logical block, as disclosed hereinafter, will clearly indicate the logical block to which processing flow may return. From this return point, processing flow may proceed in the normal direction.

Also, in the following descriptions of figures that show generalized flow diagrams of procedures, it should be understood that the diagrams might illustrate methodologies and structural flows for specific embodiments of the procedures. Thus, it should be appreciated that numerous other embodiments of the procedures may be possible, including embodiments that may rightly be depicted using none of the logical blocks of the diagrams described hereinafter, some of the logical blocks of the diagrams depicted hereinafter, or a combination of logical blocks not described herein with some or all of the logical blocks of the diagrams depicted hereinafter.

Figure 21A:
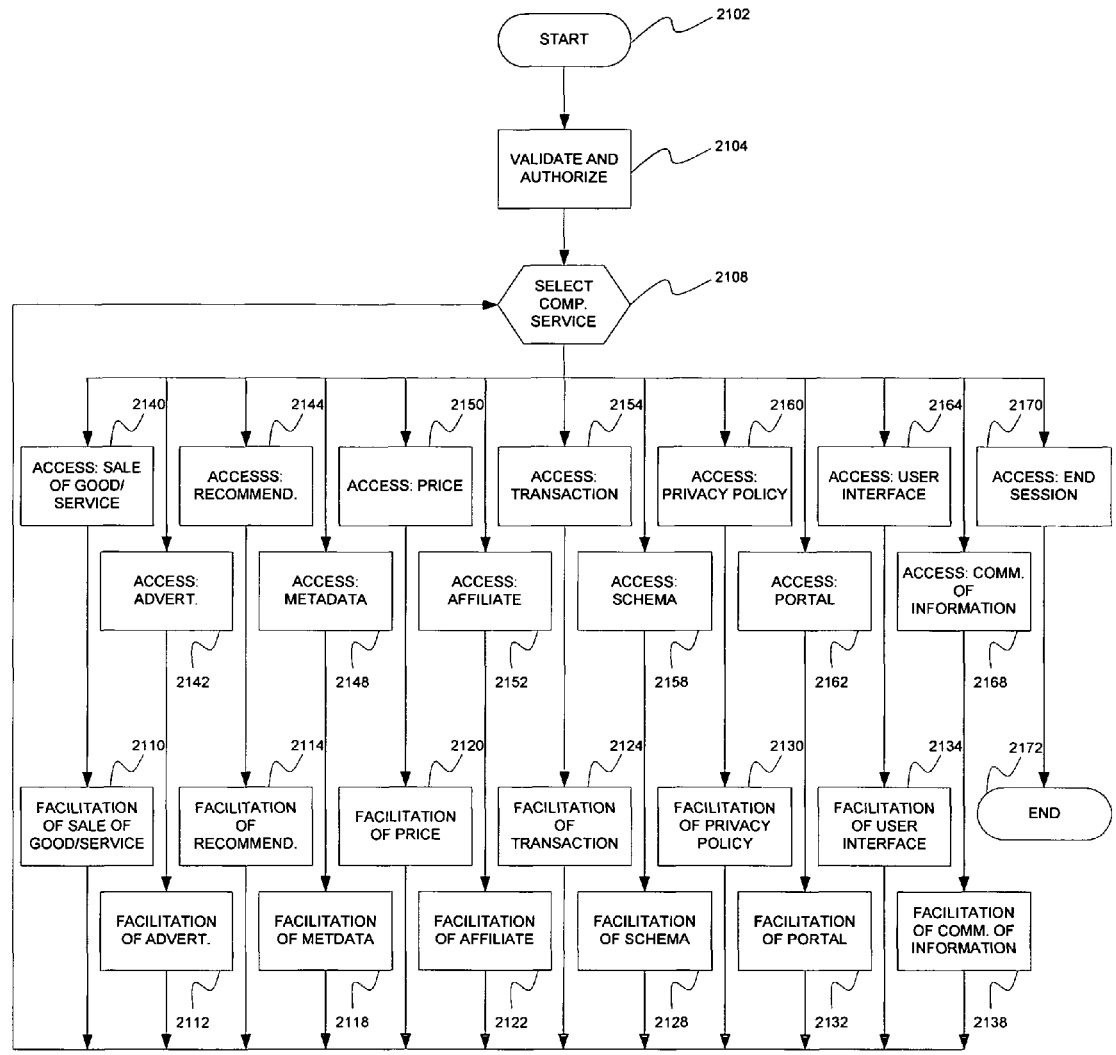
FIG. 21A illustrates validation, authorization, and a selection of service within an e-commerce setting wherein the transactions may be monitored by a reputation service.

FIG. 21A shows an e-commerce process. Starting at the top of the figure, a user 1802 may initiate an electronic commerce procedure (shown as the START logical block 2102), which is described hereinafter with reference to FIG. 22. Subsequently, processing flow may continue to a validation and authorization procedure (shown as the VALIDATE AND AUTHORIZE logical block 2104), which is described hereinafter with reference to FIG. 23. This procedure 2104 may provide the user with full access, partial access, or no access to the services 1810 (as described in connection with FIG. 20).

Processing flow may proceed to logical block 2108 (labeled SELECT COMP. SERVICE), as shown, wherein a test may be made to select which one of the computing services 1810 ("the service") may be provided by the electronic commerce system 1800 to facilitate electronic commerce for the user. This test is described hereinafter with reference to FIG. 24. As depicted, the logical blocks 2110, 2112, 2114, 2118, 2120, 2122, 2124, 2128, 2130, 2132, 2134, 2138, and 2172 may be representative of the services 1810 by which the electronic commerce system 1800 may facilitate electronic commerce for the user.

Processing flow may then proceed to a logical block corresponding to a particular service in an electronic commerce environment. The service may include, for example, an access procedure 2140 associated with a facilitation of a sale of a good and/or service 2110; an access procedure 2142 associated with a facilitation of an advertisement 2112; an access procedure 2144 associated with a facilitation of a recommendation 2114; an access procedure 2148 associated with a facilitation of metadata 2118; an access procedure 2150 associated with a facilitation of a price 2120; an access procedure 2152 associated with a facilitation of an affiliate 2132; an access procedure 2154 associated with a facilitation of a transaction 2124; an access procedure 2158 associated with a facilitation of a schema 2128; an access procedure 2160 associated with a facilitation of a privacy policy 2130; an access procedure 2162 associated with a facilitation of a portal 2132; an access procedure 2164 associated with a facilitation of a user interface 2134; an access facility 2168 associated with a facilitation of a communication of information 2138; or an access procedure 2170 associated with an end of the electronic commerce procedure 2172.

Each access procedure noted above may provide an additional level of validation and authorization of the user. Thus, generally, after the test of a logical block 2108 indicates the service, the user may be validated and authorized for access to the service. In addition, each validation or authorization procedure may cause a client device to invoke reputation services as described herein. In this context, the reputation service may apply more stringent reputation criteria. In another aspect, the reputation service may check for user-provided overrides relating to interactions with an e-commerce site or entity. Subsequently, if validated and authorized, the process may facilitate the respective service, as illustrated in blocks 2110, 2112, 2114, 2118, 2120, 2122, 2124, 2128, 2130, 2132, 2134, 2138, and 2172.

In embodiments, an interactive reputation platform 100 may be deployed and used in connection with any of the interactions described in connection with FIG. 21A. For example, an interactive reputation platform 100 may be used to provide reputation services through a reputation service host 112 as described in connection with FIGS. 1-17. The reputation service host 112 may provide its services during an interaction associated with validating and authorizing 2104, selecting a service 2108, and/or interacting with a service, for example. In embodiments, the reputation service host 112 may provide services related to collection of reputation information 116; providing warnings, alerts and the like 114; providing analysis of reputation information 122; monitoring changes 124; and/or making alternative recommendations 130.

Figure 21B:
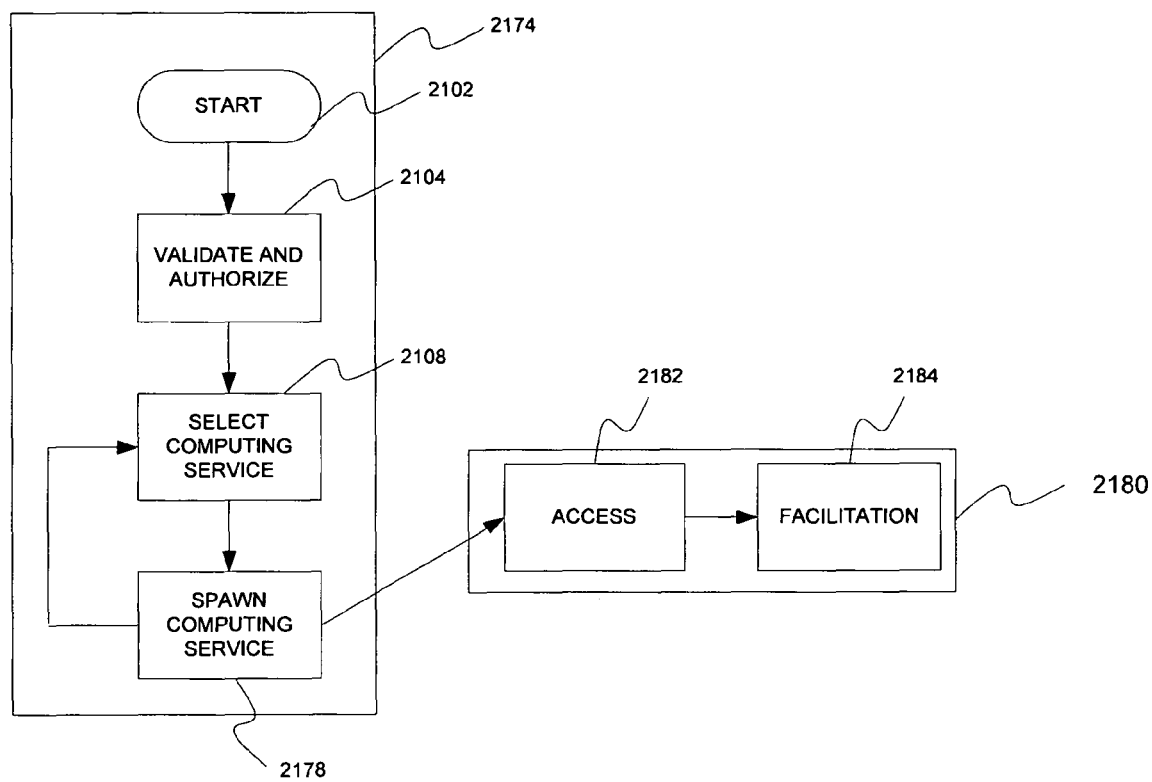
FIG. 21B illustrates a validation and selection process wherein the transactions may be monitored by a reputation service.

FIG. 21B shows an electronic commerce process. Starting at the top of the figure, the user may enter the start of the electronic commerce procedure 2102, which may be within a computing process or thread 2174. Subsequently, the validation and authorization procedure 2104 may be followed. Processing flow may then proceed to logical block 2108 and then to the SPAWN COMPUTING SERVICE logical block 2178. This logical block may indicate the spawning of a computing process or thread 2180. As shown, the processing flow may proceed, perhaps in parallel, both into the process or thread 2180 and into the logical block 2108. Within the process or thread 2180, the processing flow may continue with the ACCESS logical block 2182, which may represent a particular access procedure, which may be any of the access procedures described above. Then, as shown, the processing flow within the spawned process or thread 2180 may conclude with the FACILITATION logical block 2180, in which one of the procedures is implemented as described above with reference to FIG. 21A. At the conclusion of the processing flow within the spawned process or thread 2180, the process or thread 2180 may terminate, suspend, and/or exit, with or without a status code.

In embodiments, an interactive reputation platform 100 may be deployed and used in connection with any of the interactions described in connection with FIG. 21B. For example, an interactive reputation platform 100 may be used to provide reputation services through a reputation service host 112 as described in connection with FIGS. 1-17. In embodiments, the reputation service host 112 may collect reputation information 116; provide warnings, alerts and the like 114; provide analysis of reputation information 122; monitor changes 124; and/or make alternative recommendations 130, as described in greater detail above.

Figure 22:
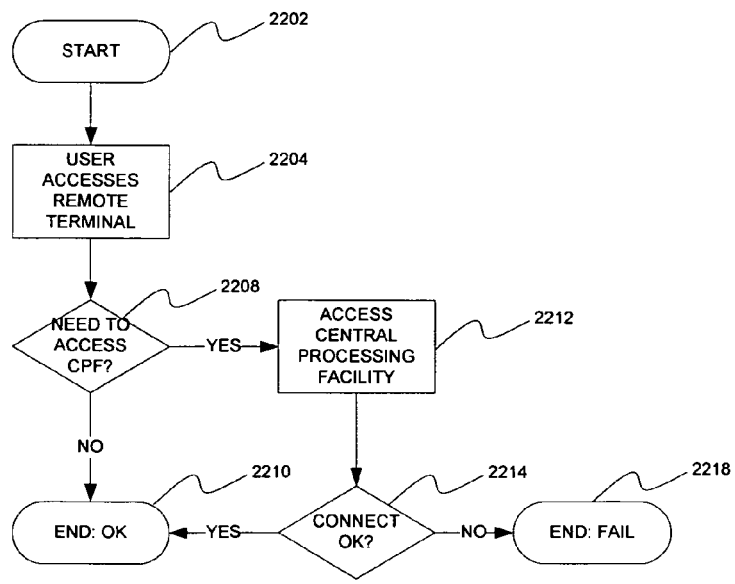
FIG. 22 illustrates a central processing facility access process wherein the transactions may be monitored by a reputation service.

FIG. 22 shows an electronic commerce procedure 2102 beginning as shown in block 2202. Process flow may proceed as shown, with the user perhaps accessing one of the remote terminals 1812 ("the remote terminal") in logical block 2204. The remote terminal may provide a service such as a function or method invocation, a launch of an executable action, an interpretation of a script or set of byte-codes, and so forth. In other aspects, access may include physical access, such as and without limitation walking up to and physically interacting with a point-of-sale terminal that may be the remote terminal. Alternatively, this access may comprise virtual access such as and without limitation access to the remote terminal via a Web browser that may be operatively coupled to a Web server (such as by HTTP) that may be operatively coupled with the remote terminal (such as by TCP/IP). In any case, processing flow may proceed to logical block 2208 where the remote terminal may conduct a test to see if it needs to access a central processing facility 1902. If the test results in a negative result, the remote terminal may already be accessing the central processing facility 1902, and processing flow may proceed to logical block END: OK 2210, where this may end the procedure, perhaps producing a success code or other success indication. However, if the test results in an affirmative result, the remote terminal may attempt to access a central processing facility 1902 such as and without limitation by connecting to the central processing facility 1902. In some cases this attempt may fail due to, for example, a busy signal, an excessive network lag, an unavailable network device or server, a software or hardware failure, a erroneously configured network device or server, and so forth. In these cases, processing flow may proceed to END: FAIL 2218, where the procedure may end, perhaps producing a failure code or other failure indication. Otherwise, the procedure may end at the aforementioned END: OK functional block 2210.

In embodiments, an interactive reputation platform 100 may be deployed and used in connection with any of the interactions described in connection with FIG. 22. For example, an interactive reputation platform 100 may be used to provide reputation services through a reputation service host 112 as described in connection with FIGS. 1-17. In embodiments, the reputation service host 112 may collection reputation information 116; provide warnings, alerts and the like 114; provide analysis of reputation information 122; monitor changes 124; and/or make alternative recommendations 130, as described in greater detail above.

Figure 23:
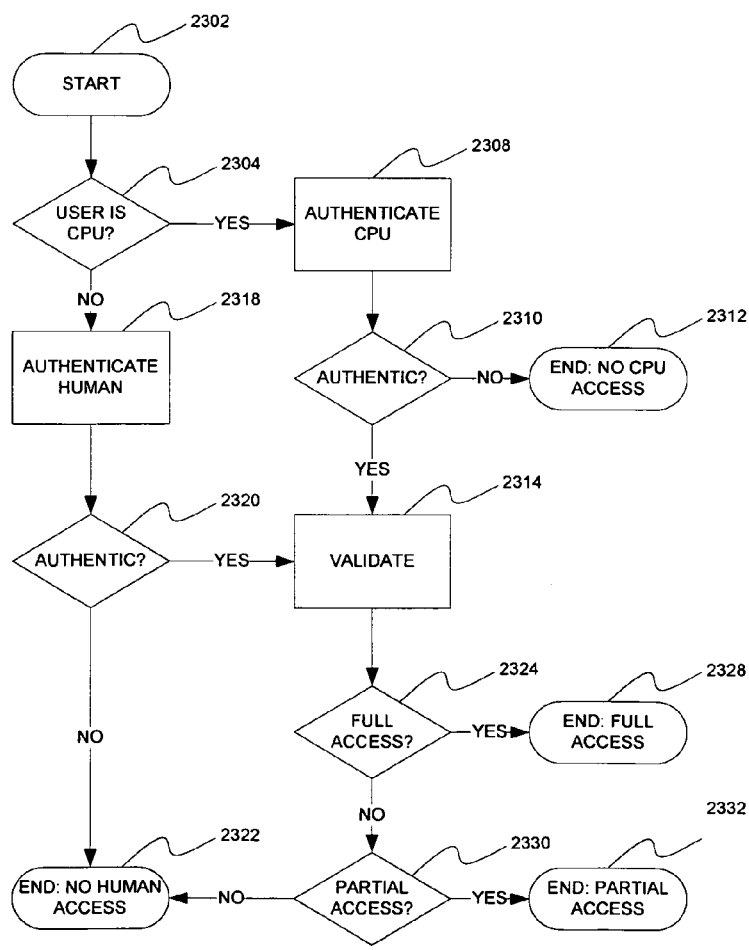
FIG. 23 illustrates an authentication and validation process wherein the transactions may be monitored by a reputation service.

FIG. 23 shows a validation/authorization process. The process 2104 may begin with the logical block START 2302. Processing flow may continue to a test, as shown by logical block 2304 (labeled USER IS CPU?), which may determine if the user is an automatic computer (that is, not a human). If the user is a computer, the process may continue to logical block 2308 where the central processing facility 1902 may utilize a method to authenticate the user. This method may without limitation be a cryptographic authentication method, such as the Challenge-Handshake Authentication Protocol. The logical flow may then proceed to logical block 2310 (labeled AUTHENTIC?), which may represent a test of the result of the authentication method. Depending upon the result of this test, processing flow may continue either to the END: CPU NO ACCESS 2312 logical block or to the VALIDATE logical block 2314, as shown. The logical block 2312 may represent the procedure exiting with or without a status code and with no access granted to the automatic computer. If, on the other hand, the test at 2304 is negative, processing flow may continue to logical block 2318 where the central processing facility 1902 may gather authentication information, such as and without limitation a globally unique identifier (GUID) and password, from the user. The authentication information may then be selected from contents of one of the databases 1808 in logical block 2320 (labeled AUTHENTIC?). If the authentication information is associated with a table entry in one of the databases 1808, the user may be deemed authentic, the result of the test at 2308 may be affirmative, and processing flow may continue to logical block 2314, as shown. Otherwise, the result at 2308 may be negative and the procedure may conclude at logical block 2322, END: HUMAN NO ACCESS, which may represent the procedure exiting with or without a status code and with no access granted to the user. At logical block 2314, a GUID associated with the user, which may or may not be the username and which may be representative of a primary key in a table in one of the databases 1808, may be selected from the table. The selection may be tested at logical block 2324 (labeled FULL ACCESS?) to see if it indicates that the user should be granted full access to the system 1800. If the result of this test is affirmative, processing flow may continue to logical block 2328, END: FULL ACCESS, which may represent the procedure ending with full access granted to the user, perhaps generating a status code representative of both the authentication of the user and the validation of user's full access to the system 1800. Otherwise, the selection may be tested again, this time at logical block 2330 (labeled PARTIAL ACCESS?), as shown, to see if it indicates that the user should be granted partial access to the system 1800. If the result at logic block 2330 is affirmative, processing flow may continue to logical block 2332, END: PARTIAL ACCESS, which may represent the procedure ending with partial access granted to the user, perhaps generating a status code representative of both the authentication of the user and the validation of the user's partial access to the system 1800. Finally, as shown, if the result at logic block 2330 is negative, processing may continue to the aforementioned END: NO HUMAN ACCESS logical block 2322.

In embodiments, an interactive reputation platform 100 may be deployed and used in connection with any of the interactions described in connection with FIG. 23. For example, an interactive reputation platform 100 may be used to provide reputation services through a reputation service host 112 as described in connection with FIGS. 1-17. For example, personal or otherwise sensitive information may be requested during the authentication and validate procedures, and the reputation service host 112 may provide warnings and the like in connection with any such requests. Likewise, a reputation service may provide no warning if the interaction or the entity has a favorable reputation, or if a user has overridden reputation warnings for the related site or service. In other aspects, once a user is authenticated, the resource may provide additional information that may be used by the reputation service. In embodiments, the reputation service host 112 may provide services related to collection of reputation information 116, providing warnings, alerts, and the like 114; providing analysis of reputation information 122; monitoring changes 124; and/or making alternative recommendations 130.

Figure 24:
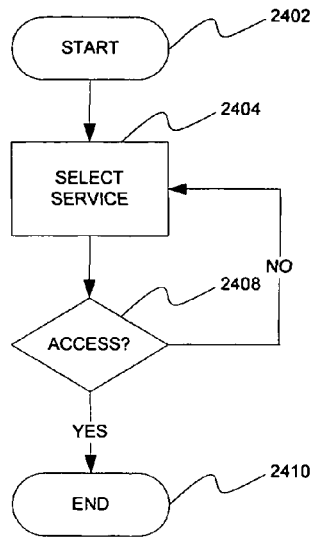
FIG. 24 illustrates a service selection process wherein the transactions may be monitored by a reputation service.

FIG. 24 shows a process for selecting a computing service. The procedure for this selection, which may represent the SELECT COMP. SERVICE procedure at the aforementioned logical block 2108, may begin at the START logical block 2402. Proceeding to the SELECT SERVICE logical block 2404, a service selection may be received by the system 1800 from the user. Then, as shown by logical block 2408, the selection may be compared to the access already granted to the user, and the result of this comparison may be tested to see if it is a match. If the test result is negative, the procedure flow may return to logical block 2404. Otherwise, the service may have been successfully selected, and the procedure may end, perhaps generating a code or indication representative of the selection, as shown by the END logical block 2410. By using this process, restricted access may be provided to a subset of services available at an e-commerce site, according to permissions associated with a particular user.

In embodiments, an interactive reputation platform 100 may be deployed and used in connection with any of the interactions described in connection with FIG. 24. For example, an interactive reputation platform 100 may be used to provide reputation services through a reputation service host 112 as described in connection with FIGS. 1-17. For example, the reputation service host 112 may provide warnings and the like or otherwise monitor the interaction when the selection of the service is being made. The reputation service interaction may take place, for example, when the opportunity to interact is presented, as the interaction is attempted, or following the interaction. In embodiments, the reputation service host 112 may provide services related to collection of reputation information 116, providing warnings, alerts, and the like 114; providing analysis of reputation information 122; monitoring changes 124; and/or making alternative recommendations 130.

Figure 25:
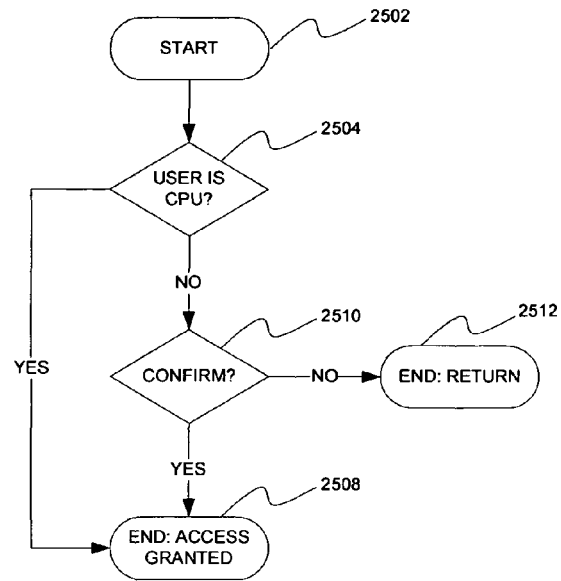
FIG. 25 illustrates a confirmation process wherein the transactions may be monitored by a reputation service.

Referring to FIG. 25, a procedure for providing an end of electronic commerce access service, which may be represented by the aforementioned ACCESS: END SESSION logical block 2170, may begin with the START logical block 2502. Next, a test may be performed to determine if the user is a CPU, as shown by logical block 2504. An affirmative outcome in 2504 may direct the processing flow to the END: ACCESS GRANTED logical block 2508, which may represent the procedure ending with access to the service represented by the END logical block 2172 granted to the user, perhaps as signaled by a code or indication representative of the user's granted access. A negative outcome in 2504 may direct the procedure flow to END: RETURN 2512, from which procedure flow may return to the START logical block 2402 of FIG. 24.

In embodiments, an interactive reputation platform 100 may be deployed and used in connection with any of the interactions described in connection with FIG. 21B. For example, an interactive reputation platform 100 may be used to provide reputation services through a reputation service host 112 as described in connection with FIGS. 1-17. In embodiments, the reputation service host 112 may provide services related to collection of reputation information 116, providing warnings, alerts, and the like 114; providing analysis of reputation information 122; monitoring changes 124; and/or making alternative recommendations 130. At the conclusion of an e-commerce interaction, the reputation service may explicitly request user feedback on one or more aspects of the interaction for use in subsequent reputation analysis.

Figure 26:
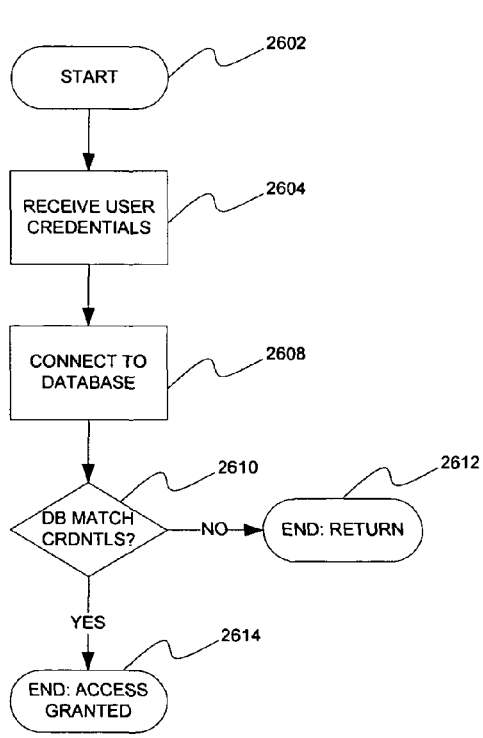
FIG. 26 illustrates a database connection process wherein the transactions may be monitored by a reputation service.

Referring to FIG. 26, the user may be granted or denied access to one of the computing services 1810. Proceeding from the START logical block 2602 at top of the figure, the system 1800 may receive the user's credentials, as shown by logical block 2604. The user's credentials may, without limitation, include a GUID, password, MAC address, public key, digital certificate, access token, biometric measurement, and so forth. Then, in logical block 2608, the system 1800 may connect to one of the databases 1808. Next, a test may compare the user's credentials to the contents of the database, as shown by logical block 2610. If there isn't a match, the user may be denied access to the computing service 1810, and processing flow may continue to logical block 2612, END: RETURN, from which the processing flow may return to logical block 2402 of FIG. 24. Otherwise, the user may be granted access to one of the computing services 1810, and processing flow may continue to logical block 2614, where this procedure ends, perhaps producing a success code or other success indication.

In embodiments, an interactive reputation platform 100 may be deployed and used in connection with any of the interactions described in connection with FIG. 26. For example, an interactive reputation platform 100 may be used to provide reputation services through a reputation service host 112 as described in connection with FIGS. 1-17. For example, the reputation service host 112 may provide its service in association with the submission of user credentials 2604. The reputation service host may warn of potential threats, dangers, and the like associated with making such submission. In embodiments, the reputation service host 112 may provide services related to collection of reputation information 116, providing warnings, alerts, and the like 114; providing analysis of reputation information 122; monitoring changes 124; and/or making alternative recommendations 130.

Figure 27:
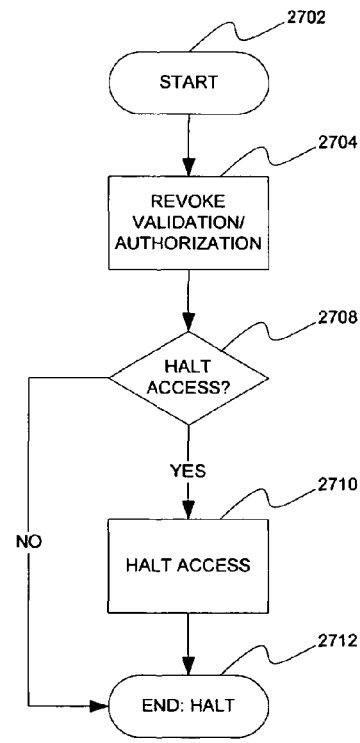
FIG. 27 illustrates a revocation of validation and authorization process wherein the transactions may be monitored by a reputation service.

FIG. 27 shows a termination of an electronic commerce service. Beginning with the START 2702 logical block, processing flow may continue to logical block 2704, REVOKE VALIDATION/AUTHORIZATION, where the validation and authorization of the user, as described hereinbefore with reference to FIG. 23, may be revoked. This revocation may, without limitation, include updating an entry in one of the databases 1808; adding a serial number associated with the validation and/or authorization to a certificate revocation list; and/or terminating the user's access to the system 1800 at the remote terminal, such as and without limitation by logging out the user. Processing flow may continue as shown to logical block 2708 (labeled HALT ACCESS?) where a test may be conducted to determine if the remote terminal should halt access to central processing facility 1902, such as and without limitation by disconnecting from the central processing facility 1902. If the result of this test is affirmative, processing flow may continue to logical block 2710, HALT ACCESS, where the access may be halted. Then, processing flow may continue to logical block 2712, END: HALT, where the entire electronic commerce procedure may either halt or restart from logical block START 2102, which is described hereinabove with reference to FIG. 21A. If the result of the test in logical block 2708 is negative, processing flow may continue to logical block 2712, as described above.

In embodiments, an interactive reputation platform 100 may be deployed and used in connection with any of the interactions described in connection with FIG. 27. For example, an interactive reputation platform 100 may be used to provide reputation services through a reputation service host 112 as described in connection with FIGS. 1-17. For example, a reputation service host may collect information through a collection facility 116 relating to the revocation. This information may also be transmitted to a reputation server 110 as described in connection with FIG. 1, and the information may be used to access the reputation of such service. In embodiments, the reputation service host 112 may provide services related to collection of reputation information 116, providing warnings, alerts, and the like 114; providing analysis of reputation information 122; monitoring changes 124; and/or making alternative recommendations 130.

The system 1800 may provide the user with a service that may facilitate the sale of a good and/or service. This service may be represented by the FACILITATION OF SALE OF GOOD/SERVICE logical block 2110 of FIG. 21A and may be described in detail hereinafter with reference to FIG. 28. Prior to accessing this service, the user may be required to gain access to this service by following the access procedure that may be represented by the ACCESS: SALE OF GOOD/SERVICE logical block 2140 of FIG. 21A, which may be described hereinbefore with reference to FIG. 26.

Figure 28:
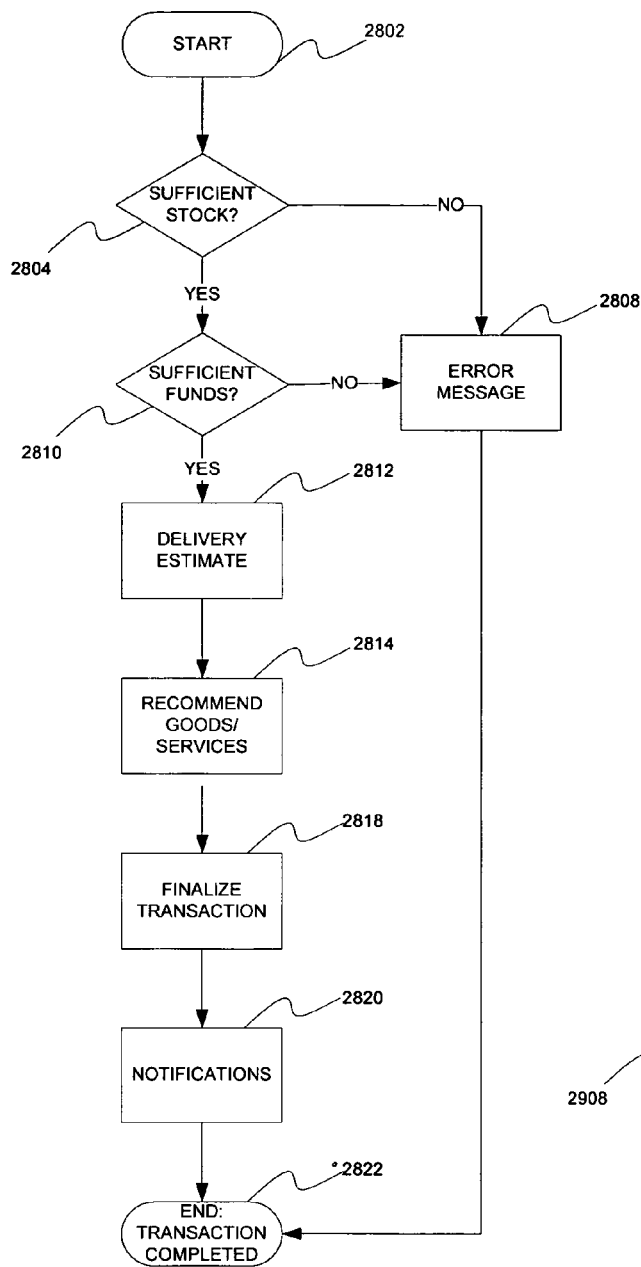
FIG. 28 illustrates a purchasing process wherein the transactions may be monitored by a reputation service.

Referring to FIG. 28, the FACILITATION OF SALE OF GOOD/SERVICE service 2110 may be provided according to the depicted procedure. The good or service may be any of the goods and services described herein. Beginning with the START logical block 2802, processing flow may continue to a test, represented as logical block 2804 (labeled SUFFICIENT STOCK?), which may determine whether there exists sufficient stock of goods and/or resources for delivery of goods and/or performance of services to fulfill the proposed order. If the test result is negative, processing flow may proceed to the ERROR MESSAGE logical block 2808, which may result in the delivery of an error code or message, which may communicate the insufficient levels of stock and/or resources. This code or message may be delivered to an administrator, which may be one of the operators or may be an administrative automatic computer system. This administrator may manage inventory and resource levels and/or track sales that were not completed due to the lack of inventory and/or resources. When checking sufficient stock of goods and/or resources for performance of services, the system may check sources other than in-house inventory and resources. It may be possible to purchase goods or commission resources from elsewhere and execute a profitable transaction. However, if the result of the test at logical block 2804 is affirmative, processing flow may proceed to the logical block 2810 (labeled SUFFICIENT FUNDS?).

Logical block 2810 may represent another test, which may determine if the potential purchaser, which may be the user, has sufficient funds to complete the transaction. The system may check the potential purchaser's credit card for authorization and may check the potential purchaser's bank balance, credit rating, or balance with any online transaction brokering services, such as PayPal. If the test result is negative, processing flow may proceed to the ERROR MESSAGE logical block 2808, which may result in the display of an error message communicating the lack of funds or insufficient credit rating. The error message may also recommend or present ways in which the potential purchaser can remedy the error, such as by requesting a credit increase or reviewing his or her credit history for errors. The error message may also refer the potential purchaser to other retailers willing to sell to potential purchasers with lower credit ratings. The first retailer may receive a fee or commission from the second retailer for this type of referral. The system may facilitate tracking and processing of these referrals. However, if the result of the test at logical block 2810 is affirmative, processing flow may proceed to the DELIVERY ESTIMATE logical block 2812.

Logical block 2812 may represent the process by which the system estimates delivery of the good or performance of the service. For a service the estimate may include a starting date and/or time and an ending date and/or time. The delivery estimate may involve the selection of a delivery method for a good or a priority level for a service. The different delivery methods and priority levels may be associated with different prices. The delivery estimate may also take into account pre-orders for items and services that have not yet been released to the public. The delivery estimate may comprise a transfer time for an electronic delivery. The delivery estimate may also include a return date or due date for an item that must be returned, such as a movie or game rental. The processing flow may then proceed to the RECOMMEND GOODS/SERVICES logical block 2814. This logical block 2814 may represent the process by which the system recommends related goods and/or services, such as accessories, updates, update subscriptions, warranties, complementary goods, or training services. The recommendation may be based on the good and/or service purchased in the current transaction and/or may be based on goods and/or services purchased by the potential purchaser in the past. The potential purchaser may select additional goods and/or services for purchase. Subsequently, the process of recommending related goods and/or services might repeat. The system may also allow the potential purchaser to place goods and/or services on a "wish list" for purchase in the future. The process flow may then continue to the FINALIZE TRANSACTION logical block 2818. The potential purchaser and the system may commit to the transaction at this stage, which may involve writing data to one of the databases 1808. The process flow may then proceed to the NOTIFICATIONS logical block 2820. This logical block 2820 may represent the notification of other related systems of the transaction. For example, the administrator or an inventory control system may be notified that the stock of a certain good has decreased. If the good requires special shipping, a notification may be sent to a shipping department allowing advance preparation for shipment of the good. A confirmation of the transaction may be transmitted to a purchaser, who may have been the potential purchaser. The processing flow may then continue to logical block 2822, END: TRANSACTION COMPLETED, where the procedure may end, perhaps producing a code or other indication of completion of the transaction.

In embodiments, an interactive reputation platform 100 may be deployed and used in connection with any of the interactions described in connection with FIG. 28. For example, an interactive reputation platform 100 may be used to provide reputation services through a reputation service host 112 as described in connection with FIGS. 1-17. For example, the reputation service host 112 may collect information through a collection facility 116 related to the sufficient stock 2804. Such information may assist in the overall rating of the supplier, and the information may be fed into an analysis facility 122 to make the assessment. As another example of providing a reputation service in connection with the process described in connection with FIG. 28, the reputation service host 112 may generate a warning or the like in connection with the collection of information relating to the inquiry of funds 2810. In embodiments, the reputation service host 112 may provide services related to collection of reputation information 116, providing warnings, alerts, and the like 114; providing analysis of reputation information 122; monitoring changes 124; and/or making alternative recommendations 130.

The system 1800 may provide the user with a facilitation of advertising service. This service may be represented by the FACILITATION OF ADVERT. logical block 2112 of FIG. 21A and may be described in detail hereinafter with references to FIGS. 29, 30, 31, 32, 33, and 34. Prior to accessing this service, the user may be required to gain access to this service by following the access procedure that may be represented by the ACCESS: ADVERT logical block 2142 of FIG. 21A, which may be described hereinbefore with reference to FIG. 26.

Figure 29:
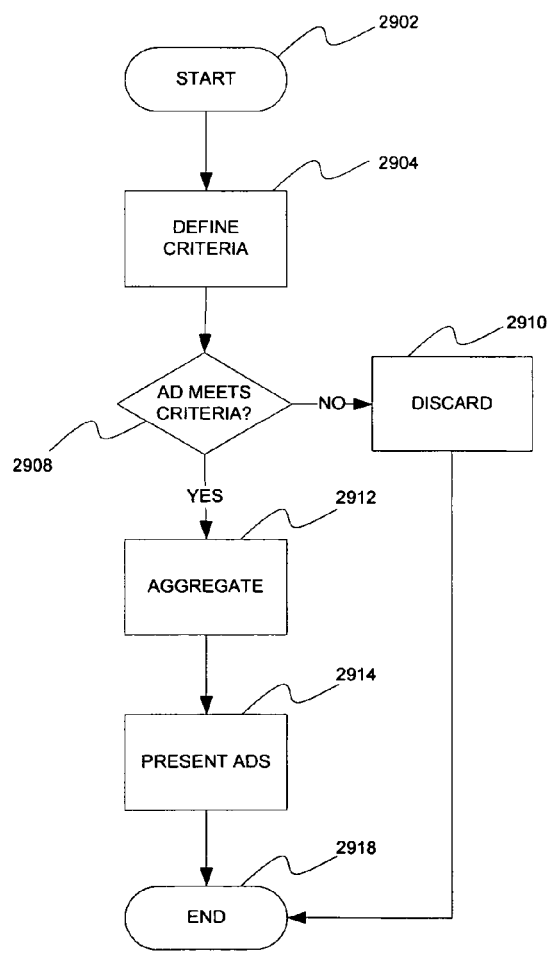
FIG. 29 illustrates an advertising aggregation process wherein the transactions may be monitored by a reputation service.

Referring to FIG. 29, the advertising service may include a procedure for aggregating advertisements. Beginning with the START logical block 2902, where an advertisement may be provided to the procedure, processing flow may proceed to the DEFINE CRITERIA logical block 2904. At this stage a criterion that may generally be associated with advertisements may be specified or defined. The criterion may pertain to content of the desired advertisements; delivery media of the desired advertisements; target demographics of the desired advertisements; cost of delivery of the desired advertisements; effectiveness of the desired advertisements; and so forth. In one embodiment, the system 1800 could include and/or the user may provide an advertising search engine, in which case a search string provided to the search engine may define the criterion. In another embodiment, the criterion may relate to a past behavior associated with one or more of the users 1802, such as and without limitation purchasing behavior, Web surfing behavior, and so forth.

Once the criterion is defined, the processing flow may then continue to a test, represented as logical block 2908 (labeled AD MEETS CRITERIA?), which may determine whether or not the advertisement meets the specified criterion. This test may include a comparison of the criterion to information that may be stored in one of the databases 1808 and/or associated with the advertisement. This information may, without limitation, include a description of the content of the advertisement, an MPAA rating, an ESRB rating, a geographic location, a price, a display size, a display format, a rendering capability, an activation time or date, a deactivation time or date, and so forth. If the advertisement does not meet the criterion it may be discarded as depicted by logical block 2910. However, if the advertisement does meet the defined criterion the process flow may proceed to the AGGREGATE logical block 2912. The AGGREGATE logical block 2912 may represent the aggregation of the advertisement with other advertisements that may or may not meet the criterion. Moreover, the advertisements contained in the aggregation may be prioritized, filtered, and/or sorted at this stage. The process flow may then proceed to the PRESENT ADS logical block 2914. This may represent the presentation of the advertisements to the user, to a subset of the users 1802 (such as and without limitation the users 1802 associated with a particular demographic), to all of the users 1802, and/or to the general public. The advertisements may be displayed in a way consistent with the prioritization, filtering, and/or sorting of the advertisements. This display of advertisements may be embodied as a Web site, which may contain only advertisements and which may be created via a manual and/or automatic process. In any case, the processing flow may then continue to logical block 2918 END, where the procedure may end, perhaps producing a code or other indication of completion of the procedure.

In embodiments, an interactive reputation platform 100 may be deployed and used in connection with any of the interactions described in connection with FIG. 29. For example, an interactive reputation platform 100 may be used to provide reputation services through a reputation service host 112 as described in connection with FIGS. 1-17. For example, the definition of the criteria step 2904 may involve the submission of information, and the reputation of the interaction may be assessed or indicated by the reputation service host 112. Additionally, the advertisement may be affiliated with a site or organization with a poor reputation, so the reputation service host 112 may indicate this to a user, such as by providing a visual cue within an interface that renders the advertisement, or intervening with a warning message if a user navigates to the advertisement. In embodiments, the reputation service host 112 may provide services related to collection of reputation information 116, providing warnings, alerts, and the like 114; providing analysis of reputation information 122; monitoring changes 124; and/or making alternative recommendations 130.

Figure 30:
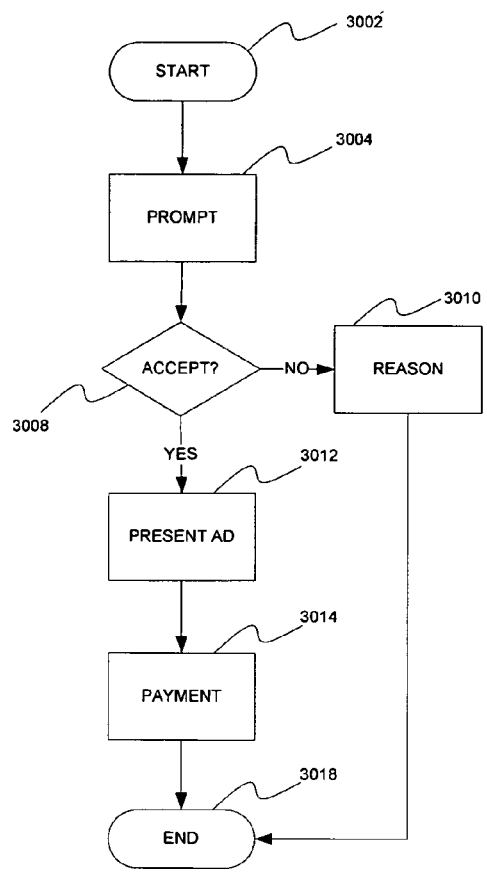
FIG. 30 illustrates a process including payments wherein the transactions may be monitored by a reputation service.

Referring to FIG. 30, the advertising service may include attention brokering such as buying and selling the attention of consumers. Beginning with the START logical block 3002, processing flow may proceed to the PROMPT logical block 3004. At this stage a user may be prompted to view an advertisement. Certain information about the advertisement may also be presented. The process flow may then proceed to a test, represented by logical block 3008 (labeled ACCEPT?), which may determine whether the user accepts presentation of the advertisement. If the result of this test is negative, the process flow may proceed to the REASON logical block 3010. At this step the user may provide a reason for declining presentation of the advertisement. The user may, for example, select from among several answer choices or enter his or her own choice. These reasons may then be presented to an administrator or the advertisers and used to alter the process or advertisement content so that the user is more likely to accept presentation of a future advertisement. However, if the result of the test at 3008 is affirmative, the processing flow may proceed to logical block 3012, which may represent the presentation of the advertisement to the user. The process flow may then proceed to the PAYMENT logical block 3014. This logical block 3014 may represent one or more payments to the user viewing the advertisement, or to an attention broker that placed the advertisement, or to a firm that created the advertisement, or some combination of these. There may also be one or more payments to other parties involved in the attention brokering process, such as a system administrator or Web site operator. Whether proceeding from 3010 or 3018, the processing flow may continue to logical block 3018 END, where the procedure may end, perhaps producing a code, payment record, and/or other indication of completion of the procedure.

In embodiments, an interactive reputation platform 100 may be deployed and used in connection with any of the interactions described in connection with FIG. 30. For example, an interactive reputation platform 100 may be used to provide reputation services through a reputation service host 112 as described in connection with FIGS. 1-17. For example, the user may decline the advertisement based on information provided by the reputation service host 112. In another aspect, the reason for declining an add may be gathered by the reputation service for use in reputation analysis. In another aspect, reputation data for the third parties involved in an attention brokering process (ad creator, ad sponsor, broker, etc.) may be employed to block certain advertisements, or to provide reputation-based warning messages to a user. In embodiments, the reputation service host 112 may provide services related to collection of reputation information 116, providing warnings, alerts, and the like 114; providing analysis of reputation information 122; monitoring changes 124; and/or making alternative recommendations 130.

Figure 31:
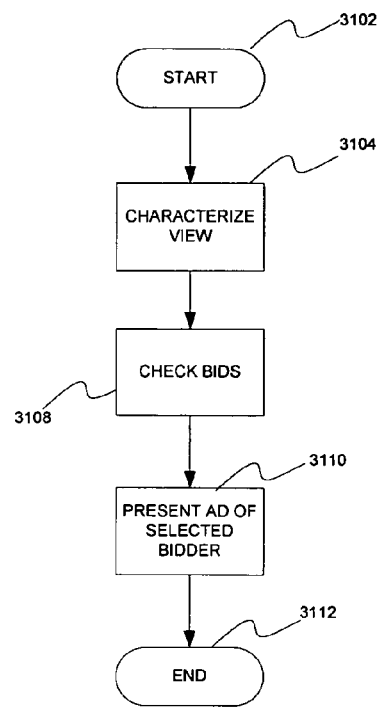
FIG. 31 illustrates a bidding process wherein the transactions may be monitored by a reputation service.

Referring to FIG. 31, the advertising service may include bidding to advertise, which may involve consumers being presented with advertisements from the highest bidding advertiser. Beginning with the START logical block 3102, processing flow may proceed to the CHARACTERIZE VIEW logical block 3104. The system 1800 may characterize the type of consumer or consumers who will view the advertisement. The process flow may then proceed to the CHECK BIDS logical block 3108, where bids associated with advertisements and placed by advertisers may be compared to determine a winning bid. The bids may be based upon target demographics; marketing objectives such as reach, recall, and number of impressions; pricing; and so forth. Once a winning bid is determined, the process flow may then proceed to the PRESENT AD OF SELECTED BIDDER 3110 logical block. Here, the system may present the advertisement associated with the winning bid to the user and/or one or more consumers, which may also be users 1802. In this way the system may fill orders for presentation of advertisements in connection with bids. The processing flow may then continue to logical block 3112 END, where the procedure may end, perhaps producing a code, presentation record to be used for billing purposes, or other indication of completion of the procedure.

In embodiments, an interactive reputation platform 100 may be deployed and used in connection with any of the interactions described in connection with FIG. 31. For example, an interactive reputation platform 100 may be used to provide reputation services through a reputation service host 112 as described in connection with FIGS. 1-17. For example, sponsored links and other results of a bidding advertisement may be provided to a user, and a reputation service host 112 may provide warnings and the like associated with the sponsored content. In embodiments, the sponsored link may be presented along with an indication of reputation to alert the user of which sponsored content is acceptable from a reputation standpoint. In other embodiments, poor reputation sponsored content may not be provided to the user. It may be filtered or otherwise removed by the reputation service host 112. In embodiments; the reputation service host 112 may provide services related to collection of reputation information 116, providing warnings, alerts, and the like 114; providing analysis of reputation information 122; monitoring changes 124; and/or making alternative recommendations 130.

Figure 32:
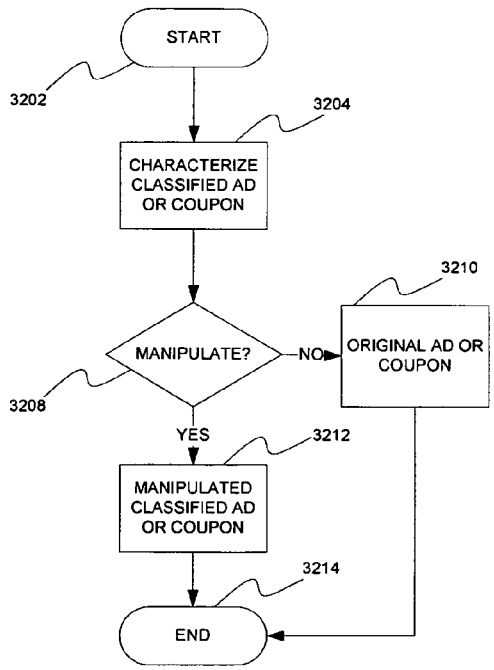
FIG. 32 illustrates a classified ad/coupon process wherein the transactions may be monitored by a reputation service.

Referring to FIG. 32, the advertising service may include the manipulation of a classified advertisement or coupon. Beginning with the START logical block 3202, processing flow may proceed to the CHARACTERIZE CLASSIFIED AD OR COUPON logical block 3204. The logical block 3204 may represent an action of characterizing the classified advertisement or coupon. Relevant characteristics may include source, expiration, price, and type of good and/or service, and so forth. The process flow may then continue to a test, represented as logical block 3208 (labeled MANIPULATE?), which may determine whether the classified advertisement or coupon should be manipulated. If the test result is negative, the process flow may proceed to the logical block ORIGINAL AD OR COUPON 3210 and the classified advertisement or coupon may not be manipulated. If the test result is affirmative, however, then the system may manipulate the classified advertisement or coupon, as may be represented by the MANIPULATED CLASSIFIED AD OR COUPON logical block 3212. Coupon manipulation may involve the issuing, processing, modifying, aggregating, redeeming, revoking, validating, distributing, or otherwise affecting or handling of the coupon. Manipulation of a classified advertisement may include the printing, processing, modifying, aggregating, canceling, validating, distributing, or otherwise affecting or handling of the classified advertisement. The processing flow may then continue to logical block 3214 END, where the procedure may end, perhaps producing a code, record, or other indication of completion of the procedure.

In embodiments, an interactive reputation platform 100 may be deployed and used in connection with any of the interactions described in connection with FIG. 32. For example, an interactive reputation platform 100 may be used to provide reputation services through a reputation service host 112 as described in connection with FIGS. 1-17. For example, the reputation service host 112 may present information relating to the reputation of the coupon or classified ad issuer or affiliated site information. As an additional example, a user may be presented with warnings or other indicators prior to manipulating or issuing the classified ad or coupon. In embodiments, the reputation service host 112 may provide services related to collection of reputation information 116, providing warnings, alerts, and the like 114; providing analysis of reputation information 122; monitoring changes 124; and/or making alternative recommendations 130.

Figure 33:
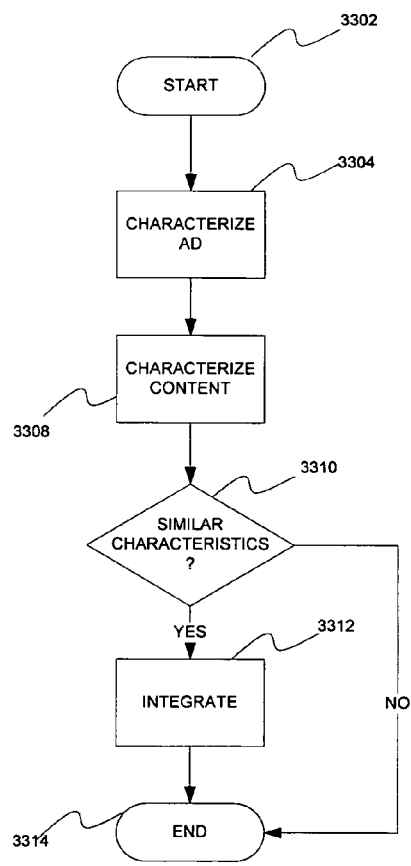
FIG. 33 illustrates an advertisement integration process wherein the transactions may be monitored by a reputation service.

Referring to FIG. 33, the advertising service may include the dynamic insertion of an advertisement into other content. Beginning with the START logical block 3302, processing flow may proceed to the CHARACTERIZE AD logical block 3308, which may represent an action of characterizing the advertisement. Characteristics of the advertisement may include the type of good and/or service offered for sale, the pricing structure, a target geographic region, a target demographic, and so forth. The process flow may then proceed to the CHARACTERIZE CONTENT logical block 3308, which may involve the characterization of the other content. The other content may be electronic content, perhaps including audio, video, text, and so forth. Characteristics of the content may include target age, running time, target geographic region, target demographic, and so forth. The process flow may then continue to a test, which may be represented as logical block 3310 (labeled CHARACTERIZE CONTENT?). The test may determine the degree of similarity or compatibility between the advertisement and the other content. If the degree of similarity or compatibility is below a certain threshold, the test result may be negative. If the degree of similarity or compatibility is above or equal to a certain threshold, the test result may be affirmative. For example, the electronic content and advertisement may be targeted to consumers of a similar age in a similar geographic region. In another example, the editor or publisher of the advertisement and the content may be the same, leading to an affirmative test result. Given the affirmative test result, the process flow may proceed to the INTEGRATE logical block 3312. This logical block 3312 may represent the integration of the advertisement into the other content. The system may optimize the location and manner of integration of the advertisement based on the characterization of the advertisement, the characterization of the other content, or other factors. Whether due to a negative result at 3310 or due to normal processing flow from 3312, the processing flow may continue to logical block 3314 END, where the procedure may end, perhaps producing a code, record, or other indication of completion of the procedure.

In embodiments, an interactive reputation platform 100 may be deployed and used in connection with any of the interactions described in connection with FIG. 33. For example, an interactive reputation platform 100 may be used to provide reputation services through a reputation service host 112 as described in connection with FIGS. 1-17. For example, a reputation service host 112 may be used in connection with the characterization step 3304 to assist in the determination of an acceptable advertisement. The advertisement may not be acceptable if the reputation service host indicates the reputation of the advertisement or advertisement provider is of poor reputation. In embodiments, the reputation of the advertisement or advertisement provider may be a factor in the overall decision relating to the advertisement incorporation. In embodiments, when the advertisement or provider has a poor reputation, a reputation service host 112 may provide recommendations for other advertisements for inclusion. In embodiments, the reputation service host 112 may provide services related to collection of reputation information 116, providing warnings, alerts, and the like 114; providing analysis of reputation information 122; monitoring changes 124; and/or making alternative recommendations 130.

Referring to FIG. 34, the advertising service may include permission-based advertising. Beginning with the START logical block 3402, processing flow may proceed to the SELECT AD logical block 3404, which may represent a selection of an advertisement to be transmitted or presented to a recipient, which may be the user or some other consumer. The process flow may then proceed to the SELECT POTENTIAL RECIPIENT 3408 logical block, which may involve selection of the recipient. The process flow may then continue to a test, which may be represented as logical block 3410 (labeled PERMISSION?). This test may determine whether an advertiser associated with the advertisement has permission to transmit the advertisement to the recipient. The permission may depend upon the advertisement's type and/or a transmission method's type, where the transmission method may be used to transmit the advertisement. For example, the advertiser may have permission to transmit the advertisement to the recipient only when the advertisement relates to electronics and the advertisement is transmitted via e-mail. It follows that, if the result of the test at 3410 is negative, the advertisement may not be sent, and processing flow may proceed to the END logical block 3414. However, if the test result is affirmative, the process flow may proceed to the SUPPLY AD logical block 3412, which may represent transmitting the advertisement to the recipient. The advertisement may be transmitted over the Internet, via email, via fax, via instant messenger, via VoIP, via telephone, as video, as audio, as text, or by any other delivery or presentation method. The processing flow may then continue to logical block 3414 END, where the procedure may end, perhaps producing a code, record, or other indication of completion of the procedure.

In embodiments, an interactive reputation platform 100 may be deployed and used in connection with any of the interactions described in connection with FIG. 34. For example, an interactive reputation platform 100 may be used to provide reputation services through a reputation service host 112 as described in connection with FIGS. 1-17. For example, the reputation service host 112 may provide warnings or other such services in connection with a user receiving such advertisements. In embodiments, the reputation service host 112 may provide services related to collection of reputation information 116, providing warnings, alerts, and the like 114; providing analysis of reputation information 122; monitoring changes 124; and/or making alternative recommendations 130.

The system 1800 may facilitate many other advertising services. Prior to accessing these other advertising services 2112, the user may be required to gain access to the services by following the ACCESS: ADVERT procedure 2142. The advertising service may support direct communication between an advertiser and one of the users or direct communication between one or more users. The advertising service may also, or instead, provide a promotion. The advertising service may also, or instead, be a commercial e-mail service. Any of the abovementioned advertising procedures may apply to the commercial e-mail service.

The system 1800 may provide the user with a facilitation of recommendation service. This service may be represented by the FACILITATION OF RECOMMEND logical block 2114 of FIG. 21A. One embodiment is described in greater detail with reference to FIG. 35 below. Prior to accessing this service, the user may be required to gain access to the service by following the access procedure that may be represented by the ACCESS: RECOMMEND logical block 2144 of FIG. 21A, which may be described hereinbefore with reference to FIG. 26.

Referring to FIG. 35, the facilitation of recommendation service may be provided according to the depicted procedure. The service may involve the provision, generation, and/or delivery of a recommendation based on or associated with one or more of a buying-based behavior, a click-based behavior, collaborative filtering, customer reviews, editorial reviews, machine learning, reputation measures, and so forth. Beginning with the START logical block 3502, the process flow may proceed to the DETERMINE CRITERIA logical block 3504, which may represent determining a criterion relevant to the provision, generation, and/or delivery of the recommendation. The criterion may relate to the recommendation and/or to a potential recipient of the recommendation. The process flow may then proceed to the ASSESS CRITERIA logical block 3508, which may represent an assessment of the criterion determined in the DETERMINE CRITERIA logical block 3504. As an example, the relevant criterion may be a buying-based behavior, a click-based behavior, a customer review, a reputation rating, and so forth. The assessment of a buying-based behavior criterion may be that the potential recipient of the recommendation has purchased three items of a certain type in the last four months. The assessment of a customer review may be expressed as a number of stars on a five-star scale that an item may have received in a customer review. The processing flow may continue to a test, represented as logical block 3510 (labeled RELEVANCE?), which may determine whether the recommendation is relevant to the potential recipient of the recommendation. If the test result is affirmative, processing flow may continue to the PRESENT RECOMMENDATION logical block 3512, where the recommendation may be generated, provided, and/or delivered to the potential recipient. For example, the recommendation may be a favorable recommendation related to an accessory for a product purchased by the recipient of the recommendation in the last three months. Then, the processing flow may continue to the END logical block 3514. However, if the test result is negative, the recommendation may not be presented and processing flow may continue to logical block 3514 END, where the procedure may end, perhaps producing a code, record, or other indication of completion of the procedure.

In embodiments, an interactive reputation platform 100 may be deployed and used in connection with any of the interactions described in connection with FIG. 35. For example, an interactive reputation platform 100 may be used to provide reputation services through a reputation service host 112 as described in connection with FIGS. 1-17. For example, the recommendation process may be associated with a collection facility 116. In embodiments, the reputation service host 112 may provide services related to collection of reputation information 116, providing warnings, alerts, and the like 114; providing analysis of reputation information 122; monitoring changes 124; and/or making alternative recommendations 130. The reputation service may evaluate particular recommendations, or sources thereof, and provide reputation-based feedback concurrently with recommendations that are received by a user. This may include, for example, a reputation-based analysis of a source of the recommendation.

The system 1800 may provide the user with a facilitation of metadata service. This service may be represented by the FACILITATION OF METDATA logical block 2118, described in greater detail with reference to FIG. 36 below. Prior to accessing this service, the user may be required to gain access to this service by following the access procedure that may be represented by the ACCESS: METADATA logical block 2148.

Figure 36:
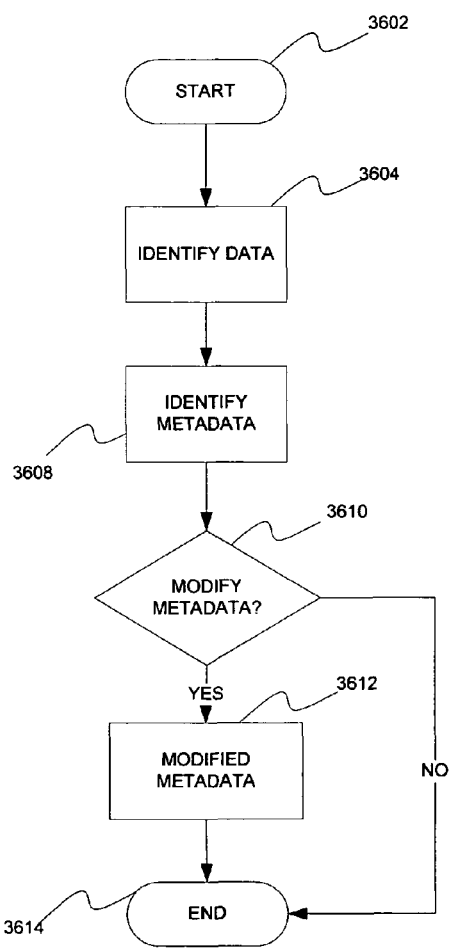
FIG. 36 illustrates a metadata manipulation process wherein the transactions may be monitored by a reputation service.

Referring to FIG. 36, the FACILITATION OF METADATA service 2118 may be provided according to the depicted procedure. The service may involve the dynamic modification of user state, navigation, and/or navigation based upon behavior. Beginning with the START logical block 3602, the process flow may proceed to the IDENTIFY DATA logical block 3604, which may represent the identification of a certain datum of interest. The datum may relate to a user, an item, a company, or other data. The process flow may then proceed to the IDENTIFY METADATA logical block 3608, which may represent identifying the metadata of interest associated with the data. For example, the metadata associated with a user may include the passwords, ratings, favorite Web site, account information, shipping and billing addresses of the user, and so forth.

The processing flow may continue to a test, which may be represented as logical block 3610 (labeled MODIFY METADATA?), which may determine whether the metadata associated with the data should be modified. If the test result is affirmative, the metadata may be modified. For example, a user may have a new shipping address. The shipping address may be stored as metadata and may be updated as new information. The processing flow may then proceed to the MODIFIED METADATA logical block 3612, which may represent the modified metadata. If the test result is negative, the metadata may not be modified. This may be the case if the user does not have the security or access level required for modification of the relevant metadata. The processing flow may then continue to logical block 3614 END, where the procedure may end, perhaps producing a code, record, and/or other indication of completion of the procedure.

In embodiments, an interactive reputation platform 100 may be deployed and used in connection with any of the interactions described in connection with FIG. 36. For example, an interactive reputation platform 100 may be used to provide reputation services through a reputation service host 112 as described in connection with FIGS. 1-17. For example, while the metadata associated with the transaction may be identified, such identification may be monitored through a reputation service host 112. In other embodiments, the reputation service host may prevent the collection of the metadata until such time the reputation of the requestor is verified. In embodiments, the user of a client 102 may be alerted to the fact that metadata is being requested, and the reputation of the requestor may be presented to the user. The metadata may also include information that is used by the reputation service, such as in evaluating user preferences or evaluating the reliability of a user in providing feedback to the reputation system. In embodiments, the reputation service host 112 may provide services related to collection of reputation information 116, providing warnings, alerts, and the like 114; providing analysis of reputation information 122; monitoring changes 124; and/or making alternative recommendations 130.

The system 1800 may provide the user with a facilitation of price service. This service may be represented by the FACILITATION OF PRICE logical block 2120. Prior to accessing this service, the user may be required to gain access to this service by following the access procedure that may be represented by the ACCESS: PRICE logical block 2150.

Figure 37:
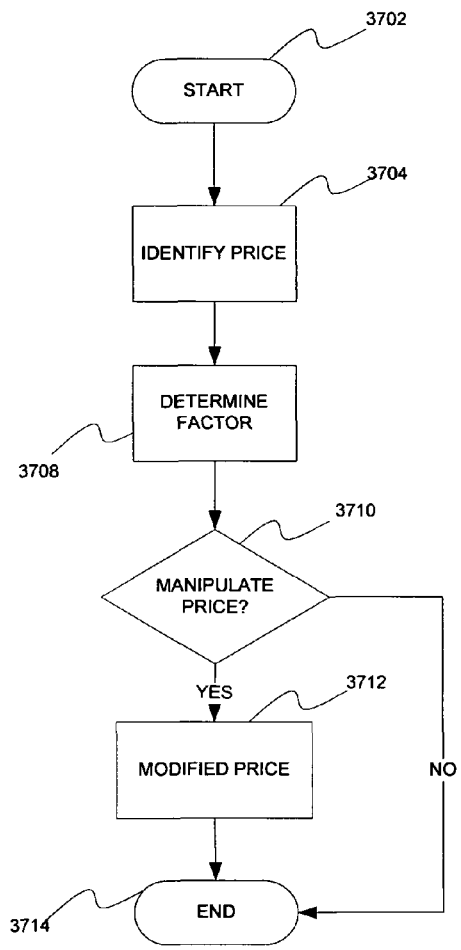
FIG. 37 illustrates a price manipulation process wherein the transactions may be monitored by a reputation service.

Referring to FIG. 37, the facilitation of price service may be provided according to the depicted procedure. Beginning with the START logical block 3702, the process flow may proceed to the IDENTIFY PRICE logical block 3704; which may represent identifying a certain price of interest. The price may relate to a good and/or service of interest. The processing flow may then proceed to the DETERMINE FACTOR logical block 3708, which may represent determining a factor. The factor may be an agent or bot, an auction, a catalog aggregator, a pricing comparison engine, a rating, and/or a reverse auction. The processing flow may continue to a test, which may be represented as logical block 3710 (labeled MODIFY PRICE?), which may determine whether the price should be modified based on the factor. The manipulation may include generating, retrieving, storing, deducing, guessing, anticipating, and/or modifying the price. If the test result is affirmative, processing flow may continue first to the MODIFIED PRICE logical block 3712, where the price may be modified, and then to the END logical block 3714, as shown. However, if the test result is negative, processing flow may continue to the END logical block 3714, where the procedure may end, perhaps producing a code, a record, and/or other indication of completion of the procedure. For example, the price may be the price of a certain computer monitor offered for sale by the user, and the factor may be a price comparison engine. The comparison engine may locate the prices at which competitors of the user are offering the same monitor. An aspect of the system 1800, such as the central processing facility 1902 and/or an automatic computer that may be one of the user's 1802, may be programmed to maintain the lowest price on the market for the monitor. If any of the competitors' prices are lower than the user's price, the test result may be affirmative and, therefore, the processing flow may proceed to the MODIFIED PRICE logical block 3712, which may represent this aspect of the system reducing the price.

In embodiments, an interactive reputation platform 100 may be deployed and used in connection with any of the interactions described in connection with FIG. 37. For example, an interactive reputation platform 100 may be used to provide reputation services through a reputation service host 112 as described in connection with FIGS. 1-17. For example, competitor pricing may be provided in association with a reputation service. The reputation service may provide an indication of the competitor's reputation. The reputation may relate to computer security; however, in embodiments, the reputation may relate to the competitor's services, such as delivery, customer service performance, and the like. In embodiments, the reputation service host 112 may provide services related to collection of reputation information 116, providing warnings, alerts, and the like 114; providing analysis of reputation information 122; monitoring changes 124; and/or making alternative recommendations 130.

The system 1800 may provide the user with a FACILITATION OF COMMUNICATION OF INFORMATION service 2138, which is described hereinafter with reference to FIG. 38. Prior to accessing this service 2138, the user may be required to gain access to the service by following the ACCESS: COMMUNICATION OF INFORMATION procedure 2168, which may be described hereinbefore with reference to FIG. 26.

Referring to FIG. 38, the FACILITATION OF COMMUNICATION OF INFORMATION service may be provided according to the depicted procedure. Beginning with the START logical block 3802, processing flow may continue to a test, represented as logical block 3804 (labeled DATA TO SEND?), which may determine whether there exist data ("the existing data") to send from the remote terminal 1812 to the central processing facility 1902. If the test result is affirmative, processing flow may proceed to the SEND DATA logical block 3808, where the existing data may be transmitted from the remote terminal 1812 to the central processing facility 1902. Next, processing flow may continue to another test, which may be represented as logical block 3810 (labeled DATA TO RECEIVE?), which may determine whether there exist data to receive from the central processing facility 1902 at the remote terminal 1812. Similarly, if the test result at 3804 is negative, processing flow may proceed to 3810. In any case, if the test result at 3810 is affirmative, processing flow may continue to the RECEIVE DATA logical block 3812. Otherwise, processing flow may continue to a test at logical block 3814 (labeled MORE TO SEND/RECEIVE?). The RECEIVE DATA logical block 3812 may represent the transmission of data from the central processing facility 1902 and the subsequent reception of the data at the remote terminal 1812. The test at logical block 3814 may determine whether there are more data to be sent and/or received by the central processing facility 1902 and/or the remote terminal 1812. If the result of this test is affirmative, processing flow may proceed as shown, reentering the logical block 3804. Otherwise, the processing flow may continue to logical block 3818 END, where the procedure may end, perhaps producing a code or other indication associated with the transmission and/or reception of data.

In embodiments, an interactive reputation platform 100 may be deployed and used in connection with any of the interactions described in connection with FIG. 38. For example, an interactive reputation platform 100 may be used to provide reputation services through a reputation service host 112 as described in connection with FIGS. 1-17. For example, in embodiments, no data may be received at step 3810 unless verified through a reputation service host 112. In embodiments, the reputation service host 112 may provide services related to collection of reputation information 116, providing warnings, alerts, and the like 114; providing analysis of reputation information 122; monitoring changes 124; and/or making alternative recommendations 130.

FIG. 39 shows a FACILITATION OF USER INTERFACE service 2134. Starting at the step 3902, processing flow may proceed to a FUNCTION SELECTION logical block 3904, where an appropriate user interface function may be selected. This function selection may be determined based upon a preference, which may be specified by the user, may be implied by a type of the remote terminal 1812 (such as and without limitation: media player, mobile Web facility, Web facility, or secure device), and/or may be stored in one of the databases 1808. Once a user interface function is selected, processing flow may proceed to the selected function, which may be represented as one of the logical blocks 3908, 3910, 3912, 3914, and 3918. Generally, these functions may provide a user interface, which may be displayed on the remote terminal and with which the user may interact with other computing services 1810. For example, a MEDIA PLAYER 3908 may represent a function that enables an audio, video, or other rich media interface. This enablement may without limitation comprise the provision of data in one or more of the following formats: Macromedia Flash, Windows WMV, Apple QuickTime, MPEG-3, MPEG-4, WAV, Java JAR file, Windows native executable, Macintosh native executable, and so forth. The MOBILE WEB FACILITY 3910 may represent a function that enables a mobile Web interface, such as may be embodied by a cell phone, a PDA, and so forth. This enablement may without limitation comprise the provision of data in one or more of the following formats: SMS, XML, HTML, XHTML, and so forth. The WEB FACILITY 3912 may represent a function that enables a Web interface, such as may be embodied by a Web browser. This enablement may without limitation comprise the provision of data in one or more of the following formats: XML, XHTML, HTML, and so forth. The SECURE DEVICE 3914 may represent a function that enables an interface on a secure device, such as may be embodied by a remote terminal 1812 connected to the central processing facility 1902 via a secure protocol such as SSH, SSL, IPSec, and so forth. This enablement may without limitation comprise the provision of data encrypted according to one or more of the following algorithms: 3-Way, Blowfish, CAST, CMEA, DES, Triple-DES, DEAL, FEAL, GOST, IDEA, LOKI, Lucifer, MacGuffin, MARS, MISTY, MMB, NewDES, RC2, RC4, RC5, RC6, REDOC, Rijndael, Safer, Serpent, SQUARE, Skipjack, TEA, Twofish, ORYX, and/or SEAL. As shown, unless the END USER INTERFACE SERVICE function (represented by logical block 3918) is selected, processing flow may return to the FUNCTION SELECTION logical block 3904. Logical block 3918 may represent the end of this procedure and, perhaps, may represent the production of a success code, an exit code, or some other indication of process termination.

In embodiments, an interactive reputation platform 100 may be deployed and used in connection with any of the interactions described in connection with FIG. 21B. For example, an interactive reputation platform 100 may be used to provide reputation services through a reputation service host 112 as described in connection with FIGS. 1-17. For example, interactions with data using a selected function may be monitored by a reputation service host 112. In embodiments, the reputation service host 112 may provide services related to collection of reputation information 116, providing warnings, alerts, and the like 114; providing analysis of reputation information 122; monitoring changes 124; and/or making alternative recommendations 130.

FIG. 40 shows a FACILITATON OF A PORTAL service 2132. The procedure may begin at the START logical block 4002 and may proceed to the CONNECT TO DATABASE logical block 4004. In step 4004, a central processing facility 1902 may connect to one of the databases 1808 (which may be referred to in this paragraph as "the database"). Processing flow may continue to logical block 4008 where links to other resources, which may without limitation be embodied as URLs or URIs, may be selected from the database. The other resources may relate to subject matter associated with an object of electronic commerce. For example and without limitation, the object of electronic commerce may be common stock, and the related subject matter may without limitation comprise news with potential impact on the value of the common stock, real-time quotes, historical data, stock market averages, and so forth. The other resources may also be the services 1810. After selecting the links, a Web page comprising the links may be created at logical block 4012. This Web page may then be presented to the user, as may be shown by the PRESENT WEB PAGE TO USER logical block 4014. The user may select a link within the Web page, which may be received by the system 1800 as user input, as may be shown by the RECEIVE USER INPUT logical block 4010. Processing flow may then continue to a test in logical block 4018, which may determine whether the user input is indicative of the user's desire to leave the portal. If so, processing flow may proceed to the END logical block 4024, where the procedure may end. Otherwise, processing flow may continue to logical block 4020 (labeled RESOURCE IS SERVICE?), where a test may determine whether the user input is indicative of the user requesting a service 1810. If this test results in an affirmative result, processing flow may proceed to logical block 4022 where the service 1810 may be provided, such as by spawning a process and/or thread as described hereinbefore with reference to FIG. 21B. Finally, processing flow may proceed back to 4004 as shown. It should be appreciated that, in embodiments, the connection to the database 1808 that may be established during the first pass of the processing flow through 4004 may be a persistent connection and that subsequent passes through 4004 may simply check to see if the persistent connection is still valid. If it is, processing flow may proceed immediately to 4008. If it isn't, the connection may be reestablished.

In embodiments, an interactive reputation platform 100 may be deployed and used in connection with any of the interactions described in connection with FIG. 40. For example, an interactive reputation platform 100 may be used to provide reputation services through a reputation service host 112 as described in connection with FIGS. 1-17. In embodiments, the reputation service host 112 may provide services related to collection of reputation information 116' providing warnings, alerts, and the like 114; providing analysis of reputation information 122; monitoring changes 124; and/or making alternative recommendations 130.

Figure 41:
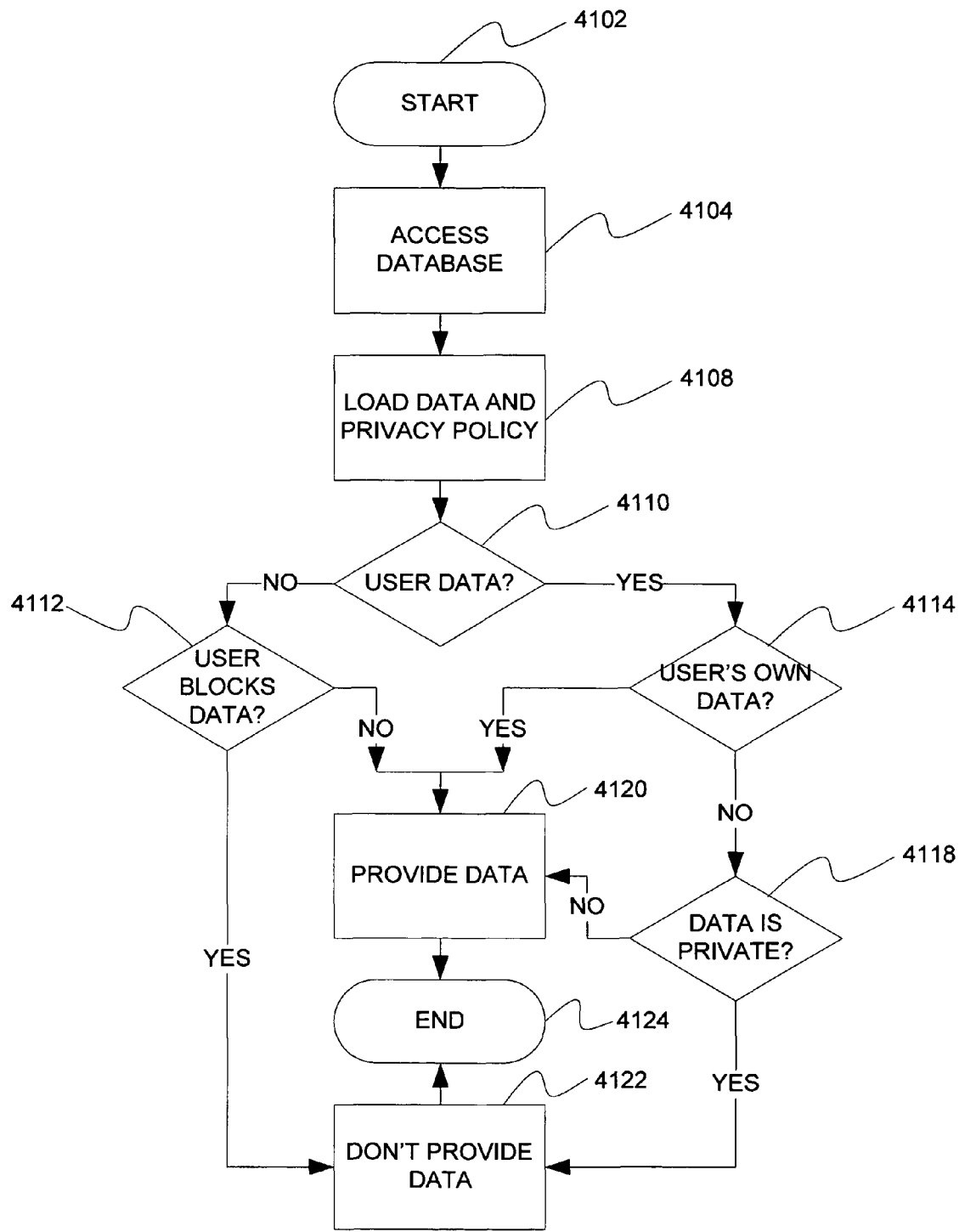
FIG. 41 illustrates a privacy policy process wherein the transactions may be monitored by a reputation service.

FIG. 41 shows a facilitation of privacy policy service. The procedure may begin at the START logical block 4102 and proceed to the ACCESS DATABASE logical block 4104. In step 4104, a central processing facility 1902 may connect to one of the databases 1808 (which may be referred to in this paragraph as "the database"). Processing flow may continue to LOAD DATA AND PRIVACY POLICY logical block 4108 where data and a privacy policy may be selected from the database. Next, a test to determine whether the data are associated with one of the users 1802 is conducted, as may be shown by the logical block 4110 (labeled USER DATA?). If the result of the test is affirmative, processing flow may continue to logical block 4114 (labeled USER'S OWN DATA?), where a test may be conducted to determine if the data belong to the user. If the result of the test at 4114 is affirmative, processing flow may continue, as shown, to the PROVIDE DATA logical block 4120, where the data may be provided to the user. From there, processing flow may continue to the END logical block 4124, where this procedure may end, perhaps producing a code, record, or other indication of completion of the procedure. However, if the result of the test at 4114 is negative, then processing flow may continue to a test that may determine whether the privacy policy indicates that the data are private, as shown by logical block 4118 (labeled DATA ARE PRIVATE?). If the result of this test is negative, then processing flow may continue to logical block 4120, as shown. Otherwise, processing flow may continue to the DON'T PROVIDE DATA logical block 4122, where the data may not be provided to the user and from which processing flow may then proceed to the END logical block 4124. However, if the result of the test at 4110 is negative, then processing flow may proceed to logical block 4112 (labeled USER BLOCKS DATA?), where a test may be conducted to determine if the privacy policy contains an indication that one of the users 1802 desires to block the data. If this test results in an affirmative result, then processing flow may proceed as shown to logical block 4122. Otherwise, processing flow may proceed, also as shown, to logical block 4120.

In embodiments, an interactive reputation platform 100 may be deployed and used in connection with any of the interactions described in connection with FIG. 21B. For example, an interactive reputation platform 100 may be used to provide reputation services through a reputation service host 112 as described in connection with FIGS. 1-17. In embodiments, the reputation service host 112 may provide services related to collection of reputation information 116, providing warnings, alerts, and the like 114; providing analysis of reputation information 122; monitoring changes 124; and/or making alternative recommendations 130.

Figure 42:
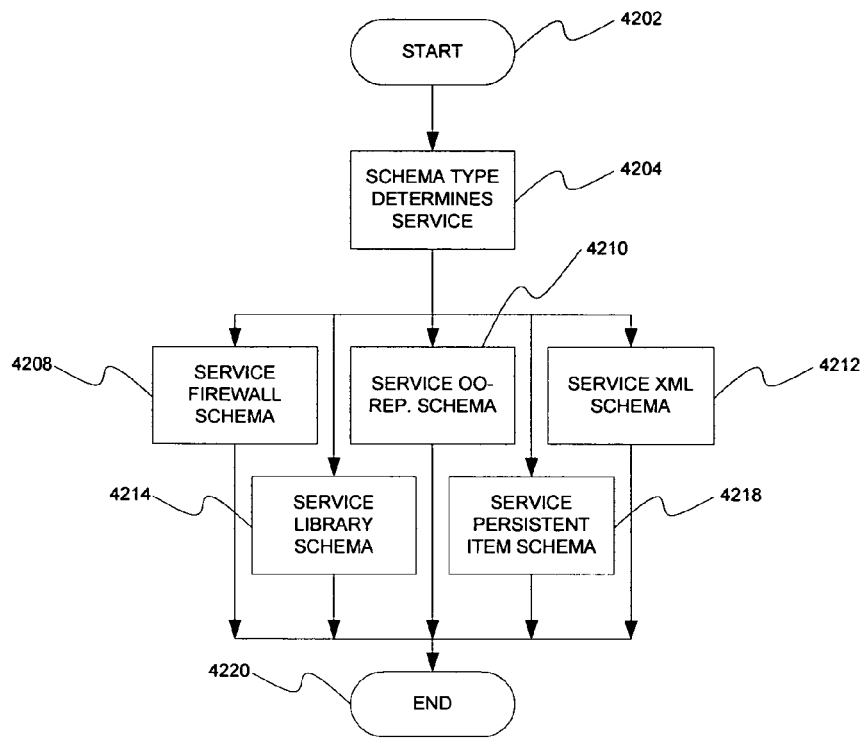
FIG. 42 illustrates a schema determination process wherein the transactions may be monitored by a reputation service.

FIG. 42 shows a FACILITATON OF SCHEMA service 2128. The procedure may begin at the START logical block 4202, with a schema being provided as input to the procedure. Processing flow may proceed to the SCHEMA TYPE DETERMINES SERVICE logical block 4204. Here, a type associated with the schema may be determined, and this type may be used to direct the processing flow, as depicted. In the case that the type is deemed to be a schema associated with a firewall, processing flow may proceed to logical block SERVICE FIREWALL SCHEMA 4208; if the type is deemed associated with an object-oriented representation, processing flow may proceed to logical block SERVICE OO-REP. SCEMA 4210; if the type is deemed associated with XML, processing flow may proceed to logical block SERVICE XML SCHEMA 4212; if the type is deemed associated with a library, processing flow may proceed to logical block SERVICE LIBRARY SCHEMA 4214; and if the type is deemed associated with a persistent item, processing flow may proceed to logical block SERVICE PERSISTENT ITEM SCHEMA 4218. Logical block 4208 may represent the provision of a function related to a firewall, which may be described in the schema. For example and without limitation, the schema may describe a virtual private network configuration as it relates to the firewall. In this case, the function related to the firewall may be the establishment of a VPN connection to the firewall according to the configuration. This may provide a secure communication channel, which may persist beyond the execution of this service 2128 and which may secure communications between or among components of the system 1800. Logical block 4210 may represent the provision of a function related to an object-oriented representation, which may be embodied by the schema. For example and without limitation, this function may provide a rendition of the object-oriented representation according to Unified Modeling Language. This rendition may be graphical, such as may be embodied by an image data file, and/or it may be textual, such as may be embodied in an XML Metadata Interchange (XMI) file. Logical block 4212 may represent the provision of a function related to XML, which may be described and/or embodied by the schema. For example and without limitation, this function may comprise a parsing, interpreting, writing, rewriting, storing, retrieving, protecting, encrypting, decrypting, or otherwise processing XML. Logical block 4214 may represent the provision of a function related to a library, such as a library with books and/or a software library, either of which may be described and/or embodied by the schema. In the case where the library is of books, this function may without limitation enable looking up in, checking out from, checking in to, purchasing from, subscribing to, and/or donating to the library. In the case where the library is a software library, this function may without limitation provide dynamic linking or other operative coupling to the library, documentation associated with the library, a functional description of the library, a generalized flow diagram related to the library, and so forth. Logical block 4218 may represent the provision of a function related to a persistent item, which may be embodied by the schema. For example and without limitation, this function may comprise providing persistent storage for a schema and/or a lookup mechanism by which a permanent or unchanging reference to the schema may be de-referenced. Thus it will be appreciated that, more generally, schemas may capture a wide variety of substantive content, protocol and configuration data, state data, and so forth, any of which may be usefully processed in an electronic commerce context.

In embodiments, an interactive reputation platform 100 may be deployed and used in connection with any of the interactions described in connection with FIG. 42. For example, an interactive reputation platform 100 may be used to provide reputation services through a reputation service host 112 as described in connection with FIGS. 1-17. In embodiments, the reputation service host 112 may provide services related to collection of reputation information 116; providing warnings, alerts, and the like 114; providing analysis of reputation information 122; monitoring changes 124; and/or making alternative recommendations 130.

Figure 43:
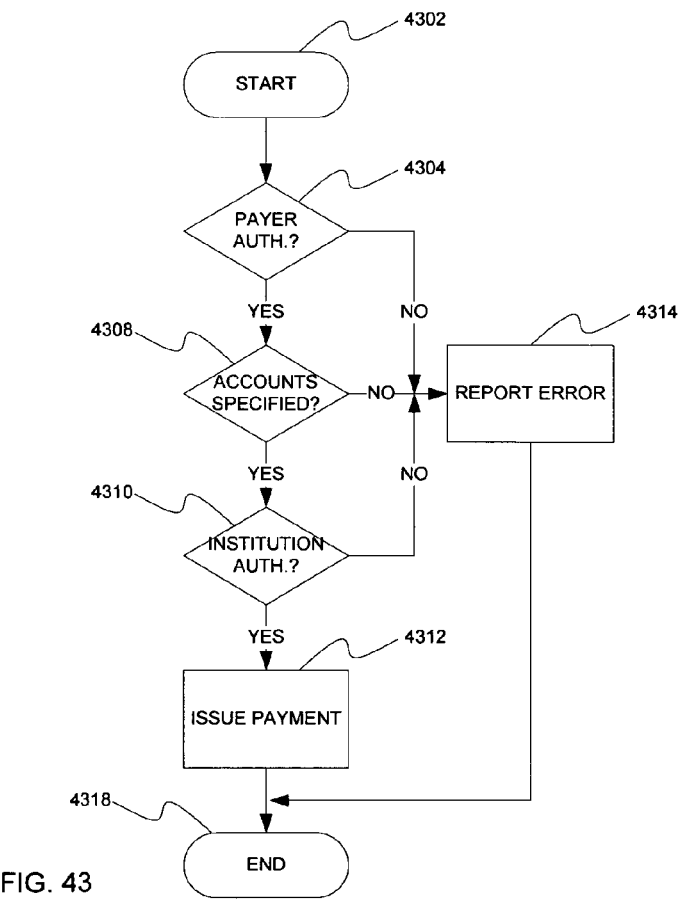
FIG. 43 illustrates a payment process wherein the transactions may be monitored by a reputation service.

FIG. 43 shows a transaction service that may be used with the systems described herein. The procedure may begin at the START logical block 4302, with processing flow continuing as shown to the logical block 4304 (labeled PAYER AUTH.?). This logical block may represent a test to see if the payer has authorized a transaction. If the result of the test is negative, processing flow may proceed to the REPORT ERROR logical block 4314, where an error code or indication of error may be provided. Otherwise, processing flow may proceed to the logical block 4308 (labeled ACCOUNTS SPECIFIED?) where a test may determine whether a source account was specified for the transaction. If the result of the test is negative, processing flow may proceed as shown to logical block 4314. Otherwise, processing flow may continue to logical block 4310 where a test may determine whether a financial institution that may be associated with the account authorizes the transaction. If the result of this test is negative, processing flow may proceed as shown to logical block 4314. Otherwise, processing flow may continue to the ISSUE PAYMENT logical block 4312, by which the payment may be drawn from the source account and deposited into a destination account. Whether from logical block 4312 or logical block 4314, processing flow may proceed to the END logical block 4318, where this procedure may end, perhaps producing a code, record, or other indication of completion of the procedure.

In embodiments, an interactive reputation platform 100 may be deployed and used in connection with any of the interactions described in connection with FIG. 21B. For example, an interactive reputation platform 100 may be used to provide reputation services through a reputation service host 112 as described in connection with FIGS. 1-17. In embodiments, the reputation service host 112 may provide services related to collection of reputation information 116; providing warnings, alerts, and the like 114; providing analysis of reputation information 122; monitoring changes 124; and/or making alternative recommendations 130.

Figure 44:
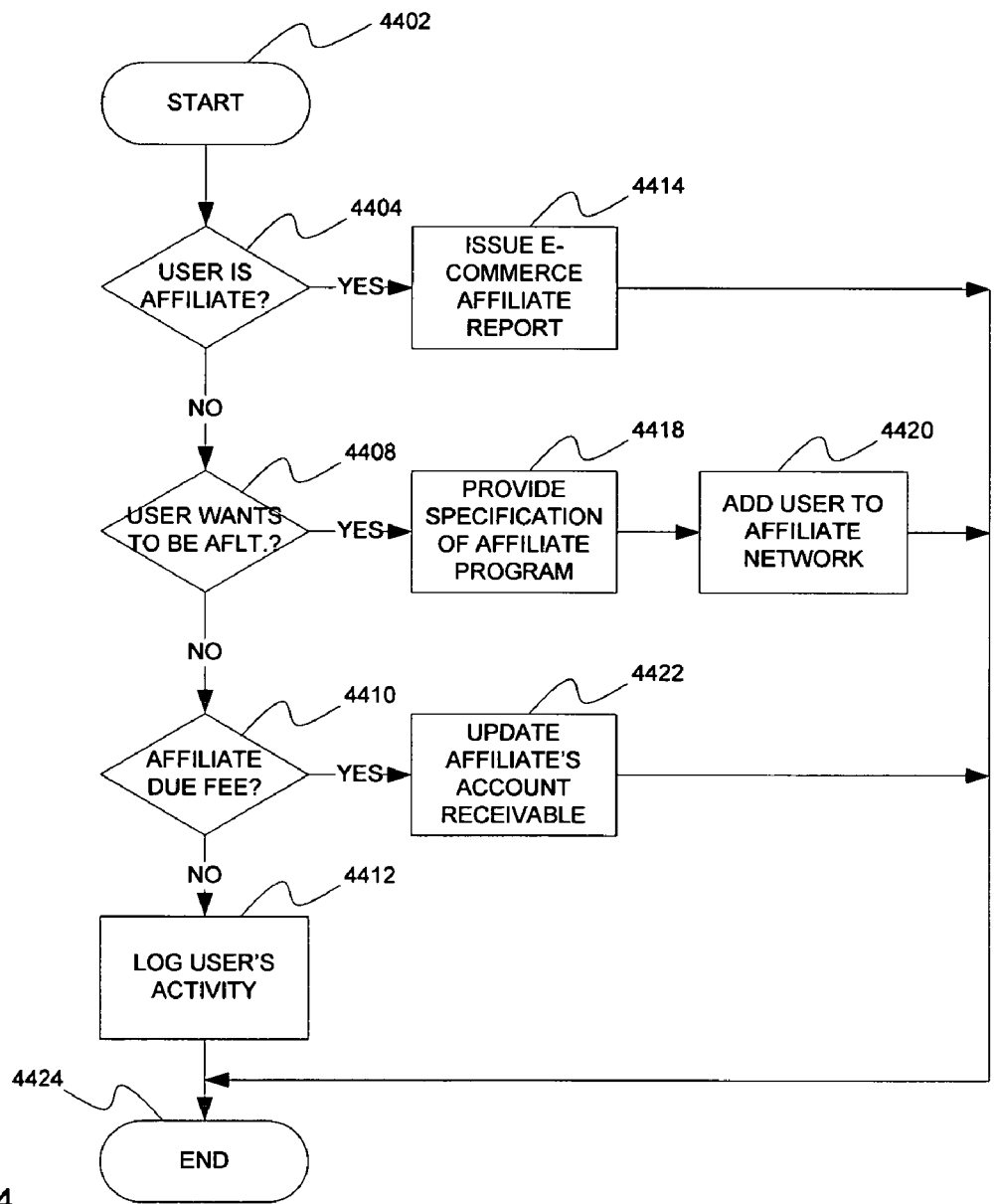
FIG. 44 illustrates an affiliation process wherein the transactions may be monitored by a reputation service.

FIG. 44 shows a FACILITATION OF AFFILIATE service 2122 that may be used with the systems described herein. The procedure may begin at the START logical block 4402. Then, processing flow may continue to the test represented by logical block 4404, which may determine whether the user is an affiliate. An affiliate may be identified as such by its membership in an affiliate program and/or affiliate network, an indication of which may, without limitation, both be stored in one of the databases 1808 and be selected/referenced during the test in logical block 4404. If the result of this test is affirmative, processing flow may continue to the ISSUE E-COMMERCE AFFILIATE REPORT logical block 4414, where an e-commerce affiliate report may be issued to the user. This report may contain an aggregated or disaggregated view of referrals provided by the affiliate and/or an account receivable associated with the referrals. However, if the result of the test in logical block 4404 is negative, processing flow may continue to a test that may be represented by logical block 4408 (labeled USER WANTS TO BE AFLT.?), where a test may determine whether the user is interested in becoming an affiliate. If the result of this test is affirmative, processing flow may continue to the PROVIDE SPECIFICATION OF AFFILIATE PROGRAM logical block 4418, where the user may be provided with a legal and/or contractual specification of the affiliate program, which may be provided in a human-readable format (such as and without limitation a PDF document)

and/or a computer-readable format (such as and without limitation an XML file). From this point, the processing flow may continue to the ADD USER TO AFFILIATE NETWORK logical block 4420, where the user may be added to an affiliate network, such as by writing an indication of the user's inclusion in an affiliate network into one of the databases 1808. However, if the result of the test in logical block 4410 is negative, then processing flow may continue to the test represented by the logical block 4412 (labeled LOG USER'S ACTIVITY). Here, an indication of an activity by the user that may have caused the activation of this procedure may be written into one of the databases 1808. For example and without limitation, the user may have selected a promotional Web link from an affiliate Web site for which no fee is associated, but for which a log of user activity may be desired. This activity may be logged. However, if the test at logical block 4410 results in an affirmative result, processing flow may continue to logical block 4422, where an update to an affiliate's account receivable may be recorded, wherein the affiliate may be one of the users 1802 of the system 1800 and wherein the user may have taken an action associated with the affiliate (such as and without limitation selecting a particular Web link), which may cause a fee to be due to the affiliate. Whether from logical block 4414, 4420, 4422, or 4412, processing flow, as shown, may continue to the END logical block 4424, where this procedure may end, perhaps producing a code or other indication of completion of the transaction.

In embodiments, an interactive reputation platform 100 may be deployed and used in connection with any of the interactions described in connection with FIG. 21B. For example, an interactive reputation platform 100 may be used to provide reputation services through a reputation service host 112 as described in connection with FIGS. 1-17. In embodiments, the reputation service host 112 may provide services related to collection of reputation information 116, providing warnings, alerts, and the like 114; providing analysis of reputation information 122; monitoring changes 124; and/or making alternative recommendations 130.

The systems and methods described herein relate to providing reputation based services in connection with e-commerce interactions such as those described above. In general, e-commerce interactions may include one or more of the sale of goods/services, advertising, recommendations, research, supplying and receiving metadata, pricing, communicating with affiliates, communications, information, education, portals (e.g. yahoo!, AOL, MSN), blogs, location based services, Microsoft Office activities or other business application activities, updates, downloads, graphics, animation, pictures, video, television, movies, pay per view, subscriptions, registrations, audio, radio, music, file sharing, b2b, corporate, finance, or the like.

In embodiments, a user of a client 102 may want to purchase, offer for sale, auction, or otherwise participate in an e-commerce activity related to goods or services. A reputation service host 112 may be operated in connection with the client 102 (e.g. as illustrated in connection with FIGS. 1-17) during such interaction. In embodiments, the goods/services may relate to adult items, apparel, audio and video, automotive, baby items, baby/wedding registry, beauty items, bed and bath items, books, camera/photo items, cell phones and service, computer and video games, computers, digital books, DVDs, educational items, electronics, financial services, friends and favorites items, furniture and décor, gourmet food, health and personal care items, home and garden items, images, information, jewelry and watches, kitchen and house wares, magazine subscriptions, maps, movie show-times, music, musical instruments, office products, outdoor living items, pet supplies, pharmaceuticals, real estate, shoes, software, sports and outdoors items, tools and hardware, toys and games, travel, videos, weather, wish list items, yellow pages, or the like.

In embodiments, a user of a client 102 may want to interact with an advertisement, advertise, or otherwise interact in an e-commerce activity related to advertising. A reputation service host 112 may be operated in connection with the client 102 (e.g. as illustrated in connection with FIGS. 1-17) during such interaction. In embodiments, advertising may relate to an advertisement aggregator, an all ads site, attention brokering, a bid to advertise, communication with end user, a coupon, dynamic ad insertion (e.g. DoubleClick), editorial/ad relationship, permission-based advertisement, promotions, spam/E-mail, classified ads, or the like. In embodiments, the classified ads from above may include real estate ads, vehicle ads, used good ads, new good ads, services, or the like.

In embodiments, a user of a client 102 may want to interact with an e-commerce activity through a network facility (e.g. network 108 as described in connection with FIG. 1). In embodiments, the network facility may include Akamai, Bit-Torrent, P2P, or other such techniques.

In embodiments, user recommend/research activities may include buying-based behavior, click-based behavior, collaborative filtering, customer reviews, editorial reviews, machine learning, reputation measures, or the like. In embodiments, metadata information may include dynamic modification of US, browser navigation, navigation based on past behavior, or the like. In embodiments, user pricing/research may include agents, auctions (e.g. EBay), catalog aggregator, pricing comparison engine, ratings, reverse auction (e.g. Priceline), shopping bots, or the like. In embodiments, affiliates may include an affiliates program. In embodiments, communications may include email, voice over IP, IM, chat, messaging, picture mail, video mail, voice mail, phone calls, Web interactions, or the like. In embodiments, information may include searching, news, travel information, weather information, local information, research, or the like. In embodiments, the searching as shown above may be for images, video, text, audio, groups, local information, news, finance information, travel information, weather information, research, or the like. In embodiments, education information or activities may include on-line classes, reference material, registration, and the like. In embodiments, portals (e.g. yahoo!, AOL, MSN) may be for finance activities, email, messaging, IM, chat, video download/upload, picture download/upload, audio download/upload, music download/upload, directories, shopping (e.g. e-commerce), entertainment, games, cards, and the like. In embodiments, the cards as shown above may include greeting cards, holiday cards, event cards (e.g. birthday), or the like. In embodiments, blogs may include posting, searching, syndication, or the like. In embodiments, location based services may include mobile services, desktop services, or the like. In embodiments, Microsoft Office activities may include Word, Excel, Power Point, Outlook, Outlook Express, Project, Internet Explorer, or the like. In embodiments, animation may include Flash Macromedia, or the like. In embodiments, corporate activities may include supply chain management, finance activity, human resources, sales, marketing, engineering, software development, customer support, product information, data mining, data integration, or the like. In embodiments, finance activities may include personal banking, credit card Websites, PayPal and other online payment systems, brokerage Websites, retirement/401 k/IRA Websites, business, or the like. In embodiments, the personal banking as shown above may include loans, banking, or the like. In embodiments, the loans as shown above may include mortgages, auto loans, personal loans, or the like. In embodiments business activities may include loans, banking, or the like. In embodiments, business loans as shown above may include mortgages, vehicle loans, or the like.

It should be understood that the embodiments described herein may relate to an interaction with a Website, portion of a Website, content associated with a Website, content accessible through a network, information accessible through a network, a network accessible item, virtually any other network interaction, interactions with user interfaces, interactions with software applications, interactions with objects that are embedded in user interfaces or software applications (e.g. embedded URLs, links, or the like), or interactions with data or metadata that represent or are derived from or that relate to any of the foregoing.

While e-commerce has been discussed extensively, and other examples of useful environments for reputation services have been provided, numerous additional applications exist. In general, the reputation systems and methods described herein may be usefully invoked in any environment where users might benefit from reputation information. This may include, for example, search and download of privacy and security software, such as anti-spyware software, anti-virus software, anti-spam software, security software, file sharing software, music sharing software, video sharing software. This may also include interactions with Web sites for charitable donations, intermediaries for financial transactions, and Web sites that purport to provide reputation data, such as Web sites aimed at discouraging users from entering into financial transactions with a company who's product does not work well or that have poor user ratings. Another useful application of reputation services may be to prevent inadvertent navigation to sites that knock-off well known company names, brands, or URLs with near facsimiles intended to confuse consumers.

Similarly, while many of the embodiments herein are described in connection with browser interfaces, it should be understood that reputation services may be used with any software that interacts with content through a network, including open source (e.g. Mozilla, Firefox, or other open source browser), peer-to-peer (e.g. Kazaa, or a similar peer-to-peer program), proprietary (e.g. Microsoft's Internet Explorer or Apple's Safari), platform specific (e.g. using a protocol designed for a particular device), or other software, platforms, or configurations. For example, a mobile communication facility (e.g. a cell phone) may use proprietary, platform-specific, code to interface with the Internet in a manner that could benefit from the reputation services provided herein.

More generally, the reputation-based systems and methods described herein may be usefully applied in a wide range of network-based and computer-based environments. For example, reputation systems may be applied in the context of peer-to-peer networks or other file sharing and/or socially oriented environments such as systems for searching and sharing screen savers, music, song lyrics, TV shows, movies, DVDs, CDs, DVD ripping and burning software, CD ripping and burning software, video clips, smiley faces, fonts, backgrounds, themes, skins, celebrity information, wallpaper, cursors, games, contests, ring tones, podcasts, and any other soft content suitable for distribution over a network. The reputation service may, in particular, protect users of such peer-to-peer, file sharing, and/or social networks from receiving spyware, adware, or other malware, as well as protect users from being added to an e-mail spam list, becoming a victim of a browser, application, or operating system exploit, or being otherwise subjected to security and privacy risks in a network environment.

All such modifications and adaptations as would be clear to one of skill in the art are intended to fall within the scope of the systems and methods described herein.

While the invention has been described in connection with certain preferred embodiments, other embodiments may be understood by those of ordinary skill in the art and are encompassed herein. All document referenced herein are hereby incorporated by reference.

What is claimed is:

1. A method, comprising:
  automatically generating a third party assessment of a website's reputation; and
  storing an indicia of the assessment in a format and location accessible by a client computing facility attempting to interact with the website via a search results page that displays a list of search result links with which the website is included;
  wherein automatic testing is performed to measure if the website is attempting to change a setting;
  wherein the automatic testing is to assess the website's installation of software;
  wherein the reputation is at least in part based on practices associated with the website;
  wherein the indicia of the assessment is presented as an assessment based icon for each link of the list of search result links and each sponsored link displayed on the search results page.

2. The method of claim 1, wherein the format is further adapted to provide the indicia at a time corresponding with the attempted website interaction.

3. The method of claim 1, wherein the location is associated with a server.

4. The method of claim 1, wherein the location is associated with a client.

5. The method of claim 1, wherein the format is adapted to provide accessibility at a time the client computing facility is attempting to interact with the website.

6. The method of claim 1, wherein automatic testing is performed to measure a number of annoying pop ups received after interacting with the website.

7. The method of claim 1, wherein the setting includes a web browser setting including a browser's home page setting.

8. The method of claim 1, wherein the setting includes a web browser setting including a browser's security setting.

9. The method of claim 1, wherein the automatic testing is to assess if the website is an End User License Agreement.

10. The method of claim 9, wherein the End User License Agreement is assessed for handling of personal information.

11. The method of claim 1, wherein the automatic testing is to assess the website's use of spam.

12. The method of claim 1, wherein the automatic testing provides automatic website feedback.

13. The method of claim 12, wherein the automatic website feedback is based on a user's credibility.

14. The method of claim 1, wherein the reputation is at least in part based on a link structure associated with the website.

15. The method of claim 1, wherein links associated with low reputation sites in the list of search result links are colored differently from links that do not have a low reputation.

16. The method of claim 1, wherein the assessment based icon is embedded within the search results page for each link of the list of search result links and for each sponsored link during rendering.

17. A system, comprising:
an automation facility adapted to generate a third party assessment of a website's reputation; and
a storage facility adapted to store an indicia of the assessment in a format and location accessible by a client computing facility attempting to interact with the website via a search results page that displays a list of search result links with which the website is included;
wherein the system is operable such that automatic testing is performed to measure if the website is attempting to change a setting;
wherein the system is operable such that the automatic testing is to assess the website's installation of software;
wherein the system is operable such that the reputation is at least in part based on practices associated with the website;
wherein the system is operable such that the indicia of the assessment is presented as an assessment based icon for each link of the list of search result links and each sponsored link displayed on the search results page.

18. The system of claim 17, wherein the format is further adapted to provide the indicia at a time corresponding with the attempted website interaction.

19. The system of claim 17, wherein the location is associated with a server.

20. The system of claim 17, wherein the location is associated with a client.

21. The system of claim 17, wherein the format is adapted to provide accessibility at a time the client computing facility is attempting to interact with the website.

22. The system of claim 17, wherein automatic testing is performed to measure a number of annoying pop ups received after interacting with the website.

23. The system of claim 17, wherein the setting includes a web browser setting including a browser's home page setting.

24. The system of claim 17, wherein the setting includes a web browser setting including a browser's security setting.

25. The system of claim 17, wherein the automatic testing is to assess if the website is an End User License Agreement.

* * * * *